United States Patent
Abe et al.

(10) Patent No.: US 8,355,748 B2
(45) Date of Patent: Jan. 15, 2013

(54) MULTI-MODE CONTROL STATION, RADIO COMMUNICATION SYSTEM, RADIO STATION, AND RADIO COMMUNICATION CONTROL METHOD

(75) Inventors: Katsuaki Abe, Osaka (JP); Takenori Sakamoto, Tokyo (JP); Akihiko Matsuoka, Kanagawa (JP); Ryuji Kohno, Kanagawa (JP); Motoko Taniguchi, Kanagawa (JP)

(73) Assignees: Panasonic Corporation, Osaka (JP); Ryuji Kohno, Kanagawa (JP)

( * ) Notice: Subject to any disclaimer, the term of this patent is extended or adjusted under 35 U.S.C. 154(b) by 1095 days.

(21) Appl. No.: 11/597,511

(22) PCT Filed: Mar. 7, 2005

(86) PCT No.: PCT/JP2005/003913
§ 371 (c)(1),
(2), (4) Date: Nov. 23, 2007

(87) PCT Pub. No.: WO2005/117473
PCT Pub. Date: Dec. 8, 2005

(65) Prior Publication Data
US 2008/0200195 A1    Aug. 21, 2008

(30) Foreign Application Priority Data

May 28, 2004  (JP) .................................. 2004-160329
May 28, 2004  (JP) .................................. 2004-160334
Nov. 8, 2004  (JP) .................................. 2004-324231

(51) Int. Cl.
*H04M 1/00* (2006.01)
*H04W 72/00* (2009.01)
(52) U.S. Cl. .................... 455/552.1; 455/450; 455/41.1; 455/426.1; 370/329; 370/338

(58) Field of Classification Search ............... 455/552.1, 455/553.1, 426.1, 41.1–41.3, 450–453; 370/338, 370/328, 329, 350
See application file for complete search history.

(56) References Cited

U.S. PATENT DOCUMENTS 6,850,491 B1 *  2/2005  Firoiu et al. ................. 370/235
2001/0016499 A1  8/2001  Hamabe
(Continued)

FOREIGN PATENT DOCUMENTS
EP       1 193 993       4/2002
(Continued)

OTHER PUBLICATIONS

International Search Report dated Jun. 7, 2005.
(Continued)

*Primary Examiner* — Lester Kincaid
*Assistant Examiner* — Daniel Lai
(74) *Attorney, Agent, or Firm* — Dickinson Wright PLLC

(57) ABSTRACT

The overall throughput of the radio communication traffic in a radio communication area in a radio communication environment where a plurality of types of radio communication systems are mixedly used in a neighboring radio communication area is improved. When a multi-mode control station (101) performs communication with a terminal station in a network through a plurality of types of communication systems, a communication link parameter collecting section (10141) collects parameters indicating the states of the communication links. A resource allocation determining section (10143) determines communication resource allocation for which the throughput is the greatest for each resource allocation period according to the parameters. A communication control section (1015) controls a multi-mode communication unit (1012) according to the result of the determination.

11 Claims, 32 Drawing Sheets

U.S. PATENT DOCUMENTS

| | | | | |
|---|---|---|---|---|
| 2002/0061031 | A1* | 5/2002 | Sugar et al. | 370/466 |
| 2003/0032445 | A1* | 2/2003 | Suwa | 455/552 |
| 2003/0058826 | A1* | 3/2003 | Shearer, III | 370/338 |
| 2003/0185170 | A1* | 10/2003 | Allen et al. | 370/329 |
| 2004/0002341 | A1* | 1/2004 | Chen | 455/453 |
| 2004/0033786 | A1* | 2/2004 | Kirkpatrick | 455/74.1 |
| 2004/0062218 | A1 | 4/2004 | Ue | |
| 2004/0204038 | A1* | 10/2004 | Suzuki et al. | 455/553.1 |

FOREIGN PATENT DOCUMENTS

| | | |
|---|---|---|
| JP | 2001-238251 | 8/2001 |
| JP | 2001-339342 | 12/2001 |
| JP | 2002 077042 | 3/2002 |
| JP | 2002 111733 | 4/2002 |
| JP | 2003 070043 | 3/2003 |
| JP | 2003-199160 | 7/2003 |
| WO | 01/24455 | 4/2001 |
| WO | 2004/001997 | 12/2003 |

OTHER PUBLICATIONS

Chinese Office Action dated Apr. 24, 2009.

Supplementary European Search Report dated Nov. 24, 2011.

\* cited by examiner

| ITEM | CONTENT |
|---|---|
| APPARATUS ID | 0001 |
| SNR | 5dB |
| ATTRIBUTE | INTERNAL INTERFERENCE |
| INTERFERENCE SOURCE ID | 0003 |
| COMMUNICATION SCHEME | Bluetooth |
| INTERFERENCE SIGNAL POWER | 0.1mW |

FIG.24

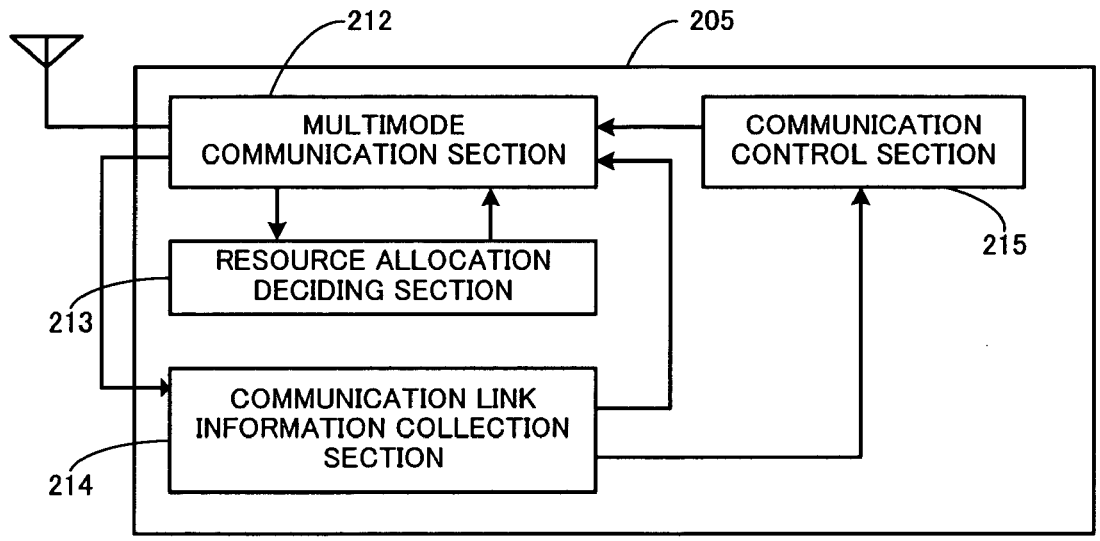

FIG.25

| ITEM | CONTENT |
|---|---|
| APPARATUS ID | 0001 |
| COMPATIBLE COMMUNICATION SCHEMES | IEEE802.11b, Bluetooth |
| USED COMMUNICATION SCHEME | IEEE802.11b |
| FREQUENCY CHANNEL | 2437MHz |
| OCCUPIED BANDWIDTH | 11MHz |
| TRANSMISSION RATE | 11Mbps |
| TRANSMISSION POWER | 1mW/Hz |
| TRANSMISSION POWER | 1mW/Hz |
| TRANSMISSION POWER | 1mW/Hz |
| TRANSMISSION POWER | 1mW/Hz |

FIG.26

| ITEM | CONTENT TO CHANGE |
|---|---|
| USED COMMUNICATION SCHEME | IEEE802.11b ⇒ Bluetooth |
| FREQUENCY CHANNEL | 2437MHz ⇒ 2412MHz |
| TRANSMISSION RATE | 11Mbps ⇒ 5.5Mbps |
| TRANSMISSION POWER | 1mW/Hz ⇒ 5mW/Hz |

MULTI-MODE CONTROL STATION, RADIO COMMUNICATION SYSTEM, RADIO STATION, AND RADIO COMMUNICATION CONTROL METHOD

TECHNICAL FIELD

The present invention relates to a multimode control station, wireless communication system, wireless station, and wireless communication control method, and particularly relates to technology for improving total throughput of communication traffic in an environment where a plurality of communication links for wireless stations by means of a plurality of types of wireless communication schemes are mixed and used within an area in close proximity.

BACKGROUND ART

In recent years, near-field wireless communication schemes utilized within a room such as an office or a household have come to prominence, with services and products using wireless communication schemes such as those conforming to IEEE802.11b and IEEE802.11g (for example, backward compatible with b) that are wireless LAN (Local Area Network) standards and the Bluetooth (registered trademark) standard targeting connection between various equipment such as computers and mobile terminal stations etc. already having been implemented. Such wireless communication schemes can eliminate the inconvenience of cable wiring because connection between equipments are established wirelessly, but communication is difficult in equipments conforming to different standards due to different communication schemes including, for example, a modulation method, codec, and protocol. Further, the communication standards IEEE802.11b, and Bluetooth (registered trademark) share a single frequency band of 2.4 GHz referred to as ISM (Industrial Scientific and Medical) and can be introduced in a straightforward manner to carry out wireless communication without need of a license, but, conversely, there is the possibility of mutual interference occurring when used in close proximity.

As one of a method of resolving problems such as poor interconnectivity due to differences in wireless communication standards and mutual interference within the same frequency band, a method of selectively switching between communication schemes in use according to wireless transmission path conditions after making a configuration of a wireless station a so-called multimode configuration that is compatible with a plurality of wireless communication schemes has been considered (for example, refer to patent document 1). As a result, even if wireless transmission path conditions change, it is possible to carry out efficient wireless communication in accordance with this change.

An example of a communication control method using a multimode configuration of the related art will be described using FIG. 37. FIG. 37 shows an example of installation conditions of apparatuses within wireless communication area AR1 of close proximity using a 2.4 GHz band.

Communication is carried out using a wireless communication scheme conforming to the Bluetooth (registered trademark) standard or the IEEE802.11b standard between multimode control station 10 and a plurality of terminal stations. Here, multimode terminal stations 20-1 and 20-2, Bluetooth (registered trademark)-compatible terminal station 20-3, and IEEE802.11b-compatible terminal station 20-4 are shown as an example of a plurality of terminal stations existing within wireless communication area AR1. Wireless communication is then carried out while performing switching control every time between multimode control station 10 and multimode terminal stations 20-1 and 20-2 so as to ensure that communication functions at each wireless station are compatible with one communication scheme. Further, when wireless communication is carried out between multimode control station 10 and Bluetooth (registered trademark)-compatible terminal station 20-3 or IEEE802.11b-compatible terminal station, the communication is performed such that multimode control station 10 is controlled to switch to a wireless function that is compatible with terminal station 20-3 or terminal station 20-4.

Other scheme-compatible wireless stations 30-1 and 30-2 are installed within the same wireless communication area AR1, and carry out wireless communication using a separate communication link in the same ISM band. Here, a low power communication link for a local telephone is given as an example of a separate communication link. A frequency band that overlaps partially or completely with the frequency band used in the communication links between the multimode control station 10 or multimode terminal station 20-1 and IEEE802.11b-compatible terminal station 20-4 during calls is taken to be used for this communication link. Further, a microwave oven 40 taken as apparatus using electromagnetic waves of the same 2.4 GHz band is also provided within the area AR1. Let the case be assumed where at least one of other scheme-compatible wireless stations 30-1 and 30-2 and microwave oven 40 are set close to multimode control station 10 in terms of a positional relation.

Within the wireless communication area AR1 of the installation conditions described above, when there is a need of data transmission with terminal stations 20-1 to 20-4, multimode control station 10 carries out wireless communication using a compatible communication schemes every time in the ISM waveband. Control of wireless communication at multimode control station 10 is then carried out by control section 11. When carrying out communication with Bluetooth (registered trademark)-compatible terminal station 20-3, communication is carried out by switching the wireless communication function to Bluetooth (registered trademark)-compatible processing section 12. Also, when carrying out communication with IEEE802.11b-compatible terminal station 20-4, communication is carried out by switching the wireless communication function to an IEEE802.11b compatible wireless processing section 13. As a result of using this configuration and communication control, it is possible for multimode control station 10 to carry out communication with terminal stations 20-3 and 20-4 compatible only with the respective Bluetooth (registered trademark) and IEEE802.11b standards, and increase connectivity between equipments compatible with different communication standards.

On the other hand, it is possible to carry out wireless communication control as shown below between multimode control station 10 and multimode terminal station 20-1. First, switching control is carried out so as to carry out wireless communication using IEEE802.11b-compatible wireless processing section 13. After a wireless communication scheme conforming to the IEEE802.11b standard is carried out, namely, after baseband signal processing such as predetermined frame configuration and predetermined modulation processing is carried out, predetermined analog wireless processing such as frequency conversion and amplification is carried out, and wireless communication is carried out via an antenna according to a predetermined access procedure. Further, at the same time, the presence or absence of interference conditions in the reception band for IEEE802.11b is detected using the reception signal. Here, when wireless communication occurs using a communication link for calls on a local telephone at, for example, other scheme-compatible wireless station 30-1, or when microwave oven 40 operates, electromagnetic radiated emissions from these equipments to the band overlapping with the wireless communication using IEEE802.11b are detected as interference.

When the results of the detection of interference determine that interference exists, multimode control station 10 carries out control of switching of communication systems using control section 11, and carries out wireless communication using a wireless communication scheme conforming to the Bluetooth (registered trademark) standard using Bluetooth (registered trademark)-compatible wireless processing section 12. Further, on the other hand, detection of the presence or absence of interference in a band of IEEE802.11b is carried out in parallel using IEEE802.11b-compatible wireless processing section 13. When the results of detection of electromagnetic interference wave are that electromagnetic wave interference does not exist, multimode control station 10 switches the system for carrying out wireless communication from the system using Bluetooth (registered trademark)-compatible wireless processing section 12 to IEEE802.11b compatible wireless processing section 13, and switches to wireless communication of the IEEE802.11b standard.

By carrying out control of communication as described above using control section 11, communication between multimode control station 10 and multimode terminal station 20-1 is executed by switching the communication scheme over according to the presence or absence of interference conditions. Specifically, when there is no interference, wireless communication is carried out using a communication scheme conforming to the IEEE802.11b standard of a higher transmission speed, and when interference exists, a communication scheme conforming to the Bluetooth (registered trademark) standard where transmission speed is comparatively low but the probability of being subjected to interference is relatively low is used. As a result, it is possible to continue data transmission using wireless communication regardless of the presence or absence of interference, and it is also possible to carry out communication with good overall communication efficiency.

Patent Document 1: Japanese Patent Application Laid-open No. 2003-199160 (pages 3 to 4, FIG. 1).

DISCLOSURE OF INVENTION

Problems to be Solved by the Invention

However, in the configuration of the related art shown in FIG. 37, when carrying out communication by switching between an IEEE801.11b standard communication scheme and a Bluetooth (registered trademark) standard communication scheme as the communication has the problems shown below.

Firstly, optimum control can not always be carried out efficiently because no consideration is given to the time necessary for switching the wireless communication scheme used in wireless communication between the multimode control station 10 and terminal stations 20-1 to 20-4, between the IEEE801.11b and Bluetooth (registered trademark) standards.

For example, at multimode control station 10, when the communication operation mode is switched over between Bluetooth (registered trademark)-compatible wireless processing section 12 and IEEE802.11b-compatible wireless processing section 13, for example, time for power supply control, transient response of circuits, time for convergence at the time of changing oscillation frequency of a synthesizer, and time for switching functions of signal processing sections etc. is required, and time is therefore necessary until communication operations at the communication mode of the switching destination. In the following, this time is referred to as a "required mode switching time." Further, time is also required to establish a link connection in the wireless communication scheme of the switching destination, namely, time is required until synchronous processing is carried out and a predetermined link connection procedure is complete. In the following, this time is referred to as a "required link connecting time."

During the time required to change these functions and establish links, multimode control station 10 cannot carry out communication with any other terminal stations, and this causes throughput to be lowered. In particular, when the number of terminal stations the multimode control station 10 takes as communication targets increases or when the corresponding wireless communication schemes increase, the proportion of time where communication is not possible becomes comparatively large, and there is a problem that marked deterioration in throughput is caused.

Secondly, at multimode wireless stations 10, 20-1, and 20-2, a wireless communication scheme for use is switched over between a communication scheme conforming to the IEEE802.11b standard and a communication scheme conforming to the Bluetooth (registered trademark) standard by autonomously distributed control. The influence on other wireless stations existing within the wireless communication area AR1 is therefore not taken into consideration, and when considering the transmission efficiency of the whole of the communication area AR1, the efficient communication is not always carried out.

For example, when switching the communication scheme for use in wireless communication between multimode control station 10 and multimode terminal station 20-2 from a communication scheme conforming to the IEEE802.11b standard to a communication scheme conforming to the Bluetooth (registered trademark) standard, IEEE802.11b-compatible wireless station 20-4 is subjected to electromagnetic wave interference by communication using the communication scheme conforming to the Bluetooth (registered trademark) standard between wireless stations having the multimode function, and transmission efficiency therefore is deteriorated. This influence becomes larger in accordance with increase in wireless stations having the multimode function.

Further, even when multimode control station 10 manages the interference condition of terminal stations 20-1 to 20-4 collectively and controls switching of the communication schemes of multimode terminal stations 20-1 and 20-2 based on the interference conditions, control is not always carried out efficiently unless it is distinguished whether or not interference occurring at the multimode terminal stations 20-1 and 20-2 is interference due to electromagnetic wave transmitted from a wireless station under the control of multimode control station 10, namely, a wireless station for which a communication scheme is controllable.

For example, with wireless communication between multimode wireless station 10 and 20-2, if interference occurs during communication in a communication scheme conforming to the IEEE802.11 standard, and the wireless station that is the emission source for that interference wave is a wireless station that multimode control station 10 controls, even if the communication scheme of the communication link subject to interference (communication link between multimode control station 10 and multimode terminal station 20-2) is switched over to a communication mode conforming to the Bluetooth (registered trademark) standard, if control is carried out so that the frequency channel of the interference is switched over in such a manner that the frequency band of the interference and the frequency band of the communication scheme for the communication link subject to interference do not overlap. Then, between the multimode control station 10 and the multimode terminal station 20-2, the scheme conforming to the IEEE802.11b standard can be used continuously.

As described above, there is a problem that optimum control is not always performed efficiently.

It is therefore the object of the present invention to provide a multimode control station, wireless station, wireless communication system and wireless communication control method capable of increasing total throughput of wireless communication traffic within a wireless communication area under a wireless communication environment where a plurality of types of wireless communication schemes are mixed within a wireless communication area in close proximity.

Means for Solving the Problem

In order to resolve these problems, a multimode control station of the present invention adopts a configuration having: a communication link parameter collecting section that collects information relating to wireless communication links with a plurality of terminal stations; a resource allocation deciding section that decides communication resource allocation used at wireless communication links with the terminal stations based on the collected information so that throughput of data transmission traffic within the wireless communication network becomes maximum; and a multimode communication section that controls communication conditions for the wireless communication links based on communication resource allocation to the decided terminal stations, and carries out communication.

Further, a multimode control station of the present invention adopts a configuration having: a communication link information collecting section that collects information relating to communication links with the wireless stations; a resource allocation deciding section that decides communication resource allocation used at wireless communication links with terminal stations based on the collected information so that interference that the wireless station are subjected to within the wireless communication network is reduced, and a multimode communication section reporting the communication resource allocation results to the decided wireless stations.

Moreover, each of the wireless stations of the present invention adopts a configuration having: an interference detection section that distinguishes and detects whether or not information relating to interference that the subject station is subjected to in a communication link between the subject station and other wireless stations, is interference due to electromagnetic wave from wireless terminal stations that are controllable by the multimode control station, and a multimode communication section that reports the detection result of interference to the multimode control station.

Advantageous Effect of the Invention

According to the present invention, under an environment where a plurality of types of wireless communication schemes are mixed and used within an area in close proximity, various parameters for communication links between the terminal stations and the multimode control terminal station, or for between terminal stations are collected, and resources such as the communication scheme, transmission speed and time allocation rate used at the communication link are allocated in such a manner that total throughput of traffic in the network becomes maximum and the interference the wireless stations are subjected to is reduced, so that it is possible to improve overall system throughput.

BRIEF DESCRIPTION OF THE DRAWINGS

FIG. 24 is a view showing content of interference information;

FIG. 25 is a block view showing a configuration for a multimode control station of the embodiment 3;

FIG. 26 is a view showing the content of communication profile information;

BEST MODE FOR CARRYING OUT THE INVENTION

The embodiments of the present invention will be described below in detail with reference to the accompanying drawings.

Embodiment 1

In this embodiment, it is proposed that a control station collects information such as communication quality and QoS (Quality of Service) of transmitted data at communication links with the terminal stations under an environment where a network is formed in a situation where wireless communication schemes based on a plurality of wireless communication standards are mixed between the control station and the plurality of terminal stations, in a comparatively confined space, decides communication resources allocated to the communication links based on this collected information and carries out communication.

Figure 1:
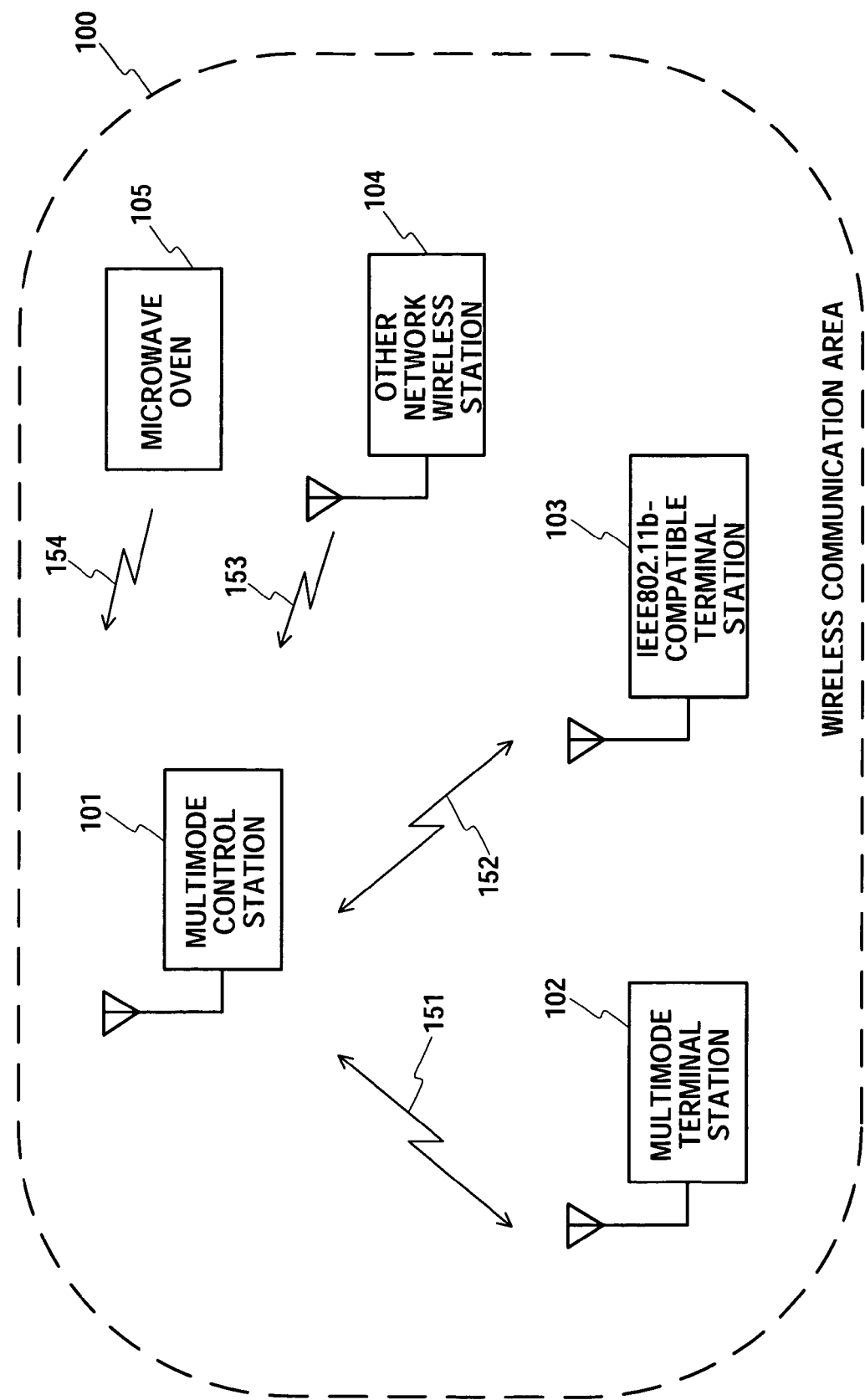
FIG. 1 is a view showing a wireless station and interference source within a wireless communication area of an embodiment of the present invention.

FIG. 1 shows wireless stations and interference sources existing within the wireless communication area used for the description of this embodiment. Wireless communication area 100 shows a spatial range where multimode control station 101 is able to communicate by constructing a network using wireless communication. Specifically, an area assumed to be an area that is comparatively confined in scale within a room such as, for example, in a home or an office, is shown. In this embodiment, assume that, as an example of a wireless station for which multimode control station 101 form a network in wireless communication area 100, multimode terminal station 102 and IEEE802.11b-compatible terminal station 103 are installed. Further, assume that, within wireless communication area 100, as an example of wireless stations or interference sources that may possibly be a cause of interference to the wireless scheme used by multimode control station 101, another network wireless station 104 and microwave oven 105 are also installed. Namely, interference waves 153 and 154 are emitted from another network wireless station 104 and microwave oven 105 to multimode control station 101, multimode terminal station 102, and IEEE-compatible terminal station 103.

Multimode control station 101 is a wireless station that is compatible with a plurality of communication schemes, forms a network with a plurality of terminal stations, and carries out wireless communication by switching wireless processing functions between a plurality of schemes. In this embodiment, as an example, a case of carrying out wireless communication between multimode terminal station 102 and IEEE802.11b-compatible terminal station 103 installed within wireless communication area 100 is taken. For communication with multimode terminal station 102, wireless communication is carried out by switching a wireless processing function each time between two wireless communication schemes, an IEEE802.11a standard and an IEEE802.11b standard. Further, when carrying out wireless communication with an IEEE802.11b-compatible terminal station 103, wireless communication is carried out by switching the wireless processing function over to the IEEE802.11b standard wireless scheme.

Figure 2:
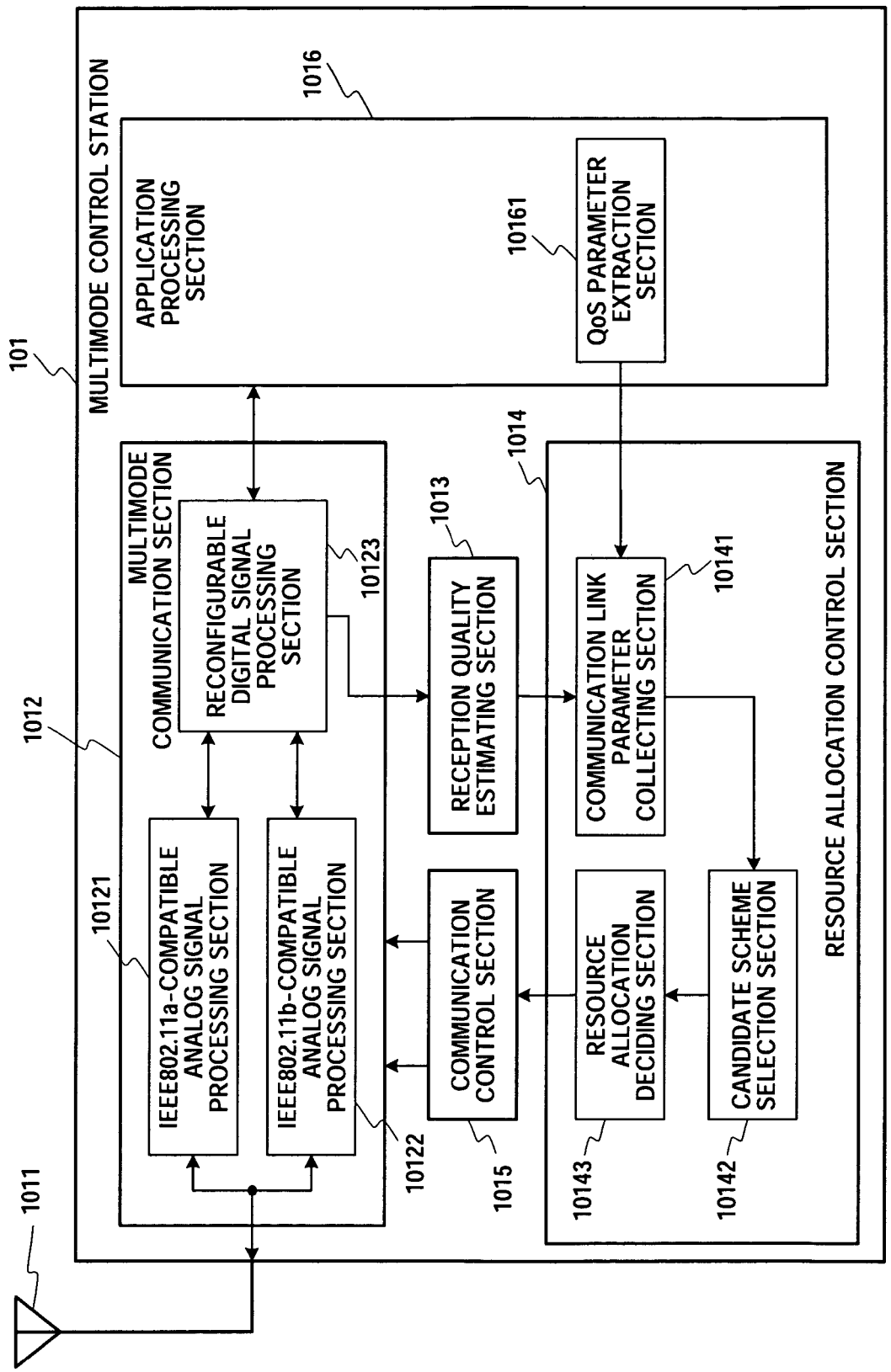
FIG. 2 is a block view showing a configuration for a multimode control station of first and embodiment 2s.

As shown, for example, in FIG. 2, multimode control station 101 carrying out this kind of operation has at least: antenna 1011; multimode communication section 1012; reception quality determining section 1013; resource allocation control section 1014; communication control section 1015; and application processing section 1016.

The details of the configuration of each section will be described later.

Multimode terminal station 102 is a wireless terminal station that carries out wireless communication with multimode control station 101, providing compatibility with a plurality of communication schemes by switching this wireless processing function between a plurality of schemes. In this embodiment, a case of carrying out wireless communication by switching wireless processing functions each time between wireless communication schemes compatible with two standards of the IEEE802.11a standard and the IEEE802.11b standard compatible will be described with an example of multimode control station 101.

Figure 3:
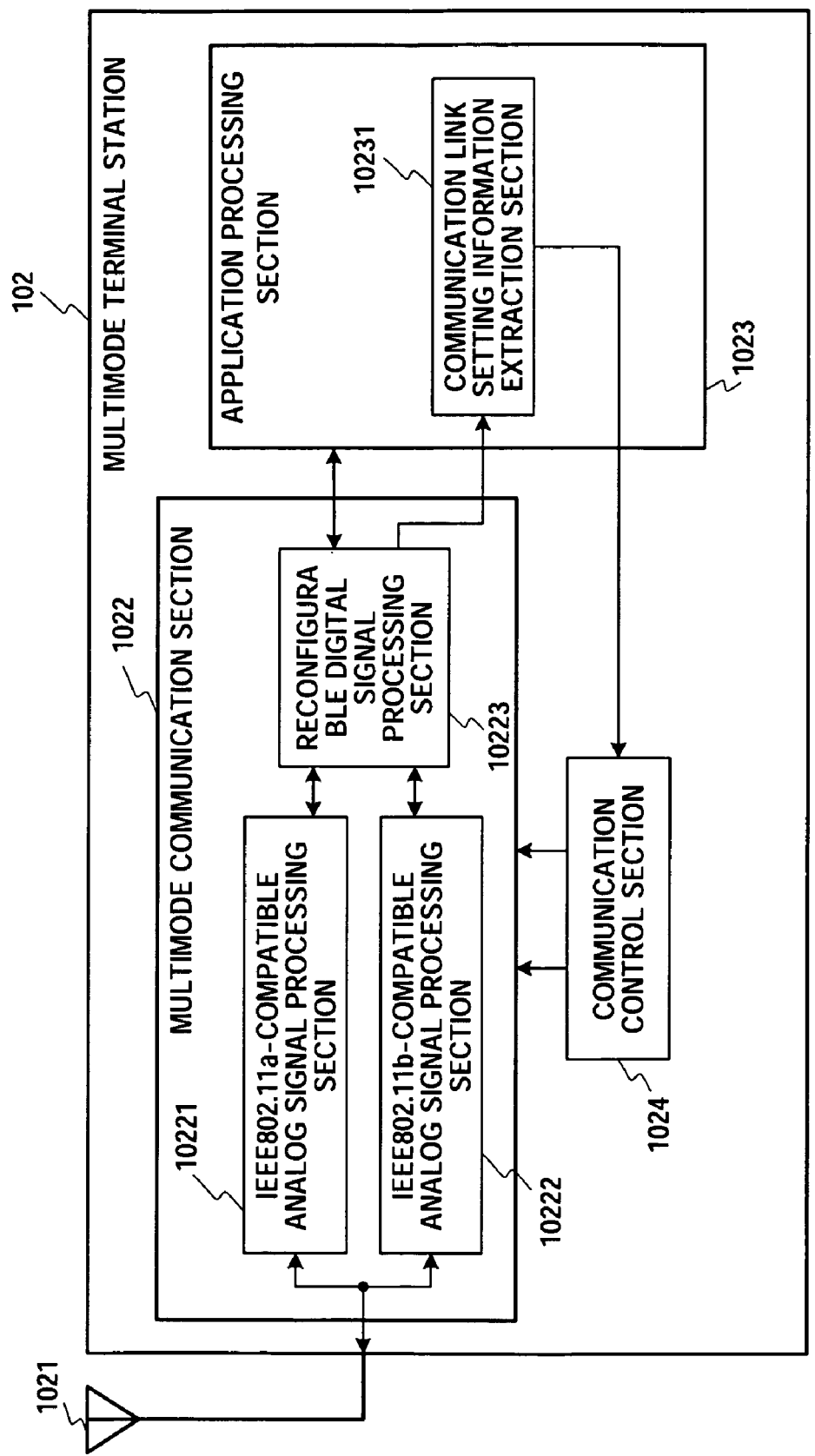
FIG. 3 is a block view showing a configuration for a multimode terminal station of the first and embodiment 2s.

For example, as shown in FIG. 3, multimode terminal station 102 has at least: antenna 1021; multimode communication section 1022; application processing section 1023; and communication control section 1024. The details of the configuration of each section will be described later.

IEEE802.11b-compatible terminal station 103 is a wireless station carrying out wireless communication with multimode control station 101 using a wireless communication scheme conforming to the IEEE802.11b standard.

The configuration of the IEEE802.11b-compatible terminal station does not influence the present invention and is therefore by no means limiting.

Another network wireless station 104 is a wireless station that is not included in the network formed by multimode control station 101 but is installed in a position where interference to multimode control station 101 is possible, and that configuration does not particularly influence the present invention. In this embodiment, assume that, as an example, a wireless station compatible with a wireless telephone standard using the ISM band of the same 2.4 GHz band as the frequency used by the IEEE802.11b standard.

Microwave oven 105 is installed within wireless communication area 100 and interferes against multimode control station 101 when used. This configuration does not particularly influence the present invention.

An configuration example for multimode control station 101 will be described in detail using FIG. 2.

Antenna 1011 is an antenna compatible with a plurality of wireless communication standards and is compatible with IEEE801.11a standard and IEEE802.11b standard, in this embodiment. It is, for example, formed with a multi-resonant antenna having a resonance structure at two frequency bands of, for example, 5 GHz and 2.4 GHz, and is connected to multimode communication section 1012.

Multimode communication section 1012 is a wireless processing section that is able to switch wireless processing functions so as to enable compatibility with two standards of the IEEE802.11a standard and the IEEE802.11b standard. Multimode communication section 1012 is connected to antenna 1011 for input and output of an analog high-frequency signal, and to application processing section 1016 for input and output of received and transmitted data, outputs a received signal to reception quality estimating section 1013, and is inputted a control signal for changing function and a control signal relating to the communication operation from communication control section 1015. Multimode communication section 1012 of this embodiment is configured with, for example, IEEE802.11a-compatible analog signal processing section 10121, IEEE802.11b-compatible analog signal processing section 10122, and reconfigurable digital signal processing section 10123, and operate by selecting one of IEEE802.11a-compatible analog signal processing section 10121 and IEEE802.11b-compatible analog signal processing section 10122 based on the control signal for changing functions, and changes signal processing content occurring at reconfigurable digital signal processing section 10123 so as to be compatible with a predetermined communication scheme based on a control signal for changing functions.

IEEE802.11a-compatible analog signal processing section 10121 is connected to antenna 1011 and reconfigurable digital signal processing section 10123. IEEE802.11a-compatible analog signal processing section 10121 converts a transmitted digital signal compatible with IEEE802.11a standard supplied by reconfigurable digital signal processing section 10123 to an analog signal, implements analog signal processing such as predetermined frequency conversion, filtering, and amplification, and supplies a 5 GHz band analog RF transmission signal to antenna 1011. Further, IEEE802.11a-compatible analog signal processing section 10121 then carries out analog signal processing such as predetermined frequency conversion, filtering, and amplification corresponding to the IEEE802.11a standard on the 5 GHz analog RF reception signal supplied by antenna 1011, and converts this to a digital signal, and supplies the result to reconfigurable digital signal processing section 10123.

IEEE802.11b-compatible analog signal processing section 10122 is connected to antenna 1011 and reconfigurable digital signal processing section 10123. IEEE802.11b-compatible analog signal processing section 10122 converts a transmission digital signal compatible with IEEE802.11b standard supplied by reconfigurable digital signal processing section 10123 to an analog signal, carries out analog signal processing such as predetermined frequency conversion, filtering, and amplification, and supplies a 2.4 GHz band analog RF transmission signal to antenna 1011. Further, IEEE802.11a-compatible analog signal processing section 10122 then carries out analog signal processing such as predetermined frequency conversion, filtering, and amplification corresponding to the IEEE802.11b standard on the 2.4 GHz analog RF reception signal supplied by antenna 1011 and converts this to a digital signal, and supplies the result to reconfigurable digital signal processing section 10123.

Reconfigurable digital signal processing section 10123 is able to change the content of signal processing based on the control signal for changing functions. Reconfigurable digital signal processing section 10123 is configured with one or more combination of a plurality of devices that is able to change functions by rewriting content describing processing such as for, for example, an FPGA (Field Programmable Gate Array), DSP (Digital Signal Processor), CPU (Central Processing Unit), reconfigurable processor etc., or program etc. In this embodiment, a configuration is adopted capable of switching between processing compatible with the IEEE802.11a standard and processing compatible with the IEEE802.11b standard based on the control signal for changing functions.

Reception quality estimating section 1013 estimates reception quality of signals subjected to reception processing at multimode communication section 1012, and outputs the estimation results to resource allocation control section 1014.

In this embodiment, the value of ratio of carrier wave power versus noise power of the reception signal (hereinafter referred to as "CNR") is estimated and outputted as an example of reception quality. Various techniques have already been disclosed for the reception CNR estimating method but the present invention is not influence whichever method is used.

Resource allocation control section 1014 decides resource allocation relating to the communication scheme multimode control station 101 uses at the communication links using transmission speed, and time distribution for carrying out communication used by multimode control station 101 using reception quality information and QoS information for communication links for the terminal stations within the network, supplies the results of the decided resource allocation to communication control section 1015, and is configured, for example, with communication link parameter collecting section 10141, candidate scheme selection section 10142, and resource allocation deciding section 10143.

Communication link parameter collecting section 10141 collects the various parameters for the communication links with terminal stations which multimode control station 101 regards as communication targets, from reception quality estimating section 1013 and QoS parameter extraction section 10161 of application processing section 1016, and supplies these parameters to candidate scheme selection section 10142. The details of these operations will be described later.

Candidate scheme selection section 10142 sets candidates for combinations of communication schemes and transmission speeds used at communication links with the terminal stations based on various parameters supplied by communication link parameter collecting section 10141, and supplies the set candidate information to resource allocation deciding section Resource allocation deciding section 10143 decides combinations of communication schemes and transmission speeds used at communication links and time allocation rates used in communication based on candidate information for combinations of communication schemes and transmission speeds used at communication links supplied from candidate scheme selection section 10142, and supplies the decided information to communication control section 1015. The details of this operations will be described later.

Communication control section 1015 supplies a control signal for changing functions and a control signal for communication operations to multimode communication section 1012 based on information relating to resource allocation supplied by resource allocation control section 1014.

Application processing section 1016 carries out general processing for a higher layer including an application layer in data transmission with the terminal stations existing in the network. Application processing section 1016 is inputted with received data outputted by multimode communication section 1012, generates transmission data at the higher layer transmitted to the terminal stations, and outputs this to multimode communication section 1012. QoS parameter extraction section 10161 of this embodiment also has QoS parameter extracting section 10161 that extracts parameters such as QoS parameters in the application transmission from information relating to application data transmitted with the terminal stations, and supplies these parameters to resource allocation control section 1014.

An configuration example for multimode terminal station 102 will described in detail using FIG. 3.

Antenna 1021 is an antenna compatible with a plurality of wireless communication standards, and has the same configuration as antenna 1011 of multimode control station 101 in this embodiment.

Multimode communication section 1022 is a wireless processing section that is able to switch wireless processing functions in a manner compatible with two standards, the IEEE802.11a standard, and the IEEE802.11b standard, and is connected to antenna 1021 for input and output of an analog high-frequency signal, is connected to application processing section 1023 for input and output of transmission and reception data, and is inputted with a control signal for changing functions and a control signal relating to a communication operation from communication control section 1024. Multimode communication section 1022 of this embodiment is configured with, for example, IEEE802.11a-compatible analog signal processing section 10221, IEEE802.11b-compatible analog signal processing section 10222, and reconfigurable digital signal processing section 10223, and operates to select one of IEEE802.11a-compatible analog signal processing section 10221 and IEEE802.11b-compatible analog signal processing section 10222 based on the control signal for changing functions.

IEEE802.11a-compatible analog signal processing section 10221, IEEE802.11b-compatible analog signal processing section 10222, and reconfigurable digital signal processing section 10223 can be configured using the same configuration as the structural elements of their respective namesakes at multimode control station 101.

Application processing section 1023 carries out general processing for a higher layer including an application layer in data transmission with multimode control station 101. Application processing section 1023 is inputted with received data from multimode communication section 1022, generates transmission data at the higher layer transmitted to multimode control station 101, and outputs this to multimode communication section 1022. Application processing section 1023 has communication link setting information extraction section 10231, and extracts setting information containing information relating to the communication scheme used at communication link 151 reported from multimode control station 101 by this communication link setting information extraction section 10231.

Communication control section 1024 supplies the control signal for changing functions and the control signal for the communication operation to multimode communication section 1022 based on setting information relating to communication link 151 supplied by application processing section 1023.

Figure 4:
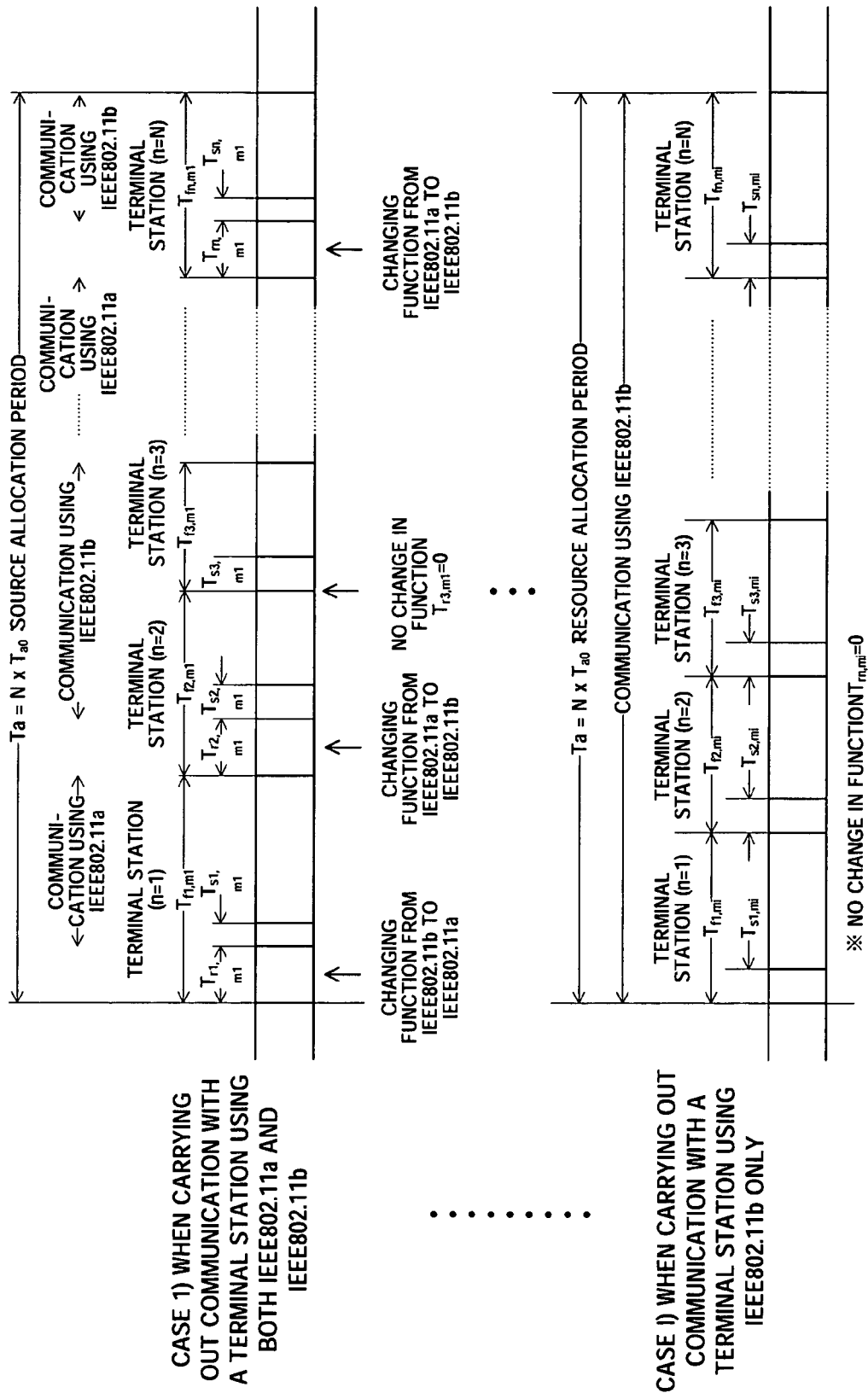
FIG. 4 is a view showing an example of communication time allocation when a multimode control station carries out communication with terminal stations.

In this embodiment, when multimode control station 101 carries out communication with N terminal stations installed within a network, as shown in FIG. 4, assume that communication is carried out such that communication time is allocated in order one at a time for all of the terminal stations as targets, and the time until communication is finished one at a time for al N stations is defined as resource allocation period Ta.

Multimode control terminal station 101 sets Ta=N×Ta0 (seconds), and decides allocation of communication time Tfn for the terminal stations within Ta (seconds). In FIG. 4, case 1) shows an example of a situation where resources are allocated in mixed manner to a communication link using the IEEE802.11a standard and a communication link using the IEEE802.11b standard at the communication links for the terminal stations.

In this case, time Tr1 is required for switching functions at multimode communication section 1012 of multimode control station 101 when switching from a communication link using IEEE802.11a to a communication link using IEEE802.11b. Further, time Tsn is required in order to establish a link at the communication links. On the other hand, case i) shows an example of a situation in the case where IEEE802.11b standard is selected and resources allocated for communication links with all of the terminal stations. In this case, Trn=0 because it is not necessary for multimode control station 101 to change the function of multimode communication section 1012 when switching of the communication links with the terminal stations, and only the time Tsn for establishing a link is required. Further, when transmission for the data capacity to be sent to a terminal station within the time allocated to the terminal station as described above is not complete, it is taken that resource allocation is carried out for the remaining data capacity at the resource allocation period for the next time. In this embodiment, a case where the terminal stations taken as communication targets are two terminal stations of multimode terminal station 102 and IEEE802.11b-compatible terminal station 103 (the case where N=2) is taken as an example, and Ta=2×0.5 seconds=1 second is assumed. In the following, it is taken that the terminal station of n=1 is shown as multimode terminal station 102 and the terminal station of n=2 is shown as IEEE802.11b-compatible terminal station 103.

In is also taken that a set of communication schemes used within the network is denoted as S={s1, s2, sn}, and an example in this embodiment is taken to be S={s1, s2}, where s1 denotes the IEEE802.11a standard, and s2 denotes the IEEE802.11b standard. A set that is a combination of communication schemes used in communication links with the terminal stations is denoted as M={m1, m2, . . . , mi)}, where mi is taken to denote (the communication scheme used in the communication link with terminal station 1, the communication scheme used in the communication link with terminal station 2, . . . , the communication scheme used in the communication link with terminal station N). In this embodiment, two combinations, m1=(S1, S2), and m2=(S2, S2) can be represented. Namely, combination m1 denotes the case of using IEEE802.11a in the communication link with multimode terminal station 102 and using IEEE802.11b in the communication link with IEEE802.11b-compatible terminal station 103, and combination m2 denotes the case of using IEEE802.11b in both the communication link with multimode terminal station 102 and the communication link with IEEE802.11b-compatible terminal station 103.

An example of an operation for carrying out resource allocation relating to communication when multimode control station 101 carries out wireless data transmission for terminal stations 102 and 103 in a network formed with a plurality of terminal stations 102 and 103 within wireless communication area 100 formed as above will be described in the following, using FIG. 4 to FIG. 14. Here, allocation of resources to communication links with terminal stations in this embodiment corresponds to deciding of the communication scheme and transmission speed at communication links with terminal stations and deciding of allocation of time for carrying out communication at communication links.

In the following, the procedure for communication control in accordance with the flowchart of FIG. 5 will be described.

(Step 1)

Multimode control station 101 collects parameters indicating the following actual conditions at communication links with terminal station n (n=1, 2) as a communication target at communication link parameter collecting section 10141.

Communication link quality ($CNR_{n,\ mi}$: using received CNR value as an example)

Permitted QoS parameter ($Pe_{max\_n}$: using permitted maximum bit error rate as an example)

Maximum permitted value for required communication time ($Tt_{max\_n}$)

Not-yet transmitted data amount ($D_n$)

Required mode switching time ($Tr_{n,\ mi}$)

Required link connection time ($Ts_{n,\ mi}$)

A received CNR value at the communication links between multimode control station 101 and terminal station n is estimated at reception quality estimating section 1013 and supplied as communication link quality. Here, a combination of two of m1 and m2 as described above is given as the communication scheme used at communication links, but n and m are assigned to variables in order to denote the respective cases.

At the communication link with multimode terminal station 102, there are cases where two communication schemes of IEEE802.11a(S1) and IEEE802.11b(S2) are used, and reception quality when carrying out communication using these methods is estimated at reception quality estimating section 1013 and the following parameters are obtained. Here, values are assumed as examples for the description of the operations in this embodiment.

$CNR_{1,\ m1}$ ... [received CNR estimated value for the case of carrying out communication using IEEE802.11a at the communication link (n=1) with multimode terminal station 102]

$CNR_{1,\ m2}$ ... [received CNR estimated value for the case of carrying out communication using IEEE802.11b at the communication link (n=1) with multimode terminal station 102]

$CNR_{2,\ m1} = CNR_{2,\ m2}$ ... [received CNR estimated value for the case of carrying out communication using IEEE802.11b at the communication link (n=2) with IEEE802.11b-compatible terminal station 103]

Here, the received CNR estimated value at communication links obtained in this way typically has a lower value due to a larger amount of spatial propagation loss of transmission electromagnetic wave as the distance between multimode control station 101 and terminal stations becomes further away and, conversely, has a higher value due to a smaller amount of spatial propagation loss as the distance becomes closer. Further, at another network wireless station 104 located in proximity to multimode control station 101 within wireless communication area 100, when wireless transmission takes place in the same frequency band, in a situation where a microwave oven 104 operates and unnecessary emissions of a level that cannot be ignored occur, this transmission signal and the unnecessary emissions are mixed as interference components within the same channel, and the received CNR estimated value therefore decreases as a result of equivalent increase of noise component power. CNR value estimation may be carried out periodically with communication links. For example, a configuration may be adopted where received CNR values are estimated using signals received in the past when carrying out data transmission, and are stored, or a transmission for received CNR value estimation use is requested from a terminal station while data traffic communication is not being carried out, and received CNR values are estimated using this and stored.

The permitted QoS parameter is a parameter indicating service quality permitted at the time of data transmission with terminal stations, and here, as an example, a description will be given on the basis that a maximum bit error rate $Pe_{max\_n}$ permitted at the time of data transmission is supplied from QoS parameter extraction section 10161 of application processing section 1016 as a permitted QoS parameter.

Maximum permitted value for required communication time $Tt_{max\_n}$ is a parameter denoting the permitted maximum value for time Tt required to transmit data to the terminal stations. A description will be given on the basis that this parameter is also supplied from QoS parameter extraction section 10161 of application processing section 1016.

Not-yet transmitted data amount $D_n$ is a parameter denoting the amount of data to be communicated to an nth terminal station and, as this not-yet transmitted data amount $D_n$, the total amount of data that is generated when carrying out processing of encoding and a frame configuration corresponding to the predetermined communication scheme on this not-yet transmitted data based on the not-yet transmitted data amount at an application supplied from application processing section 1016 to the nth terminal station is calculated. A description will be given on the basis that this parameter is also supplied from QoS parameter extraction section 10161 of application processing section 1016.

Required mode switching time $Tr_n$ and $_{mi}$ is a parameter denoting the time necessary when switching communication functions of multimode communication section 1012 if multimode control station 101 carries out communication with an nth terminal station when the combination of communication schemes used at communication links is mi. The time required for switching communication operation mode may include, for example, program and setting data reading time in order to change functions at multimode communication section 1012, time required for restarting, oscillation frequency convergence time of a synthesizer at an analog signal processing section and delay time between input and output due to a time constant at a filter. In this embodiment, using the IEEE802.11a method or using the IEEE802.11b method at communication link 151 with multimode terminal station 102 differentiates the mode switching time required at communication links. Further, there are also cases where mode switching is not necessary as a result of the communication scheme used at the communication link with the terminal station allocated last time, and in this case, $Tr_{n,\ mi}$ is "0."

For example, when using a scheme of IEEE802.11a at communication link 151 with multimode terminal station 102 (a combination for a communication scheme for communication links: m1), multimode control station 101 needs to switch communication functions between communication link 151 and communication link 152. Here, assume that the time required for switching functions is 10 milliseconds:

$Tr_{1,\ m1}$=10 milliseconds $Tr_{2,\ m1}$=10 milliseconds

On the other hand, when using IEEE802.11b at both communication links 151 and 152 (a combination for communication schemes at communication links: m2), communication functions need not to be switched at communication links 151 and 152:

$Tr_{1, m2}=0$ seconds
$Tr_{2, m2}=0$ seconds

Required link connection time $Ts_{n, mi}$ is a parameter indicating time required when connecting to a communication link when carrying out communication with an nth terminal station. Here, the time required when connecting to a communication link includes, for example, time spent performing carrier sensing and awaiting transmission that a control station is to carry out before transmitting a packet, and time necessary in transmitting and receiving of packets for control use such as so-called RTS (Request To Send) and CTS (Clear To Send), etc. In this embodiment, the values of the required link connection times $Ts_{n, mi}$ differ depending on whether using a communication scheme using the IEEE802.11a standard or a communication scheme using the IEEE802.11b standard with a terminal station. Here, a case of parameters shown in the following is taken as an example.

$Ts_{1, m1}=0.5$ milliseconds (example of link connection time in IEEE802.11a)
$Ts_{2, m1}=1$ millisecond (example of link connection time in IEEE802.11b)
$Ts_{1, m2}=Ts_{2, m2}=1$ millisecond (as above)

Regarding the values for required mode switching time $Tr_{n, mi}$ and required link connection time $Ts_{n, mi}$ when the values can be estimated in advance in accordance with the communication link used and the communication scheme, this may be stored in advance at communication link parameter collecting section 10141 and read out. Parameters are updated every time when estimation in advance is not possible or changes occurs every time according to conditions.

Including the example of values shown above, as an example of parameters collected at communication link parameter collecting section 10141, the following procedure will be described on the assumption that the following kinds of values are collected.

Parameters collected for communication link 151 with multimode terminal station 102 (n=1):

$D_1=100$ megabytes
$Pe_{max\_1}=1.0E-06$
$Tt_{max\_1}=160$ seconds
$CNR_{1, m1}=17$ dB
$Tr_{1, m1}=10$ milliseconds
$Ts_{1, m1}=0.5$ milliseconds
$CNR_{1, m2}=17$ dB
$Tr_{1, m2}=0$ seconds
$T_{s1, m2}=1$ millisecond Parameters collected for communication link 152 with IEEE802.11b-compatible terminal station 103 (n=2):

$D_2=100$ megabytes
$Pe_{max\_2}=1.0E-05$
$Tt_{max\_2}=240$ seconds
$CNR_{21, m1}=CNR_{2, m2}=20$ dB
$Tr_{2, m1}=10$ milliseconds
$Td_{2, m1}=1$ millisecond
$Tr_{2, m2}=0$ seconds
$Ts_{2, m2}=1$ millisecond (Step 2)

Figure 6:
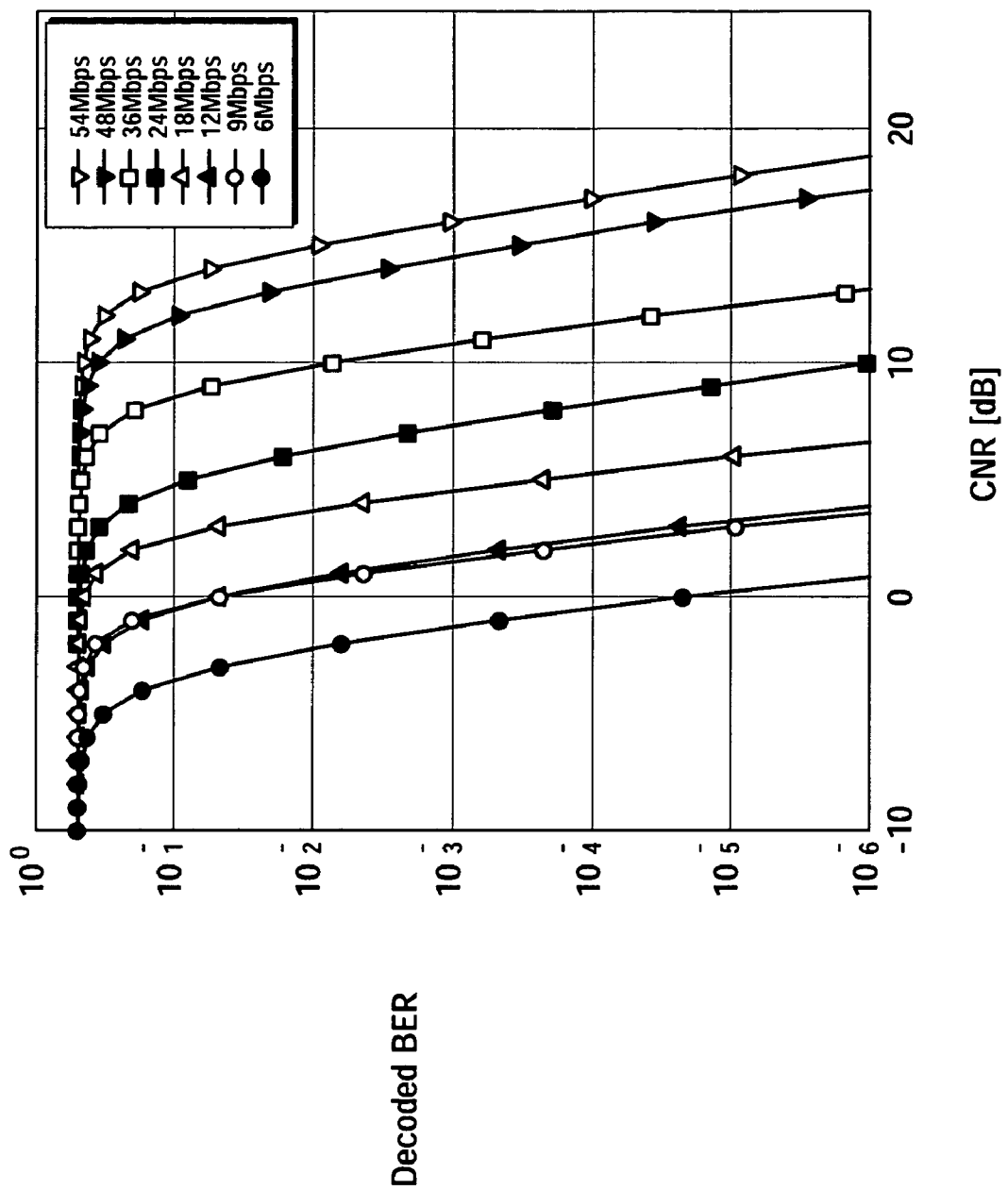
FIG. 6 is a view showing an example of a relationship between reception CNR values and reception bit error rate (after error correction decoding) in an IEEE802.11a standard communication scheme.

In (step 1) described above, candidate combinations for the setting specification for communication schemes and transmission speed etc. used at communication links are selected at candidate method selecting section 10142 based on collected parameters for communication links with terminal stations by communication link parameter collecting section 10141, and are supplied to resource allocation deciding section 10143. Specifically, candidate scheme selection section 10142 selects combinations of candidates for communication schemes and transmission speed used in communication links from received CNR values $CNR_{n, mi}$ and permitted maximum bit error rate $Pe_{max\_n}$ at communication links. Upon selection, at multimode control station 101, data relating to the characteristics of the received bit error rate (Pbs) for the received CNR is stored in advance as shown in FIG. 6 and FIG. 7, a maximum transmission rate $B_n$ that is able to fulfill the permitted maximum bit error rate $Pe_{manx\_n}$ under the reception quality conditions due to the received CNR value for the current state based on this data is selected, and bit error rate $Pe_n$ assumed at this time is obtained.

For example, at communication link 151 with multimode terminal station 102, it is possible to select the communication scheme from two communication schemes of IEEE802.11a and IEEE802.11b, and transmission speed $B_n$ and assumed bit error rate $Pe_n$ as candidates for respective communication schemes are set. First, assume that, when selecting the IEEE802.11a communication scheme (corresponding to the case of m1), if $CNR_{1, m1}$ is 17 dB as assumed in step 1, the mode for which the bit error rate is a maximum transmission speed that is less than the permitted maximum bit error rate $Pe_{max\_1}$ is 36 Mbps from the data shown in FIG. 6, and in this case, the bit error rate $Pe_{1, m1}$ is assumed to be a value of approximately 1e-10.

Figure 7:
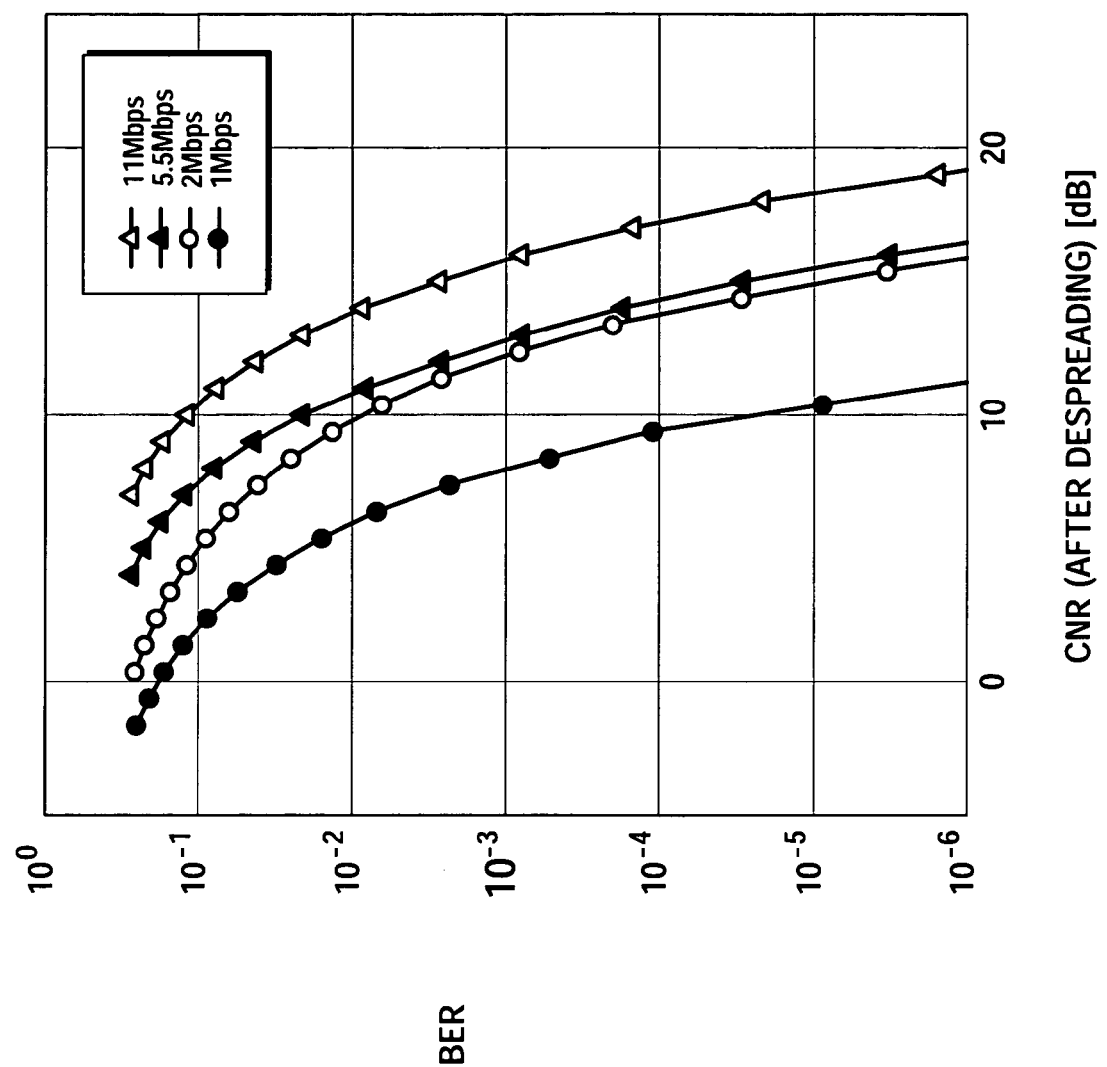
FIG. 7 is a view showing an example of a relationship between reception CNR values and reception bit error rate (before despreading) in an IEEE802.11a standard communication scheme.

Next, when selecting the IEEE802.11b communication scheme, since $CNR_{1, m2}$ is 15 dB, the maximum transmission speed for which the bit error rate is less than the maximum permitted bit error rate $Pe_{max\_1}$ is a transmission mode of 5.5 Mbps from the data shown in FIG. 7, and in this case, the bit error rate $Pe_{1, m2}$ is assumed to be a value of approximately 1e-7.

Similarly, with communication link 152 with IEEE802.11b-compatible terminal station 103, the used communication scheme is only IEEE802.11b. Accordingly, if $CNR_{2, m1}$ is 20 dB as assumed in step 1, the maximum transmission speed $B_2$ for which the bit error rate is less than the permitted maximum bit error rate $Pe_{max\_2}$ is 11 Mbps from FIG. 7, and in this case, bit error rate $Pe_{2, mi}$ is assumed to be a value of a place of approximately 1e-07.

In this way, candidate method selecting section 10142 selects communication schemes and transmission speeds that are candidates for communication link 151 with multimode terminal station 102 and communication link 152 with IEEE802.11b-compatible terminal station 103 respectively in the manner shown below.

(Combination of Communication Schemes: m1)
Communication link 151
   Communication scheme: IEEE802.11a
   Transmission speed $B_1$: 36 Mbps
   Bit rate error $Pe_{1, m1}$: Approximately 1E-10
Communication link 152:
   Communication scheme: IEEE802.11b
   Transmission speed $B_2$: 11 Mbps
   Bit rate error $Pe_{2, m1}$: Approximately 1E-7
(Combination of Communication Schemes: m2)
Communication link 151
   Communication scheme: IEEE802.11b
   Transmission speed $B_1$: 5.5 Mbps
   Bit rate error $Pe_{1, m2}$: Approximately 1E-7
Communication link 152:
   Communication scheme: IEEE802.11b
   Transmission speed $B_2$: 11 Mbps
   bit rate error $Pe_{2, mi}$: Approximately 1E-7

(Step 3)

At resource allocation deciding section 10143, first, an objective function $Z_{mi}$ denoting throughput per resource allocation period within a network defined by the following equation is set using a communication scheme, transmission speed and assumed bit error rate used at communication links selected by processing of step 2 at candidate scheme selection section 10142.

[Equation 1]

$$Z_{mi} = \frac{\left\{\sum_{n=1}^{N} B_{n,mi} \times (Tf_{n,mi} - (Tr_{n,mi} + Ts_{n,mi})) \times (1 - Pe_{n,mi})\right\}}{Ta} \quad (1)$$

Here, $Tf_{n, mi}$ of equation (1) denote time allocated to communication with terminal station n when the combination of communication schemes used at communication links is mi. Further, in equation (1), a numerator term denotes total amount of data sent without bit errors per resource allocation period within the network. One characteristic of the present invention is to take into consideration a term for time that is required, other than for data transfer denoted by required function switching time and required link connection time upon calculation of this data transmission amount.

On the other hand, the following equation is set as restricting conditions for obtaining an optimum value in the objective function of equation (1).

[Equation 2]

$$mi \in S \quad (2)$$

[Equation 3]

$$(I_{n,mi} - 1) \times Ta + Tf_{n,mi} \leq Tt_{max_n} \quad (3)$$

[Equation 4]

$$I_{n,mi} = \left\lfloor \frac{D_n}{B_{n,mi}\{Tf_{n,mi} - (Tr_{n,mi} + Ts_{n,mi})\}} \right\rfloor \quad (4)$$

where $\lfloor x \rfloor$ denoting a minimum integer larger than x.

[Equation 5]

$$Pe_{n,mi} \leq Pe_{max_n} \quad (5)$$

In equation (4), the number of repeated transmissions required until completion of transmission of all the data is calculated and a term for time that is required, other than for data transmission, that is, for required mode switching time Tr and required link connection time T2 is also considered.

(Step 4)

At resource allocation deciding section 10143, combination mi of communication schemes used at communication links, transmission speed $B_n$, and time allocation $Tf_{n, mi}$ are decided in such a manner as to make objective function $Z_{mi}$ relating to throughput value per resource allocation period defined in equation (1) to maximum, based on the restricting conditions of equation (2) to equation (4) set in step 3. Specifically, it is possible to decide this based on the procedure described below.

Figure 8:
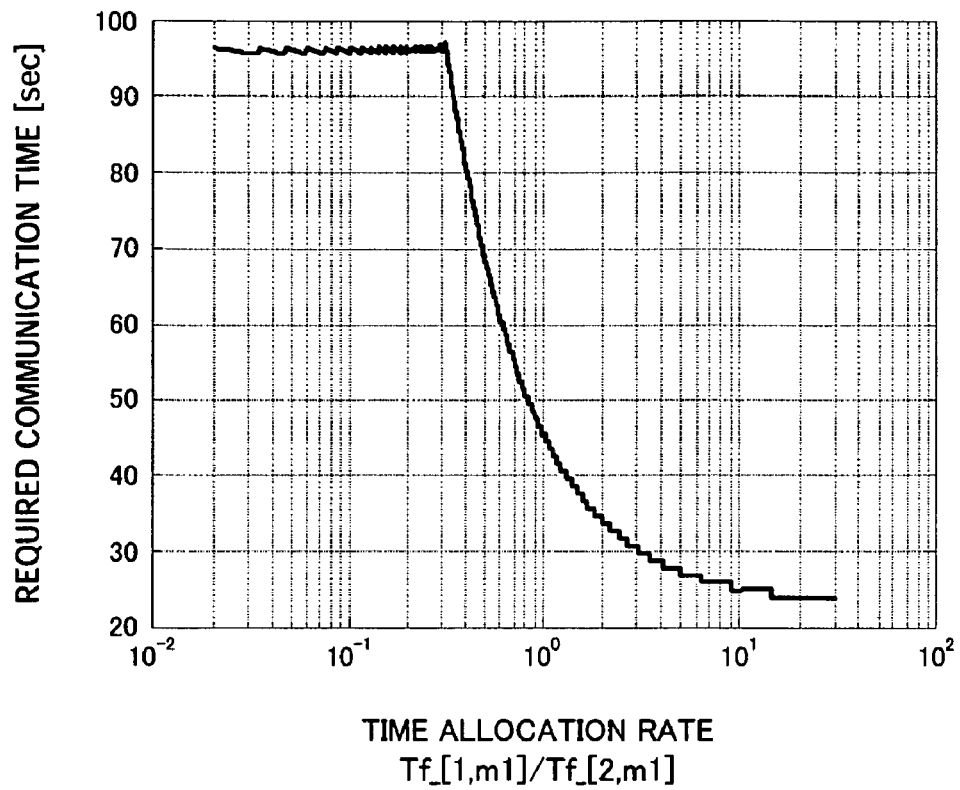
FIG. 8 is a view showing an example of a characteristic relating to required communication time with a multimode terminal station.
Figure 9:
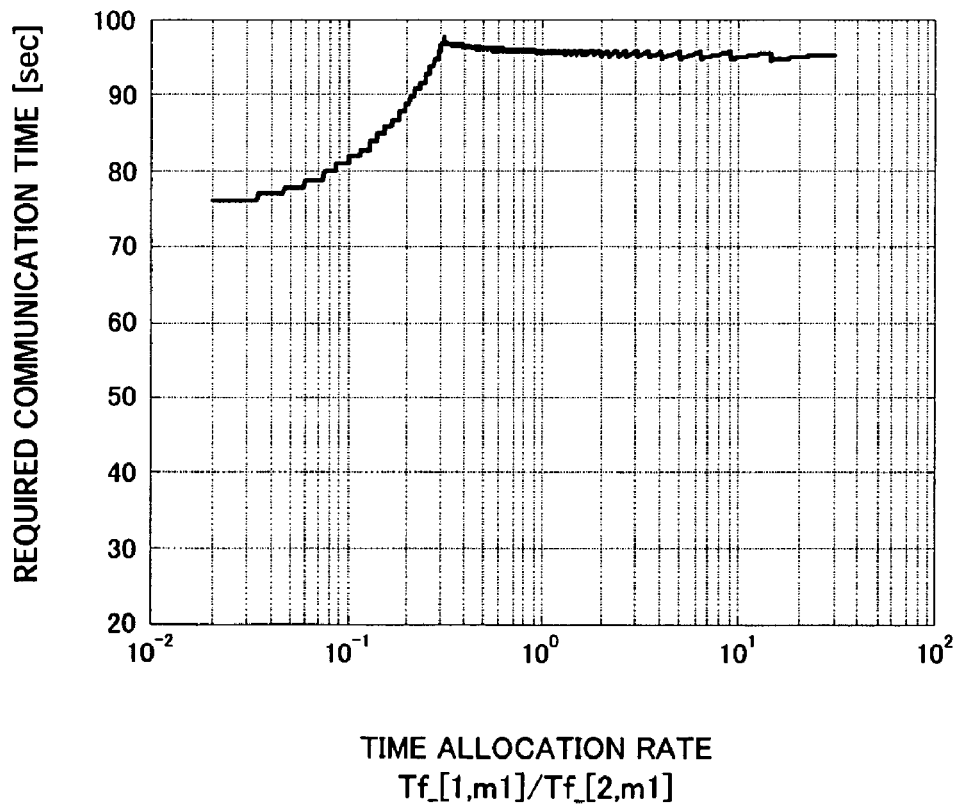
FIG. 9 is a view showing an example of a characteristic relating to required communication time with an IEEE802.11b-compatible terminal station.
Figure 10:
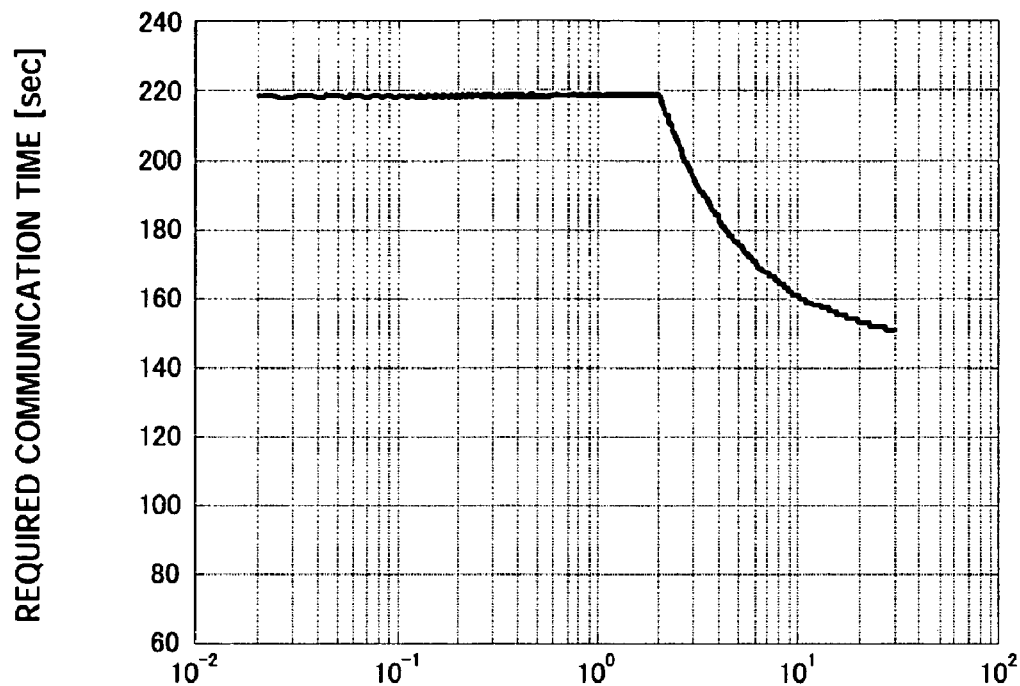
FIG. 10 is a view showing an example of a characteristic relating to required communication time with a multimode terminal station.
Figure 11:
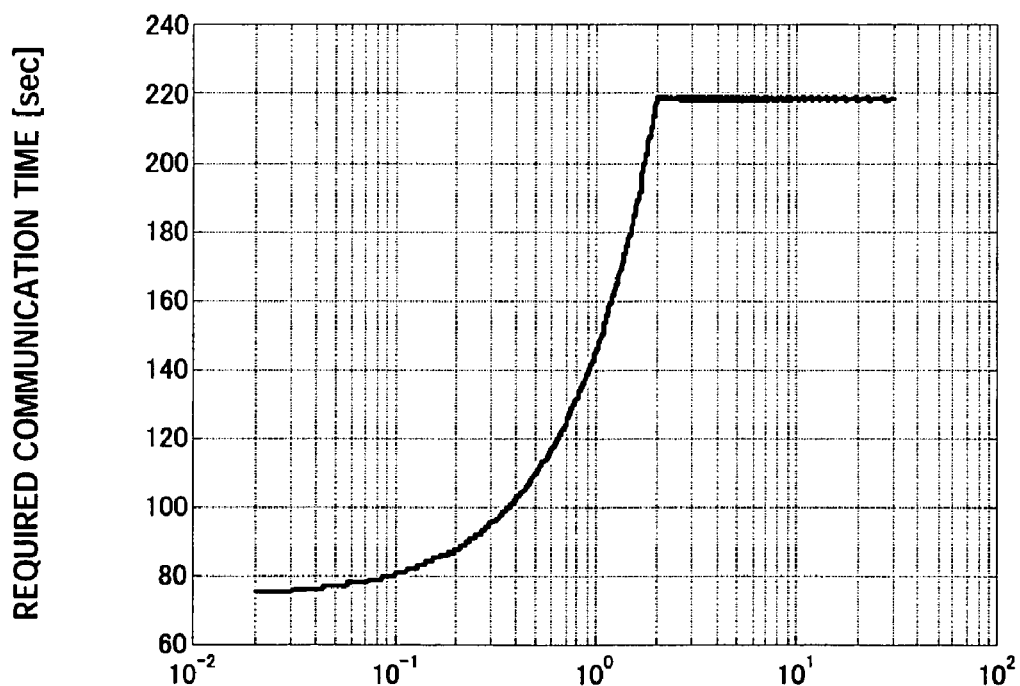
FIG. 11 is a view showing an example of a characteristic relating to required communication time with an IEEE802.11b-compatible terminal station.

Resource allocation deciding section 10143 first determines whether or not the restriction conditions of equation (5) are satisfied for all of the combinations of communication schemes used for the communication links. Namely, when conditions assumed in this embodiment, a determination is carried out as to whether or not restriction conditions of equation (5) are satisfied for m1 and m2 satisfying the restriction conditions of equation (4) and communication links n with terminal stations. For example, when the combination of communication schemes used at the communication links is m1, the required communication time for communication with multimode terminal station 102 is the characteristics as shown in FIG. 8. Further, required communication time at IEEE802.11b-compatible wireless station 103 is the characteristics as shown in FIG. 9. On the other hand, when the combination of communication schemes used at the communication links is m2, the required communication time for communication with multimode terminal station 102 is the characteristic as shown in FIG. 10. Moreover, required communication time for communication with IEEE802.11b-compatible wireless terminal station 103 is the characteristics as shown in FIG. 11. In FIG. 8 to FIG. 11, the vertical axis denotes required communication time, and the horizontal axis denotes a ratio $R=Tf_{1, mi}/Tf_{2,mi}$ of time $Tf_{1, m1}$ allocated to communication with multimode terminal station 102 (n=1) and time $Tf_{2, m1}$ allocated to communication with IEEE802.11b-compatible terminal station 103 (n=2) in objective function (1).

From FIG. 8 and FIG. 9, when the combination of communication schemes used in the communication links is m1, required communication time permitted maximum value $Tt_{max\_n}$ is not exceeded regardless of the time allocation rate R for terminal stations of either the multimode terminal station 102 or the IEEE802.11b-compatible terminal station 103, and time allocation is therefore possible within the entire range. On the other hand, when the combination of communication schemes used at the communication links is m2, the required communication time permitted maximum value $Tt_{max\_2}$=240 seconds is not exceeded regardless of the time allocation rate R relating to communication with IEEE802.11b-compatible terminal station 103. This means that setting of the all the time allocation rates are possible, but with regards to communication with IEEE802.11b-compatible terminal station 103, when the time allocation rate R is not less than 1.2, it is not possible to complete communication within the required communication time permitted maximum value $Tt_{max\_1}$=160 seconds. Restriction conditions of a time allocation rate $R=Tf_{1, mi}/Tf_{2, mi} \leq 1.2$ are therefore obtained.

Figure 12:
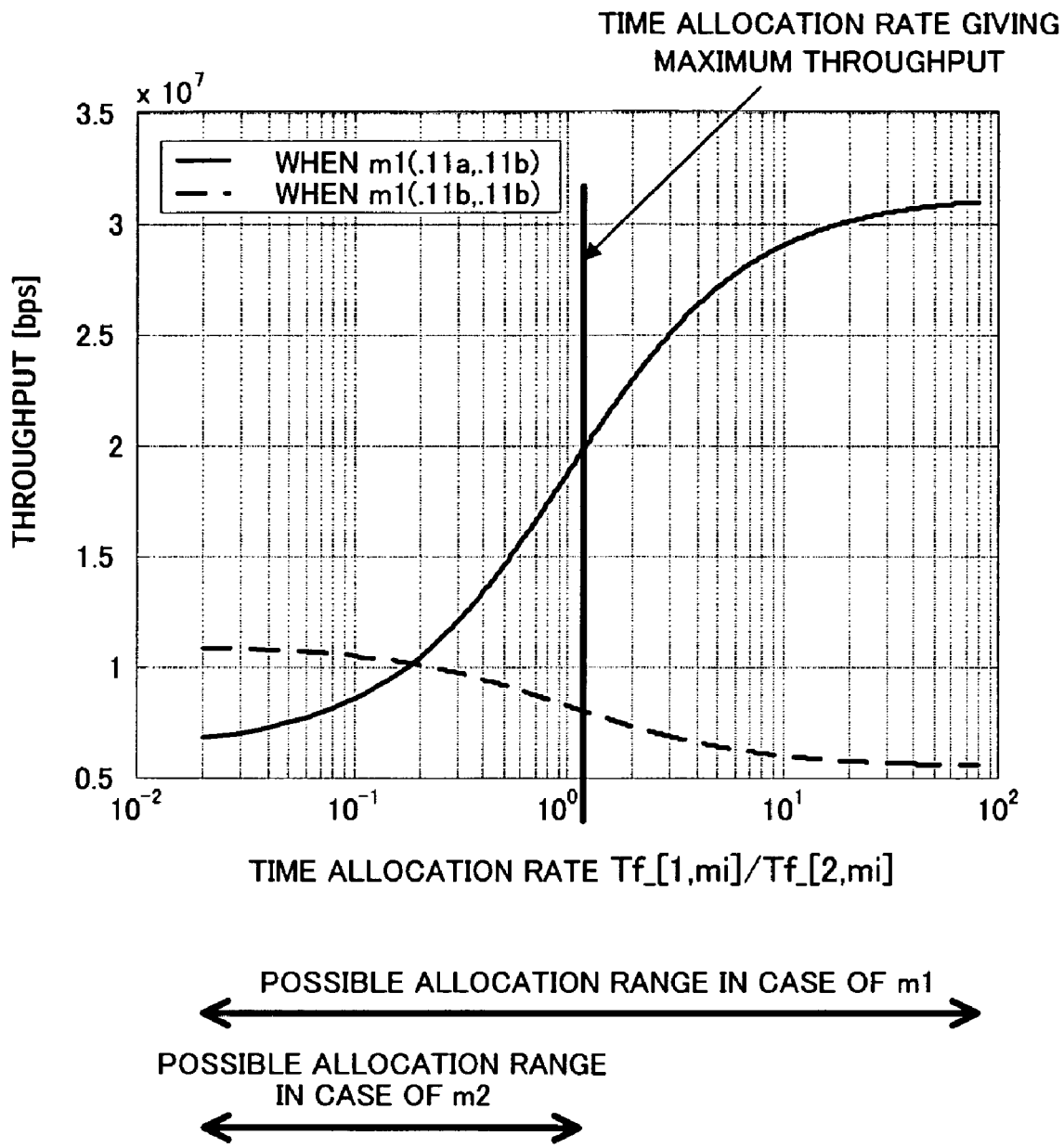
FIG. 12 is a view showing an example of characteristics of a target function relating to throughput.

As shown above, the characteristics shown in FIG. 12 are obtained when objective function (1) is calculated for combinations m1 and m2 for communication schemes used at the communication links in addition to obtaining restriction conditions for the time allocation rate R. In FIG. 12, the vertical axis shows throughput value per resource allocation time within the network, and when a time allocation rate R of approximately 1.2 and the combination of the communication schemes of m1, a maximum throughput is obtained within the range obtained from the restriction conditions. It is understood that a throughput of approximately 20 Mbps is obtained at this time. Since resource allocation period Ta=1 is assumed, time allocation is decided such that time allocation $Tf_{1, m1}$=approximately 545 milliseconds is allocated to the communication link with multimode terminal station 102, and time allocation $Tf_{2, m1}$=approximately 455 milliseconds is allocated to the communication link with IEEE802.11b-compatible terminal station 103.

As described above, information for the communication scheme S, transmission speed $B_{n, mi}$, and time allocation rate $Tf_{n, mi}$ used at the communication links decided by resource allocation deciding section 10143 is supplied to communication control section 1015.

(Step 5)

At communication control section 1015, control signal 201 for switching over the communication function of multimode communication section 1012 and control signal 202 for a communication operation are outputted using the information relating to the communication scheme S, transmission speed $B_{n,\ mi}$, and time allocation rate $Tf_{n,\ mi}$ used at the communication links decided by resource allocation deciding section 10143.

Figure 13:
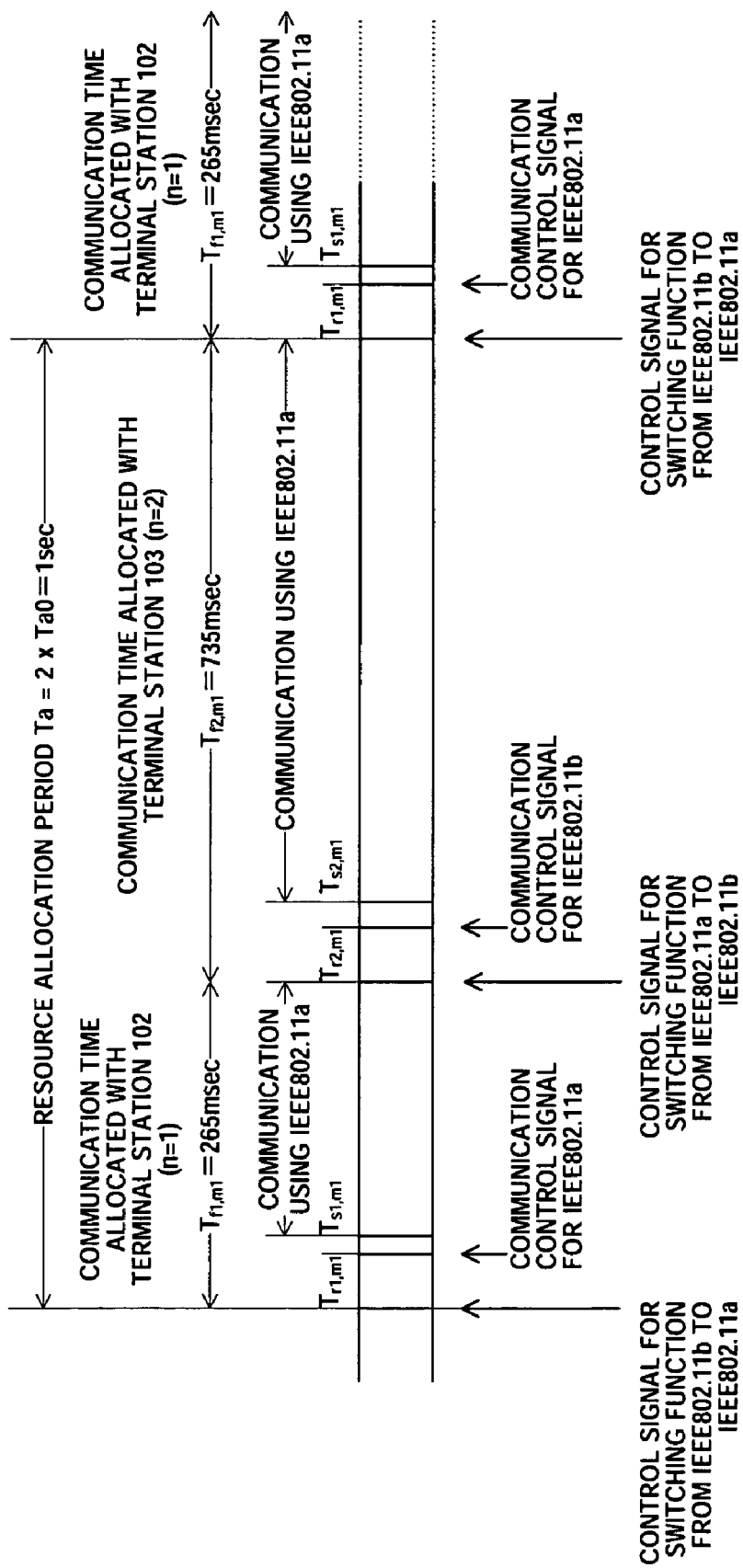
FIG. 13 is a view showing an example of the operations for communicating with terminal stations based on determined communication resource allocation.

Specifically, communication is carried out using the time allocation as shown in FIG. 13 based on decision of the resource allocation in step 4, the control signal for switching of the function at the timing shown by an arrow in the drawing and a control signal for the communication operation are outputted to multimode communication section 1012. Switching functions of reconfigurable digital signal processing section 10123 and switching between IEEE802.11a-compatible analog signal processing section 10121 and IEEE802.11b-compatible analog signal processing section 10122 based on these signals is then carried out.

According to the above configuration and operation, parameters denoting conditions at the communication links are collected while carrying out communication with multimode control station 101 using a plurality of types of communication schemes for a plurality of terminal stations within a network. Communication resource allocation is then decided in such a manner that throughput becomes a maximum per resource allocation period based on these parameters. Control of communication with the terminal stations is then carried out based on these determination results and communication is carried out, so that it is possible to increase total throughput of communication traffic within the network. Further wireless communication resources within this environment are effectively utilized. This makes it possible to reduce the influence of mutual interference with other networks existing in the neighboring area.

The parameters used in the above embodiment do not have to be the specific examples described above, and application of parameters based on other definitions is also possible if indicating the same characteristics as the respective parameters. For example, the case where permitted maximum bit error rate $Pe_{max\_n}$ is used as the permitted QoS parameter is described but this is by no means limited and, for example, permitted maximum packet error rate $Pe_{max\_n}$ may be defined, so as to define an assumed packet error rate $Ppe_{n,\ mi}$ of use in place of the assumed bit error rate $Pe_{n,\ mi}$ at the communication links. In this case, in step 2, when obtaining transmission speed and an assumed packet error rate $Ppe_{n,\ mi}$ from the characteristic data of FIG. 6 and FIG. 7 in step 2 or when obtaining the value for equation (1) in step 3, $Ppe_{n,\ mi}$ denoting packet error rate is used in stead of the bit error rate $Pe_{n,mi}$. In this case, packet error rate $Ppe_{n,\ mi}$ can be obtained though conversion by using a conversion equation such as shown in the following equation based, for example, on received bit error rate $Pe_{n,\ mi}$. In the next equation, 1 denotes the number of bits constituting one packet.

[Equation 6]

$$P_{pe_{n,mi}} = 1 - (1 - Pe_{n,mi})^l \quad (6)$$

Further, in the procedure of step 3 and step 4, the case of carrying out operations using bit error rate $Pe_{n,\ mi}$ assumed for the communication links during calculation of the objective function and the restriction conditions equation is described but this is by no means limiting, and, for example, when the assumed error rate is an extremely small value, it is possible reduce the number of operations by approximating this to zero during operations.

Further, received CNR value is estimated and used as a parameter denoting quality of a communication link but the present invention is by no means limited to this, and other values may also be used if including the parameter indicating quality of a communication link. For example, a configuration estimating and using a ratio of received carrier wave power to interference wave power (CIR) may also be adopted, or received data bit error rate (BER) or packet error rate (PER) may be obtained and used.

Further, in this embodiment, although the case of a configuration has been described where multimode communication section 1011 is configured with IEEE802.11a-compatible analog signal processing section 10121, IEEE802.11b-compatible analog signal processing section 10122 and reconfigurable digital signal processing section 10123, the present invention is by no means limited to this, and a configuration is possible where control information required to change wireless processing functions at multimode communication section 1011 and control information required in communication operations may be supplied appropriately from outside and controlled. The detailed configuration contents and design specification have no influence on the present invention.

Further, antenna 1011 and antenna 1021 both have multiple oscillation type configurations but the configuration of the present invention is by no means limited to this. Other configurations may also be adopted providing that the configuration is compatible with wireless frequency bands used by a plurality of communication schemes to be compatible with. However, when adopting a configuration where compatible frequency bands are switched by switching antenna structures, and the time required for switching cannot be ignored compared to the time Tr required in switching functions at the multimode communication section, it is necessary to also take the time required to switch over corresponding frequencies of the antenna into consideration when estimating the Tr. Further, although antenna 1011 and antenna 1021 have the same structure, it is not necessary for the antenna structures at the control station and terminal station to be the same and the details of these structures may be different if the specifications required to provide compatibility with different communication schemes are satisfied.

Further, in the embodiment described above, although an example of a configuration and operation when communication resource allocation for downlinks from a multimode control station to the terminal stations has been described, the present invention is by no means limited to downlinks, and may also be applied to uplinks. In this case, it is also possible to implement the present invention for an uplink if a multimode control station temporarily collects communication requests and permitted QoS parameters required in requested communications from the terminal stations, decides communication resource allocation for the communication links, and carries out control by reporting the decided control information to the terminal stations via downlinks.

Further, in this embodiment, although a description is given using equation (2) to equation (5) as restriction conditions, all of the restriction condition equations are not always necessary, and some restriction condition equations may be omitted depending on the system to which these equations are applied and the service content. Further, an optimal solution may be obtained by adding further restriction conditions depending on the system to which these equations are applied and the service content. For example, when providing a service such as streaming moving image data within a network, parameters relating to data transmission speed that is guaranteed at lowest and relating to maximum transmission delay time that is permitted may be defined and set as restriction conditions and used in addition to equation (2) to equation (5) when obtaining an optimal solution.

Further, in the embodiment described above, in order to simplify the description, although a description has been given taking the number of terminal stations N multimode control station 101 takes as communication targets as 2, the present invention is by no means limited to this number of terminal stations, and the number of terminal stations may also be equal to or more than three. However, when the number of terminal stations is increased, the number of elements of combinations M for the selectable communication schemes also increases. The combinations for the cases of calculating restriction conditions and target functions increase accordingly, and the amount of calculation increases. In this way, in a technique for obtaining an optimum solution after satisfying restriction conditions for objective functions for a situation where a large number of parameters are included, it is possible to apply a solution method based on mathematical programming such as linear programming, non-linear programming or dynamic programming, and it is further possible to carry out communication control by obtaining optimal solutions using so-called dovetail algorithms or genetic algorithms.

Here, the embodiment in a case of taking the number of terminal stations to be N and using dynamic programming for optimization of a communication time allocation rate for communication links $a_n$. Objective function $f_N(k_N)$ in this case can then be expressed using equation (7), equation (8) and equation (9), and restriction conditions in optimization can be denoted by equation (10). Further, when including transmission speed that is guaranteed at lowest to the restriction conditions, equation (11) may be added as the restriction conditions.

[Equation 7]

$$f_N(k_N) = \max[TH_N], k_N = \sum_{n=1}^{N} a_n = 1 \quad (7)$$

[Equation 8]

$$TH_N = \frac{\left\{\sum_{n=1}^{N} th_n(a_n)\right\}}{T_a} \quad (8)$$

[Equation 9]

$$th_n(a_n) = B_n \times (1-Pe_n) \times \{T_a \times a_n - (Tr_n + Ts_n)\} \quad (9)$$

[Equation 10]

$$\sum_{n=1}^{N} a_N = 1 \; (a_n > (Tr_n + Ts_n)/T) \quad (10)$$

[Equation 11]

$$th_n(a_n)/(T \times B_n) > B_{n\,min} \quad (11)$$

Here, $a_n$ denotes communication time allocation rate for communication links with terminal station n, $k_N$ denotes resources allocated to communication time for terminal station number N, $th_n$ denotes communication throughput at a communication link with terminal station n, and $TH_N$ denotes total throughput at all communication links within the network.

At this time, according to optimization theory, equation (7) can be denoted as the function recursive equation shown in equation (12).

[Equation 12]

$$\begin{cases} f_n(k_n) = \max[th_n(a_n) + f_{n-1}(k_n - a_n)], \, (n = 2, 3, \ldots, N) \\ f_1(k_1) = \max[th_1(a_1)], \, a_1 = k_1 \end{cases} \quad (12)$$

A procedure for obtaining an optimal solution for the objective function denoted in this manner is the same as an example procedure disclosed in "optimization algorithms" by Nagao Tomoharu (Shokodo, 2000) pp. 38 to 52, and derivation can be achieved based on this procedure.

As described above, an optimal solution for time rate allocated to communication with terminal stations can be obtained using dynamic programming even for the case where the number of terminal stations N is equal to or more than three, so that it is possible to carry out communication control.

Further, the present invention can also be applied to the case where the number of terminal stations taken as the data transmission targets changes while carrying out communication at multimode control station 101. In such a case, the number of terminal stations taken as a resource allocation target may change based on, for example, control flow shown in FIG. 14 every time when a communication resource allocation period elapses.

Figure 14:
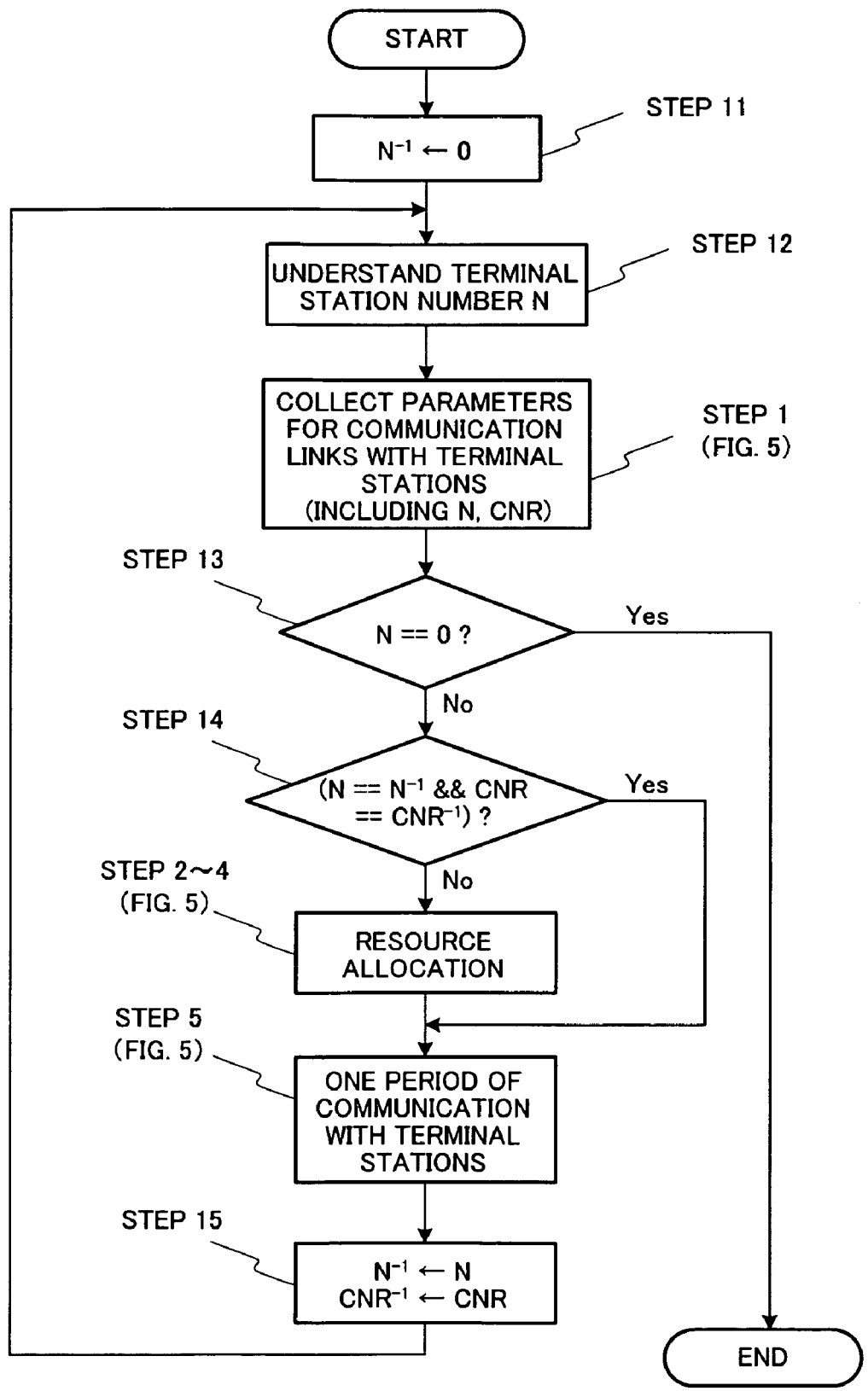
FIG. 14 is a flowchart showing an example of a control procedure when the number of terminal stations N changes.

The control flow of FIG. 14 will be briefly described. First, after starting processing to reset the number of terminal stations N to "0" in step 11, the number of terminal stations N is understood in step 12. Next, parameters for communication links with the terminal stations are collected by carrying out step 1 described in FIG. 5, and the processing proceeds to step 13. In step 13, it is determined whether or not the number of terminal stations N is "0" and when the number of terminal stations N is 0, the processing ends. On the other hand, when the number of terminal stations is not "0," in step 14, a determination is made as to whether or not the number of terminal stations N is the same as for the previous time and whether CNR is the same as for the previous time. When either one is different to the previous time, communication resource allocation is carried out anew by carrying out step 2 to step 4 described in FIG. 5, the processing proceeds to step 5 and one period of communication is carried out with the terminal stations based on the allocation described in FIG. 5. At the same time, when affirmative results are obtained in step 14, steps 2 to 4 are not carried out, and communication is carried out for one period with the terminal stations based on allocation conditions for the previous time in step 5. Continuing on to step 15, new values are set for the number of terminal stations N and CNR, and the processing returns to step 12.

Embodiment 2

Figure 37:
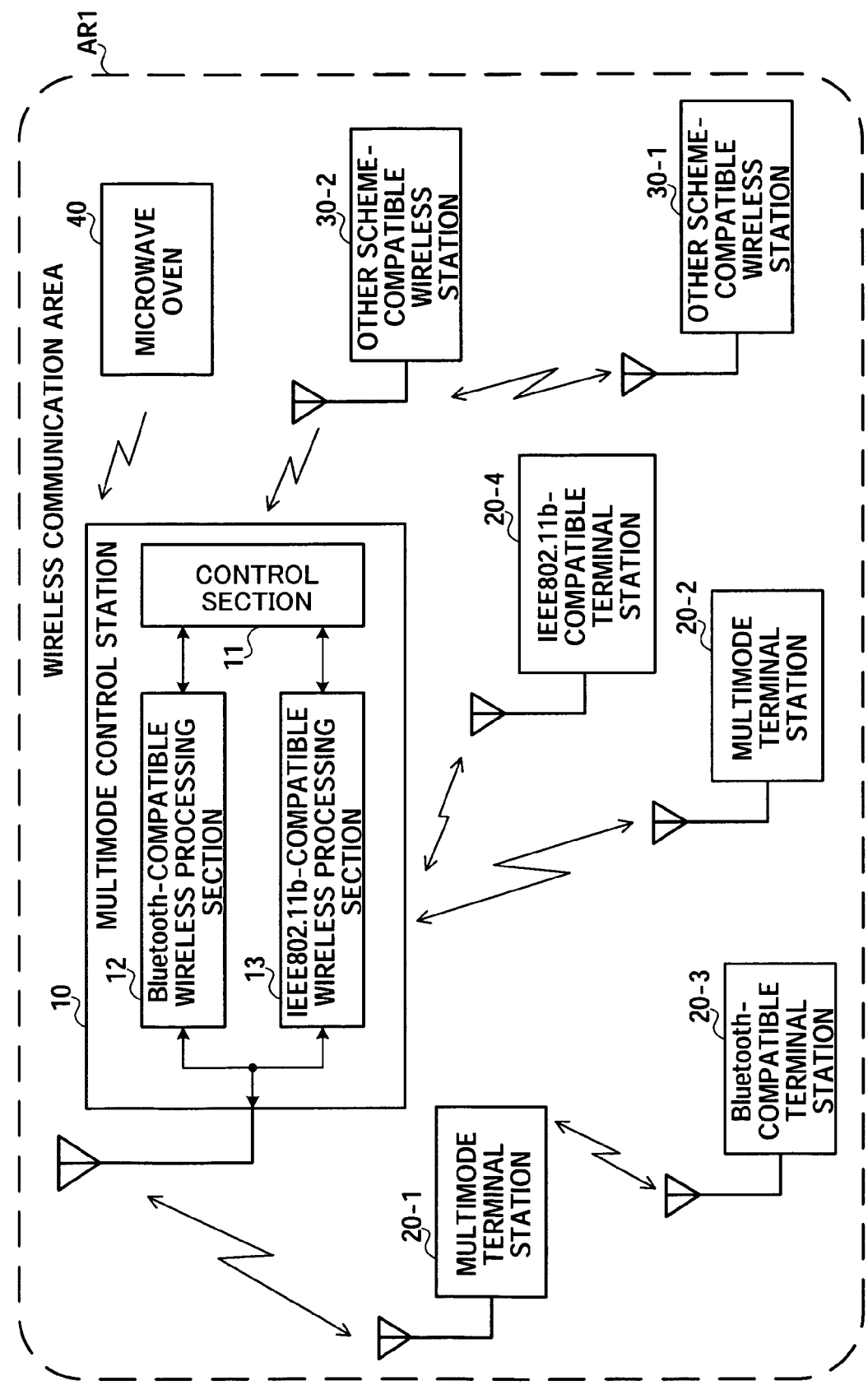
FIG. 37 is a view showing an example of a wireless communication system using a multimode wireless station of the related art.

In this embodiment, an embodiment relating to communication control will be described where the number of terminal stations for which data transmission is carried out within a network changes while controlling communication so that a communication throughput value in a network of the embodiment 1 is maximized, and communication schemes used at the communication links between a multimode control station and a plurality of multimode terminal stations are dynamically switched. The configuration of the network is fundamentally the same as shown in FIG. 1 in the embodiment 1 or that further typified in FIG. 37. A difference from the embodiment 1 is control content in communication time allocation of control section 11 at multimode control station 10, and this control content will be described in the following.

Figure 15:
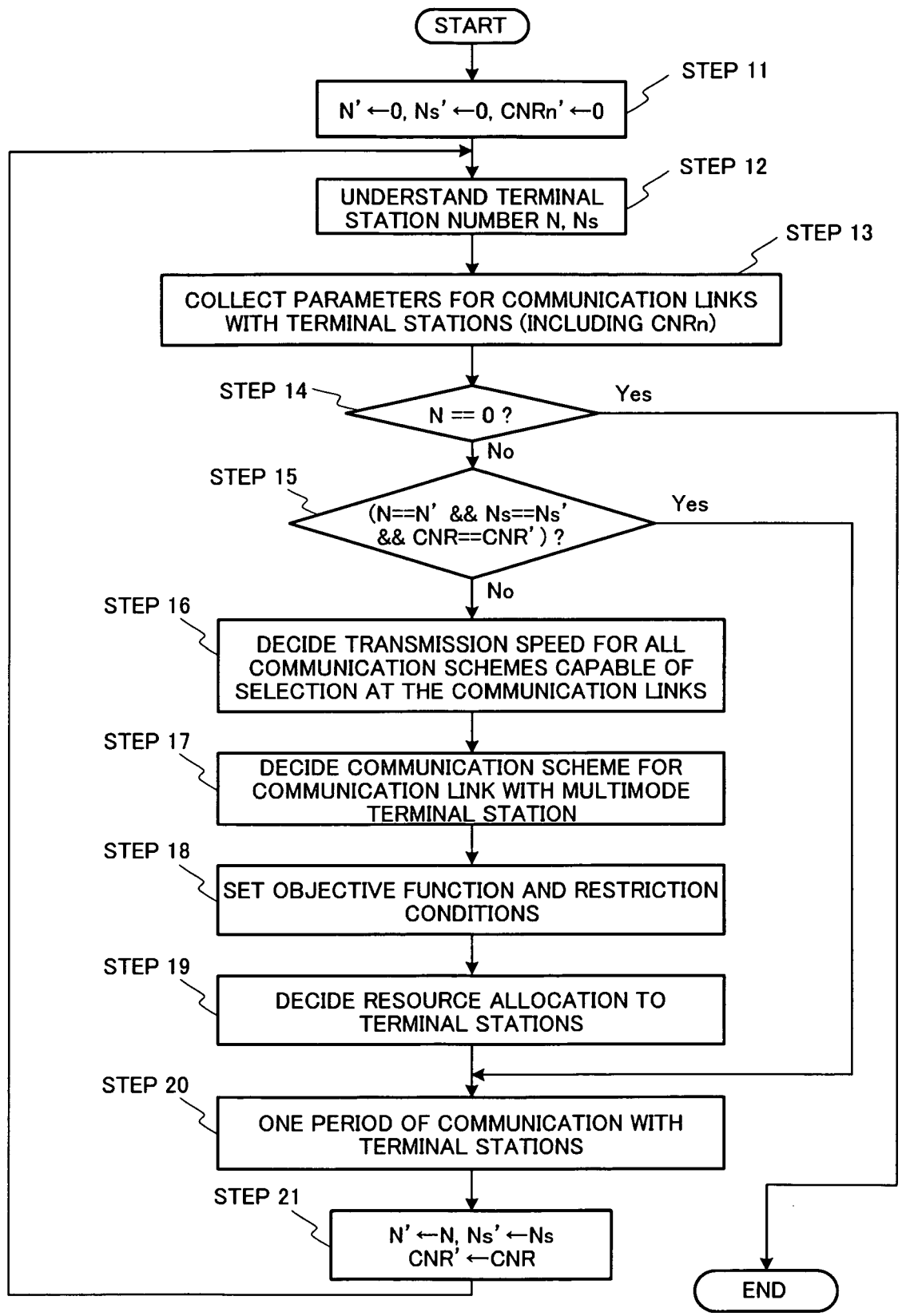
FIG. 15 is a flowchart showing a control procedure for the embodiment 2.

FIG. 15 shows a flowchart for control when carrying out control of communication time allocation at control section 11 of this embodiment. In this embodiment, the total number of terminal stations within the network is denoted as N, and the number of these terminal stations having a multimode function is denoted as Ns. Further, communication quality at communication links with terminal stations n is denoted as CNRn. Moreover, with respect to the respective control parameters, the parameters used at the time of the control loop for the previous time are held as variables to which ' (dashes) are assigned.

(Step 11)

Parameters relating to communication control of the system are initialized. Specifically, this step includes an operation of initializing N', Ns' and CNRn' to "0" as parameters.

(Step 12)

The total number of terminal stations N that needs data transmission of the terminal stations under the management of the multimode control station 10, and among them, the number of terminal stations Ns having a multimode function are understood.

(Step 13)

Figure 5:
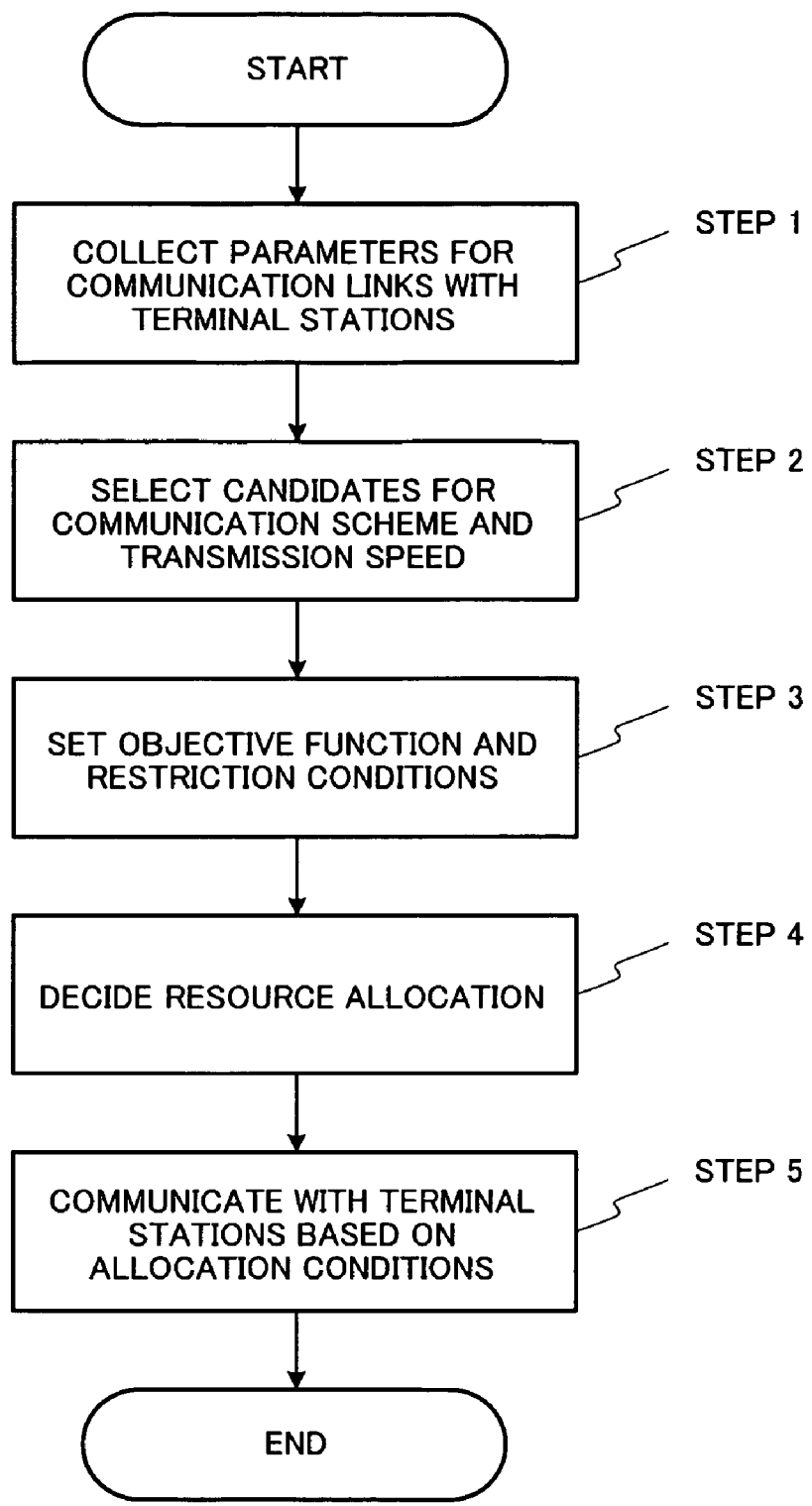
FIG. 5 is a flowchart showing a procedure for resource allocation and communication control.

Like the operation of step 1 of FIG. 5 described in the embodiment 1, at communication link parameter collection section 10141 of multimode control station 101, parameters relating to the communication links with terminal stations n that need data transmission are collected.

(Step 14)

A determination is then made as to whether or not a plurality of terminal stations N that need data transmission remain, that is, it is determined whether or not N is "0." When "0," the series of communication controls ends. If not "0," the processing proceeds to step 15.

(Step 15)

Whether or not the number of terminal stations N that need data transmission, the number of terminal stations having a multimode function Ns among them, and communication link quality value CNRn of terminal stations n is the same as the control loop for the previous time is determined by comparison with the held N', Ns' and CNRn'. When all are the same, it is not necessary to change the communication scheme selected for the communication links with the terminal stations and the communication time allocation time from the previous time. The processing skips step 16 to step 19, and proceeds to the operations of step 20. When the parameters are different in the above determination, a change occurs in the communication conditions and it is necessary to change the communication control content, and the processing proceeds to step 16.

(Step 16)

Transmission speed is then decided for all of the communication schemes that can be selected at the communication links at candidate scheme selection section 10142, based on parameters for the communication links with the terminal stations collected by communication link parameter collecting section 10141. Specifically, the fastest transmission speed satisfying the permitted maximum bit error rate of the transmitted data is decided based on the CNR estimation value per communication scheme at the communication links.

(Step 17)

The communication scheme for which the highest transmission speed is obtained is then selected from the plurality of communication scheme candidates for which the transmission speed is decided in step 16 with respect to the communication links with the multimode terminal station. As a result, through step 16 and step 17, communication schemes and transmission speeds used at communication links with the terminal stations are decided.

When this step is executed two times or more within the control loop, it is also possible to selectively switch over the communication schemes used at communication links with the multimode terminal station in the manner shown below. Namely, the communication scheme for use is switched over only when multimode terminal station n satisfies the conditions shown in equation (13) under the conditions that terminal station n, which has a request for transmitting transmission data amount Dn per unit time, is able to switch a communication scheme from X (transmission speed $B_X$) to another communication scheme Y (transmission speed $B_Y$). Namely, switching communication schemes is decided only in the case where required time for transmitting at transmission speed $B_Y$ of communication scheme Y is shorter than transmission speed $B_X$ of communication scheme X, even if time Tr for switching modes that is necessary when switching communication functions at the multimode terminal stations and the multimode control station to another communication scheme Y is required.

[Equation 13]

$$\frac{D_n}{B_m} + T_r < \frac{D_n}{B_A} \tag{13}$$

When there is one or more terminal stations communicating using communication scheme Y within the network where communication control is carried out, Tr in equation (13) may be "0."

(Step 18)

At resource allocation deciding section 10143, the objective function denoted by equation (7), equation (8) and equation (9) and the restriction conditions equation denoted by equation (10) and equation (14) are set using the communication schemes and the bit error rates used at the communication links and assumed for transmission speeds decided by step 16 and step 17 at candidate scheme selection section 10142. Among them, all are the same as those used in the embodiment 1 except for equation (14). Equation (14) denotes a restriction condition equation relating to the lower limit of an allocation rate for communication time that needs to be allocated based on a data amount $D_n$ to be transmitted per communication time allocation period $T_a$ in transmission of data with the terminal stations.

[Equation 14]

$$a_n \geq a_{min\_n} = \frac{D_n}{B_n \times T_a} \tag{14}$$

Within the network, it is taken that communication with terminal stations for which the same communication scheme is selected, is continued as long as possible, and an unnecessary mode switching time $T_{r_n}$ is not generated at the multimode control station.

(Step 19)

At resource allocation deciding section 10143, a solution for the objective function set in step 18 is obtained such that total throughput is maximized based on the restriction conditions equation, and communication time allocation rate an to the terminal stations is decided. Specifically, like the embodiment 1, the objective function is denoted as a function recursive equation as equation (12), and communication time allocation rate $a_n$ that maximizes throughput is decided by resolving this based on dynamic programming.

(Step 20)

Data transmission with terminal stations n is then carried out based on communication time allocation rate $a_n$ with the terminal stations decided in step 19.

(Step 21)

The parameters used in this control loop are then copied to variables for holding use, and the processing proceeds to the next control loop (step 12).

According to this communication control operation, the same results as the embodiment 1 are obtained, and even in cases where the number of terminal stations N as the data transmission targets within the network or the number of terminal stations that are multimode terminal stations Ns among them changes, or cases where the quality of the communication links between the multimode control station and the plurality of multimode control terminal stations changes, it is possible to appropriately carry out communication time allocation with the terminal stations in a dynamic manner from time to time depending on conditions, thereby improving the total throughput of the communication traffic within the network.

Although as an example of a flowchart for communication control of this embodiment, a control flow shown in FIG. 15 is shown, the present invention is by no means limited to the content of this control flowchart, and may have a different flowchart if it is based on the essential features. For example, the order of step 13 and step 14 may be reversed. Further, it is not necessary to monitor changes in all of the parameters for the total number of terminal stations N within the network, and, for example, control may be carried out so as to reset communication only when a change occurs, for example, in the terminal station number N or multimode terminal station number Ns, or, conversely, control may be carried out so as to reset communication when the request conditions for permitted error rate or the communication time allocation period Ta change, in addition to N, Ns, and CNR.

Further, communication to terminal stations existing within the network need not always to be transmitted at one time based on the decided communication time allocation rate, and for example, control may be carried out so as to divide allocated communication time in a plurality of blocks within period Ta and transmit. As a result, application is also possible during transmission of data for which, for example, request conditions relating to delay times in communication are severe.

Figure 16:
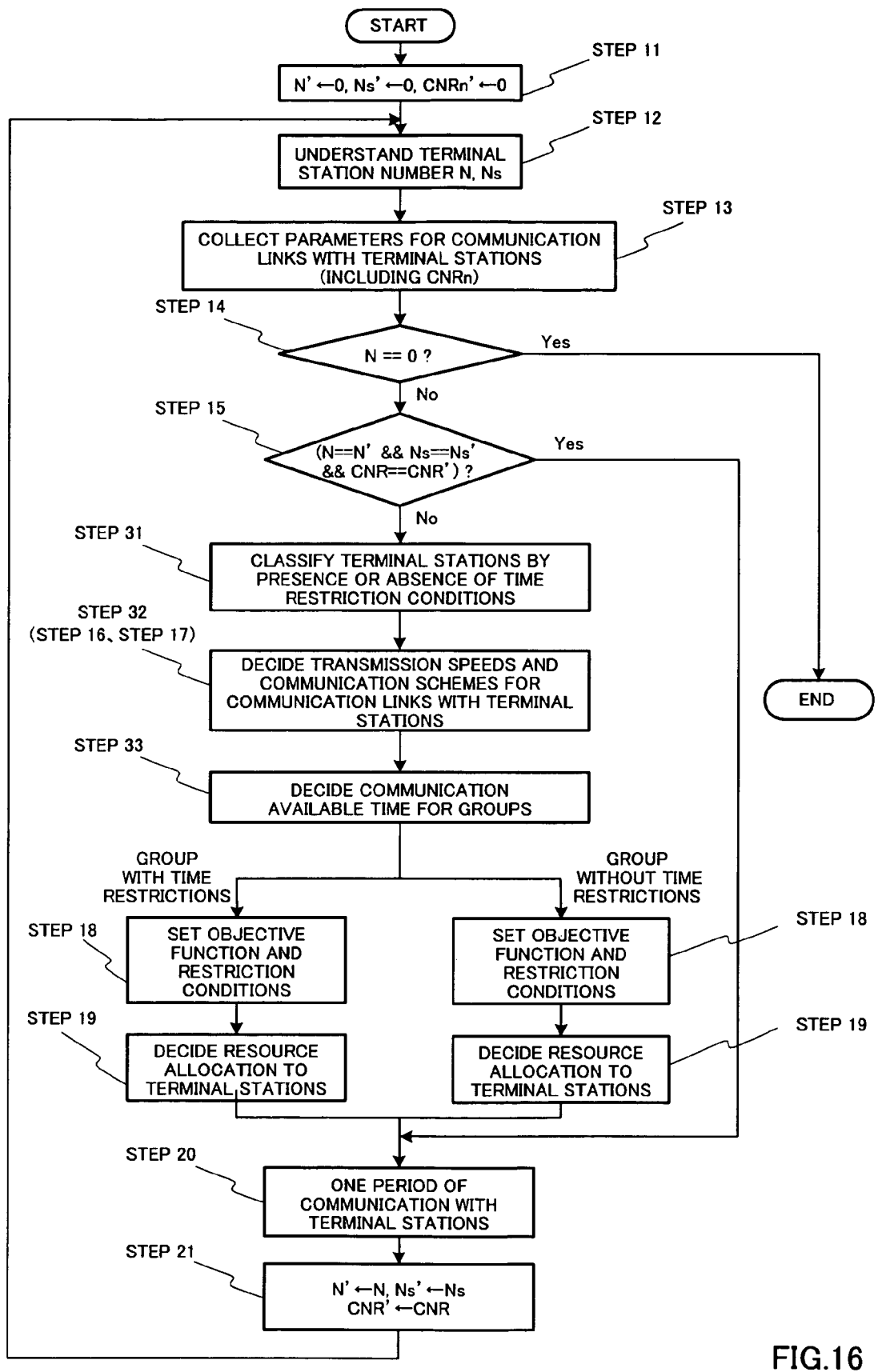
FIG. 16 is a further flowchart showing a control procedure for the embodiment 2.

Further, under a situation where a communication link where time restriction conditions are demanded for such as the real time transmission of moving images and voice as data to be transmitted at the communication links between the multimode control station and the plurality of multimode terminal stations existing in the network, and a communication link where the time restriction conditions are not demanded are mixed, the communication link having time restrictions and communication link having no time restrictions are divided into separate groups, and communication control may then be carried out so as to perform communication time allocation for each group. Specifically, for example, communication control based on the flowchart shown in FIG. 16 may be carried out at control section 11 of multimode control station 10. In FIG. 16, the operations for steps assigned the same numbers as in FIG. 15 are steps in which the same operations as this embodiment described above are performed. The difference from the communication control operation lies in providing step 31 to step 34, and the operations of the respective steps will be given in the following.

(Step 31)

Data transmitted to the terminal stations that needs data transmission within the network is classified into two groups based on whether or not there exist so-called time restriction conditions including, for example, permitted transmission delay and fluctuation range of transmission capacity like in real time transmission of moving images and voice.

(Step 32)

Transmission speed and communication schemes for use at the communication links with the terminal stations within the network are decided in the same way as the operations of step 16 and step 17 in FIG. 15.

(Step 33)

Based on the communication conditions at the communication links grouped as having time restrictions in step 31, communication available time $T_{a0}$ and communication breakdown available time with the terminal stations having time restrictions are decided among communication time allocation period $T_a$ for all the terminal stations. Among these, the communication breakdown available time may be allocated as communication available time $T_{a1}$ with terminal stations having no time restrictions.

Thereafter, operations corresponding to the operations of step 18 and step 19 in FIG. 15 are carried out for the group having time restrictions and the group having no time restrictions, predetermined objective functions and restriction conditions are then set, and, based on this, communication time allocation for the terminal stations at allocation time $T_{a0}$ is decided.

It is also possible to carry out communication resource allocation to the communication links in an efficient manner even when communication links having time restrictions and communication links having no time restrictions are mixed within a network by carrying out data transmission with the terminal stations in step 20 based on the result of communication time allocation to the terminal stations obtained from the respective operations.

Although, in the above description, it is described that the terminal stations within the network are divided into two groups, namely, one group having time restrictions and another group having no time restrictions, it is by no means necessary to group into two groups, and grouping in a plurality of levels based on, for example, time restriction conditions.

Embodiment 3

In this embodiment, a multimode control station that decides communication resource allocation used at wireless communication links between the wireless stations within an area where a plurality of types of wireless communication schemes collects communication link information reported from the wireless stations within a wireless control area and presents collectively managing the communication link information. As a result, the multimode control station is able to understand how to receive and cause interference between wireless terminals within the management area, so that it is possible to decide communication resources to be allocated to the wireless terminal stations so that overall communication of the management area is optimized.

(1) Overall Configuration of Wireless Communication System

Figure 17:
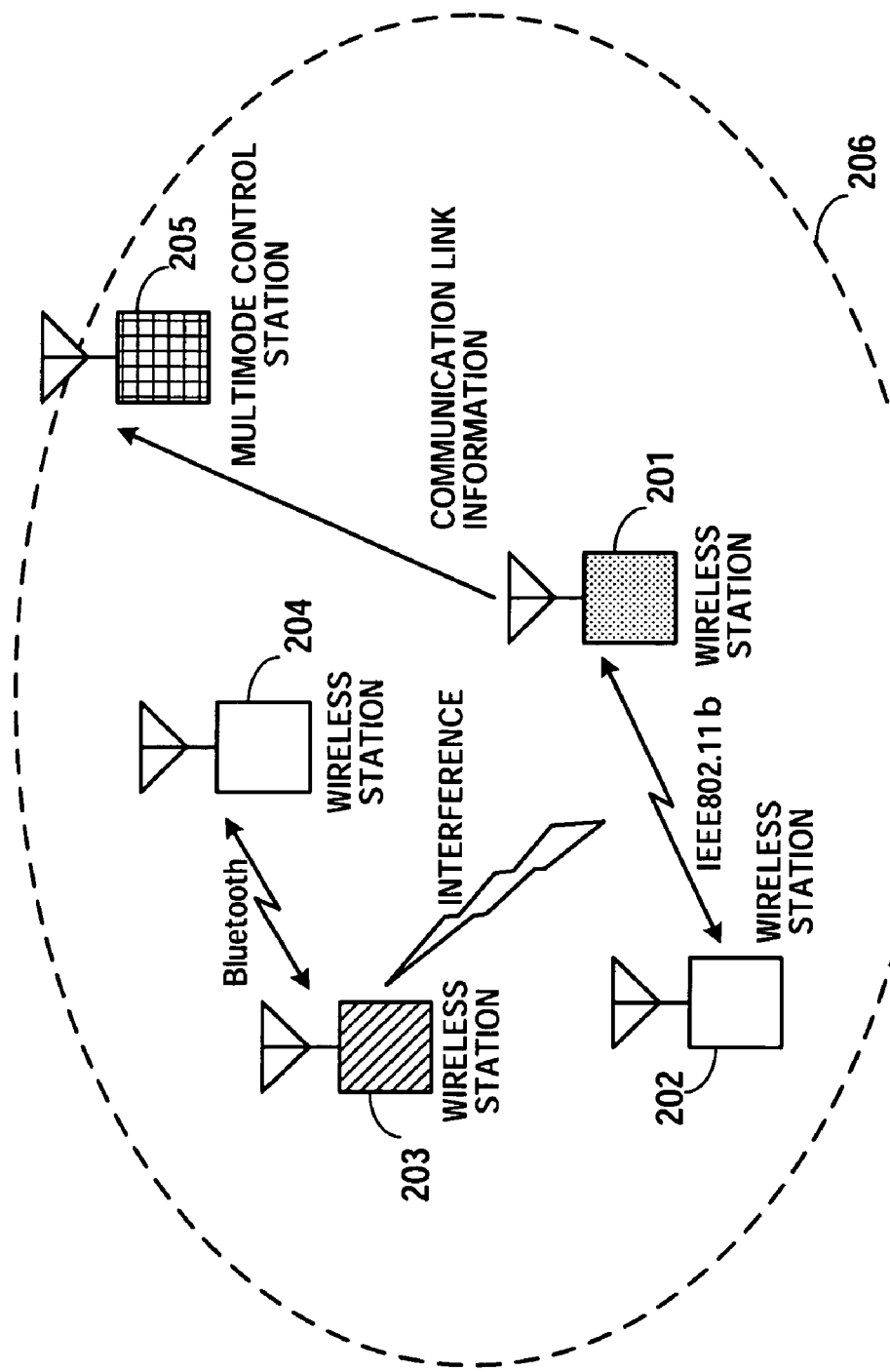
FIG. 17 is a view showing a configuration for a wireless communication system of a embodiment 3.

An overall configuration of a wireless communication system of the embodiment 3 of the present invention is shown in FIG. 17. In FIG. 17, 201 to 204 denote wireless stations, 205 denotes a multimode control station, and 206 denotes a wireless control area of multimode control station 205. Wireless communication apparatuses 201 to 204 are positioned within wireless control area 206 and are configured so as to be able to communicate each other using one or a plurality of schemes of a plurality of types of wireless communication schemes employing the same frequency. Further, prior to starting communication or periodically during communication, wireless stations 201 to 204 detect one or a plurality of interference waves transmitted from other wireless stations, and report the detection results as communication link information to multimode control station 205.

Multimode control station 205 is connected with wireless communication apparatuses 201 to 204 in a wired or wireless manner, and manages the interference state wireless stations 201 to 204 are subjected to based on communication link information reported from wireless stations 201 to 204.

In this embodiment, it is taken that wireless communication schemes conforming to the IEEE802.11b standard using the 2.4 GHz band and a wireless communication scheme conforming to the Bluetooth (registered trademark) specification are mixed and used as the plurality of types of wireless communication schemes using the same frequency band shown in FIG. 17 as an example, and it is taken that wireless stations 201 to 204 are able to communicate using communication schemes conforming to both the IEEE802.11b standard and the Bluetooth (registered trademark) specification.

Further, multimode control station 205 is connected in a wireless manner to wireless stations 201 to 204, and periodically monitors the presence and absence of connection requests from wireless stations 201 to 204 while periodically switching between communication schemes conforming to the IEEE802.11b standard and a communication scheme conforming to the Bluetooth (registered trademark) specification. Further, multimode control station 205 in advance holds information such as communication schemes that wireless stations 201 to 204 existing within the management area 206 are currently using or can use, frequency channels of the communication schemes in use, occupied bandwidth, transmission rate, and transmission power etc. as communication profile information.

Wireless control area 206 indicates the range where multimode control station 205 is able to manage the interference states of wireless station 201 to 204. For example, management area 206 is a range that can be covered by wireless cells having a larger cell radius among wireless cells when multimode control station 205 uses a communication scheme conforming to the IEEE802.11b standard or the Bluetooth (registered trademark) specification. Alternatively, this is a range that is physically partitioned such as a room or house etc. where multimode control station 205 is installed. There is also the possibility that an operation to register a wireless station as a control target beforehand if necessary, but in this embodiment a description will be omitted.

In the case of this embodiment, interference which wireless stations 201 to 204 are subjected to is detected by classifying into two types of interference, namely, internal interference and external interference. Here, internal interference is interference existing within management area 206 at wireless stations under the management of multimode control station 205, namely, in this case, interference caused by wireless station 201 to 204 on each other. External interference is interference caused by wireless stations positioned outside the range of the management area 6, or interference that is from a wireless station that is within the management area but is not under the management of the multimode control station 205. Interference that wireless stations 201 to 204 are subjected to are classified into internal interference and external interference in this manner and detected, so that multimode control station 205 is able to control resource allocation with regards to one or both of wireless stations being subjected to interference and wireless stations that give interference.

Further, in the case of this embodiment, a calibration state and a communication state are provided as the state of overall wireless communication system.

Here, the calibration state is a state where communication for applications by wireless stations 201 to 204 is temporarily stopped in accordance with a control signal sent from multimode control station 205 with the purpose of acquiring advance information for detecting interference. Next, the following two measures are measured by mutually transmitting and receiving signals between wireless stations 201 to 204 while sequentially switching communication schemes and frequency channels etc.

i. An indication of the degree of quality a desired signal can be received at another wireless station is measured when a signal is transmitted using a predetermined power from a predetermined wireless station under an environment where internal interference does not exist.

ii. An indication of an amount of external interference due to a signal transmitted from a wireless station positioned outside the range of management area 206 is measured.

Figure 18:
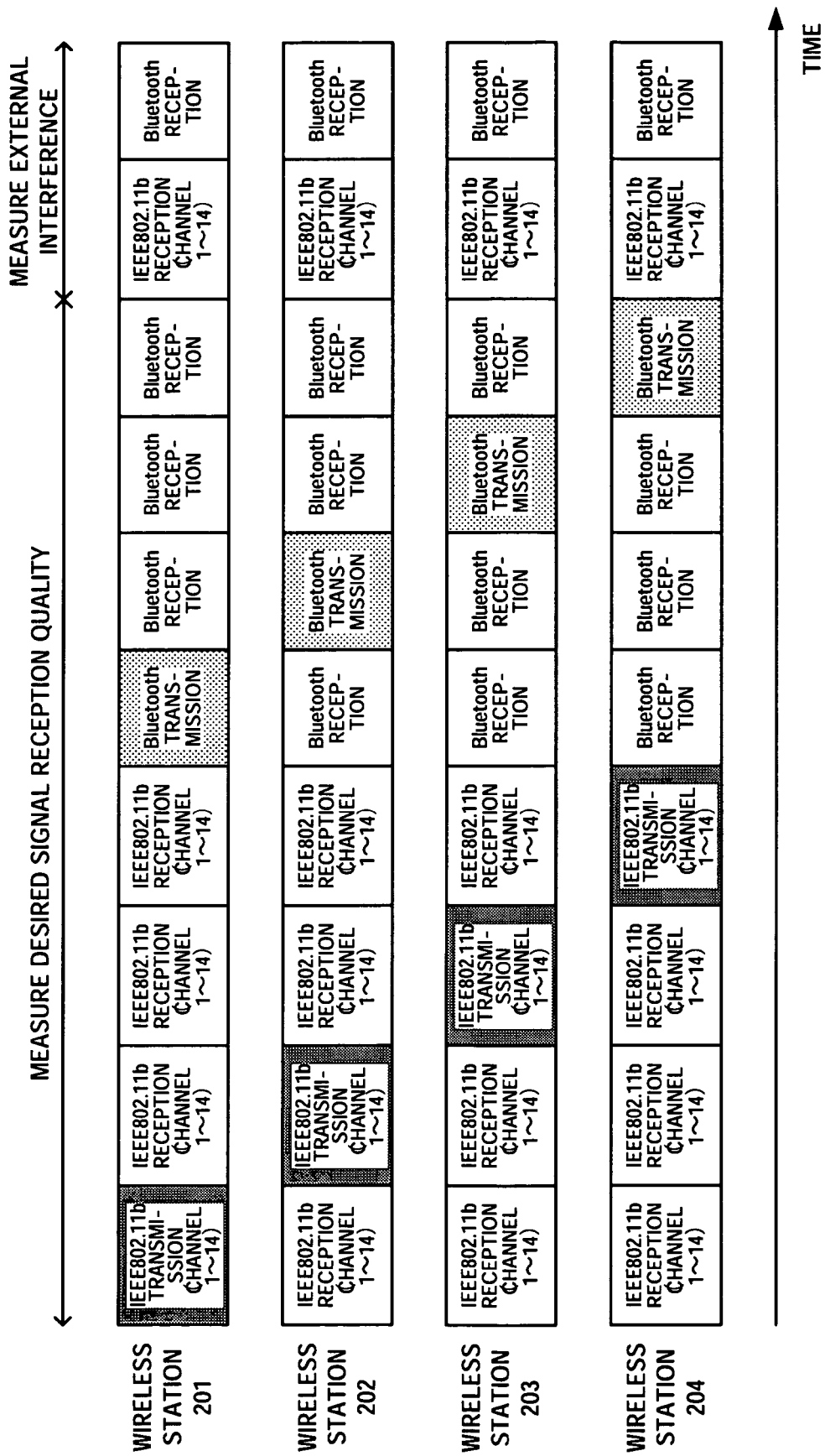
FIG. 18 is a view showing the flow of transmission operations for wireless stations in a calibration state of the embodiment 3.

Specifically, at the time of the calibration state, as shown in FIG. 18, wireless stations 201 to 204 send and receive signals each other while sequentially switching the communication schemes and frequency channels etc. More specifically, when wireless station 201 sends a signal using channel 1 of a communication scheme conforming to the IEEE802.11b specification, the used communication scheme, frequency channel, and frequency hopping patterns etc. the wireless stations 201 to 204 use are made to be the same so that other wireless stations 202 to 204 receive the signal using channel 1 of the communication scheme conforming to the same IEEE802.11b standard. The reception quality of the desired signal can then be estimated by mutually transmitting and receiving signals. Further, wireless stations 201 to 204 are made into a receiving state at a communication scheme conforming to the IEEE802.11b standard and the Bluetooth (registered trademark) specification, thereby estimating external interference in a case of using each of the communication schemes.

Further, the communication state is a state other than the calibration state where wireless stations 201 to 204 are in a state of communicating each other in order to execute applications.

(2) Wireless Station Configuration

Figure 19:
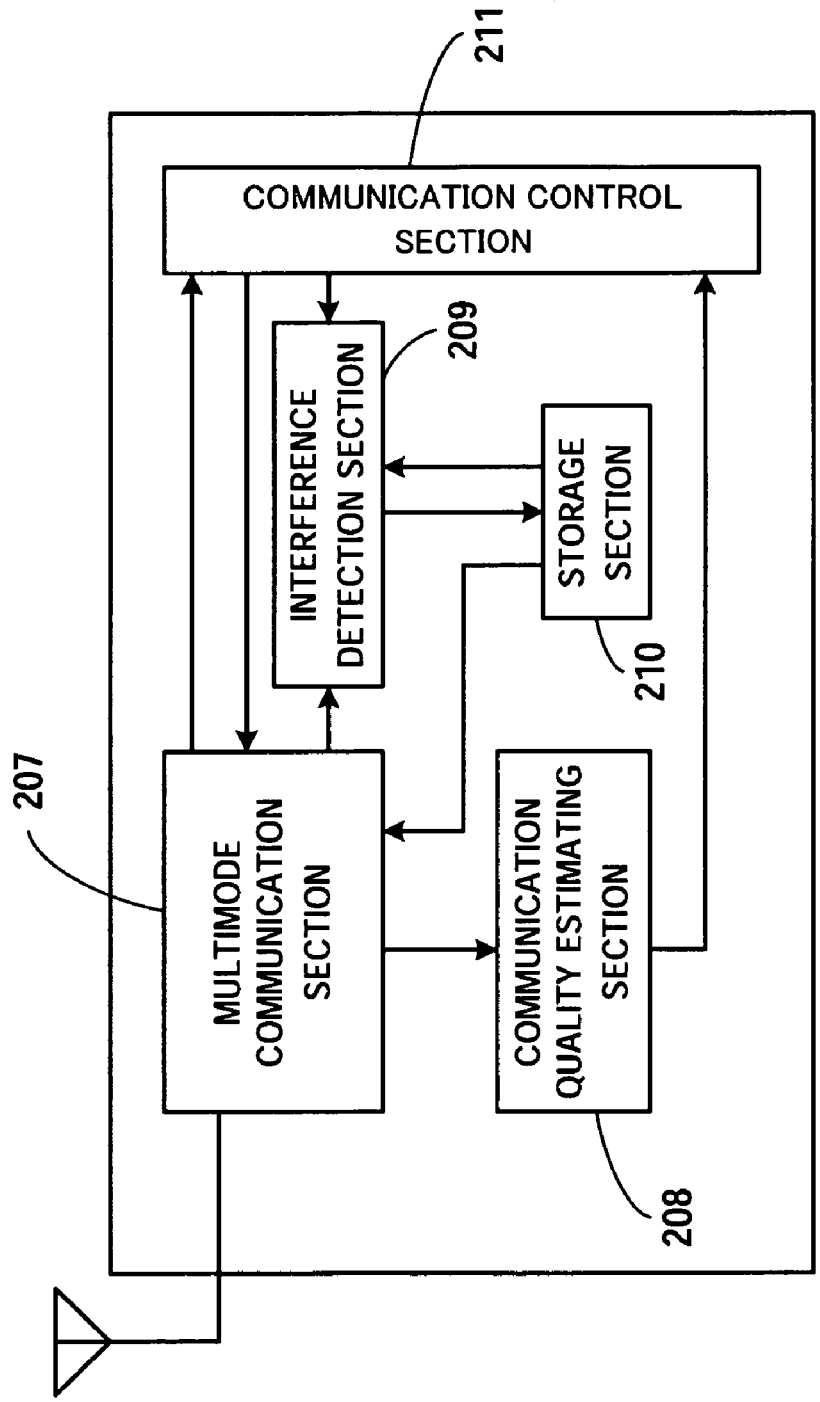
FIG. 19 is a block view showing a configuration for a wireless station of the embodiment 3.

FIG. 19 shows a configuration for wireless stations 201 to 204 according to the embodiment 3. In this embodiment, the configuration and operations of wireless stations 201 to 204 are taken to be the same, and, in FIG. 19, only the configuration of wireless station 201 is shown as being typical.

Wireless station 201 of FIG. 19 has: multimode communication section 207 that is able to communicate with other wireless stations 202 to 204 and multimode control station 205 using one or a plurality of types of wireless communication schemes; communication quality estimation section 208 that estimates communication quality at these wireless communication links when communicating between wireless stations 202 to 204; interference detection section 209 that detects one or a plurality of interference waves due to signals transmitted from wireless stations other than the subject apparatus; storage section 210 that stores the interference detection results; and communication control section 211 that controls the operations of wireless station 201.

An output terminal of multimode communication section 207 is connected to input terminals of communication quality estimation section 208, interference detection section 209 and of communication control section 211. An output terminal of communication quality estimation section 208 is connected to an input terminal of communication control section 211. An output terminal of interference detection section 209 is connected to an input terminal of storage section 210. An output terminal of storage section 210 is connected to an input terminal of multimode communication section 207. An output terminal station of communication control section 211 is connected to input terminals of multimode communication section 207 and interference detection section 209.

Multimode communication section 207 sends and receives wireless signals with wireless stations 202 to 204 other than the subject apparatus or with multimode control station 205 based on a communication specification and procedure conforming to the IEEE802.11b standard and the Bluetooth (registered trademark) specification. Specifically, multimode communication section 207 switches the communication schemes for use between a communication scheme conforming to the IEEE802.11b standard and a communication scheme conforming to the Bluetooth (registered trademark) according to a control signal inputted from communication control section 211, carries out processing such as amplification and frequency conversion on transmitted and received signals in accordance with specifications and procedures conforming to the respective communication schemes specification, further carries out, for example, error correction encoding and decoding, error detection encoding, error detection processing, and interleave processing, inserts application data, communication link information and control information sent from multimode control station 205 into a transmission signal, or extracts these from a reception signal, thereby carrying out communication with the other wireless stations 202 to 204 and multimode control station 205.

As a method of switching the communication scheme, for example, multimode communication section 207 may be configured with a programmable device in which the configuration can be rewritten by software such as a DSP (Digital Signal Processor) or an FPGA (Field Programmable Gate Array) or a filter, amplifier or oscillator etc. that can change characteristics in a parametric manner. Configuration information required for rewriting these to a configuration compatible with the communication schemes may be acquired from predetermined memory within wireless station 201. In doing so, it is possible to switch over the communication functions of multimode communication section 207 to communication functions conforming to respective communication schemes. The example in FIG. 17 shows a state where wireless station 201 switches the communication scheme of multimode communication section 207 over to a communication scheme conforming to the IEEE802.11b standard and carries out communication with wireless station 202 using the communication scheme conforming to the IEEE802.11b standard, and wireless stations 203 and 204 switch the communication scheme of multimode communication section 207 over to a communication scheme conforming to the Bluetooth (registered trademark) standard and carries out communication. Communication quality estimation section 208 estimates quality of a reception signal during communication with other wireless stations 202 to 204 in the communication state, determines whether or not good communication is being carried out based on this estimation result, and outputs communication state information indicating whether the communication state is good or poor to communication control section 211. Although, as parameters indicating communication quality, there are SNR (Signal to Noise Ratio), CNR (Carrier to Noise Ratio), BER (Bit Error Rate), and FER (Frame Error Rate), SNR is used as an example in this embodiment.

Figure 20:
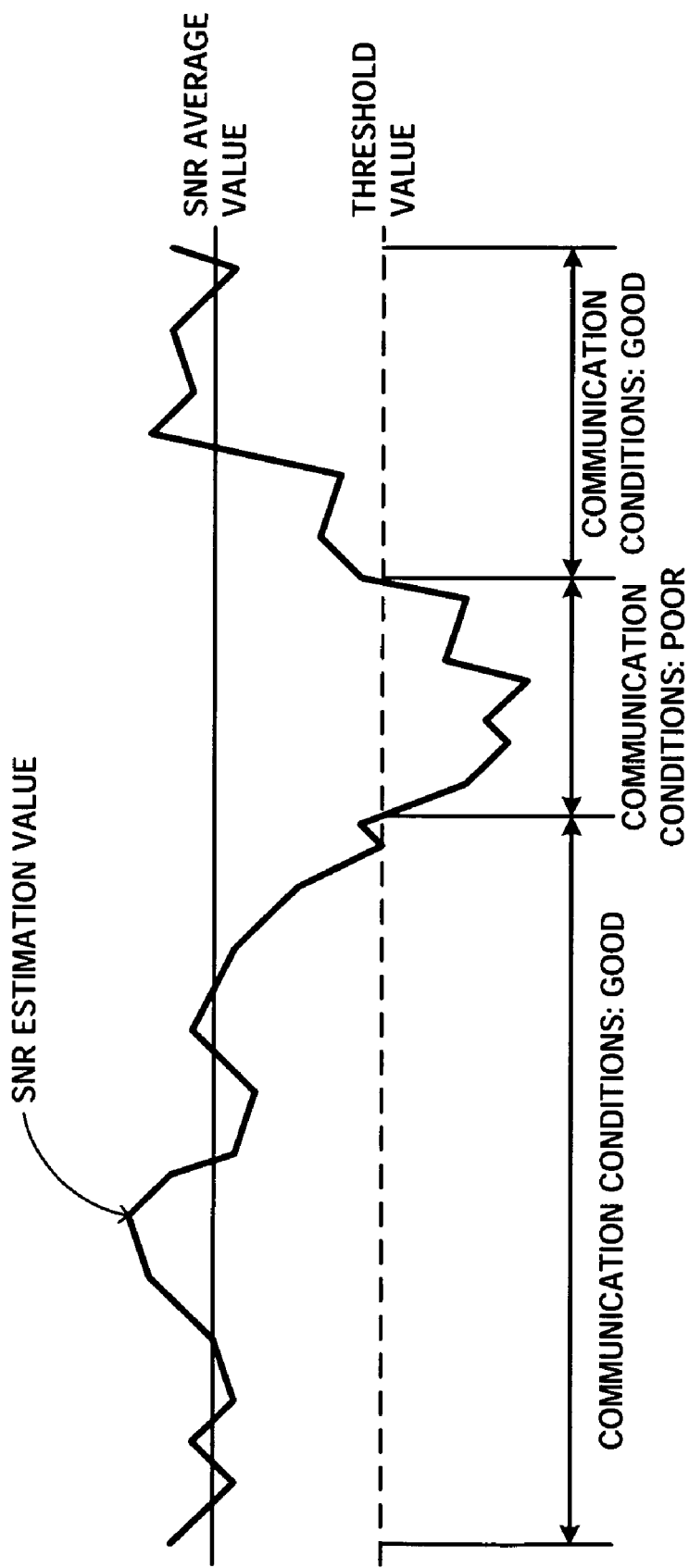
FIG. 20 is a view illustrating a method of determining whether a communication state is good or poor in the embodiment 3.

How to determine the communication state using communication quality estimation section 208 is shown in FIG. 20. Communication quality estimating section 208 first sets a threshold value that is just a predetermined value smaller than an average value for SNR measured in advance in the calibration state. Communication quality estimation section 208 then determines that the communication state is poor when an SNR estimated value estimated in the communication state is equal to or less than this threshold value. The SNR estimation is by no means limited, and, for example, may be estimated from reception signal strength and a noise level obtained in a reception processing process of multimode communication section 207, or may be estimated from an IQ vector after orthogonal modulation.

When it is determined that the communication state is worse at communication control section 211 during communication with wireless stations 202 to 204 in the communication state, interference detection section 209 detects one or a plurality of interference waves due to signals transmitted from wireless stations other than the subject station, and outputs this detection results to storage section 210 as communication link information. Specifically, interference detection section 209 operates when instructed to carry out interference detection as a result of a control signal inputted by communication control section 211, carries out power estimation for interference signals sent from wireless stations other than the subject apparatus, and outputs the estimation results to storage section 210 as communication link information.

Figure 21:
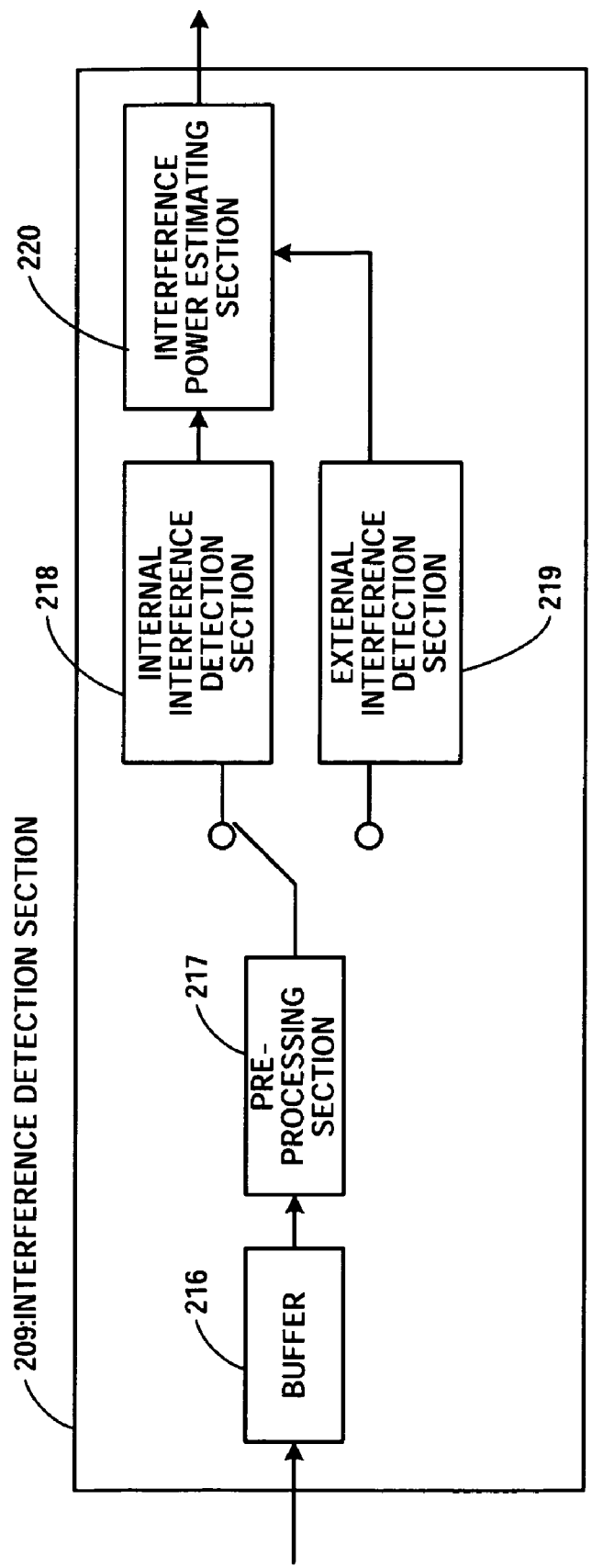
FIG. 21 is a block view showing a configuration for an interference detection section.

The method for detecting interference waves is by no means limited, and interference detection section 209 may be configured, for example, as shown in FIG. 21. In FIG. 21, interference detection section 209 is configured with buffer 216, pre-processing section 217, internal interference detection section 218, external interference detection section 219, and interference power estimating section 220. Interference detection section 209 accumulates signals received at multimode communication section 207 in buffer 216 temporarily, and carries out normalization, band pass processing, and FFT processing etc. on reception signals stored in buffer 216 at pre-processing section 217.

When detecting internal interference, interference detection section 209 sends an output of pre-processing section 217 to internal interference detection section 218, and sends an output of pre-processing section 217 to external interference detection section 219 when detecting external interference.

Figure 22:
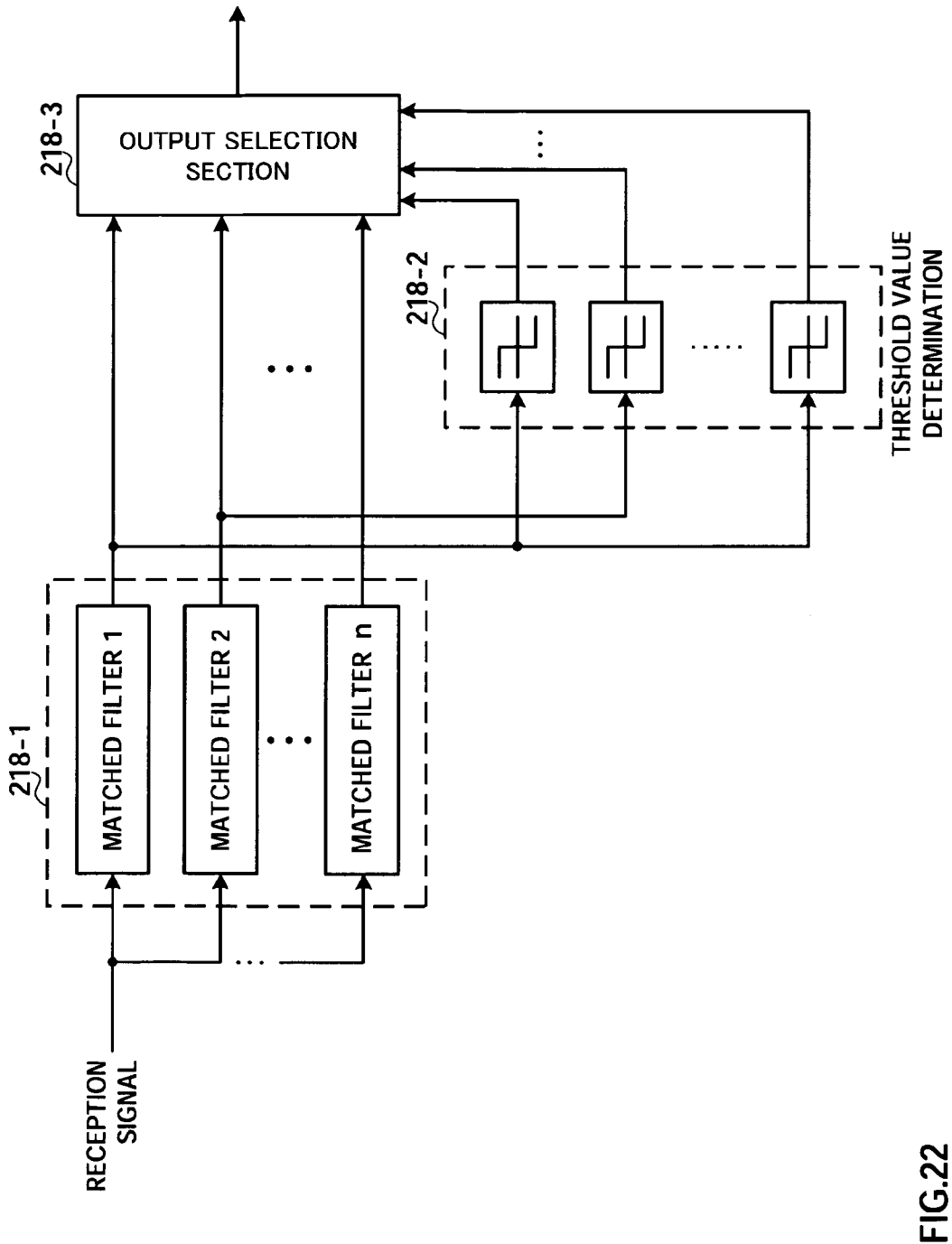
FIG. 22 is a view showing a configuration for detecting internal interference.

A configuration for internal interference detection section 218 is shown in FIG. 22. Internal interference detection section 218 inputs reception signals outputted from pre-processing section 217 to matched filter set 218-1 comprised of a plurality of matched filters 1 to n. Each matched filter 1 to n is configured so as to fit to the characteristics of the signals that can be internal interference. The signals that can be internal interference can be understood by acquiring communication profile information from multimode control station 205. By configuring matched filters 1 to n so as to fit to spectra of communication schemes that other wireless stations are using at this time based on communication profile information, thereby detecting internal interference signals. Outputs from matched filter 1 to n are supplied to threshold value determining section 218-2 and output selection section 218-3. Threshold determining section 218-2 compares the outputs from matched filters 1 to n to predetermined threshold values, detects matched filters exceeding the threshold values, and sends the detection results to output selection section 218-3. Output selection section 218-3 selects matched filters with outputs exceeding the threshold value based on the detection results and sends these filter outputs to interference power estimation section 220. At interference power estimation section 220, interference power is estimated based on the selected matched filter outputs.

Figure 23:
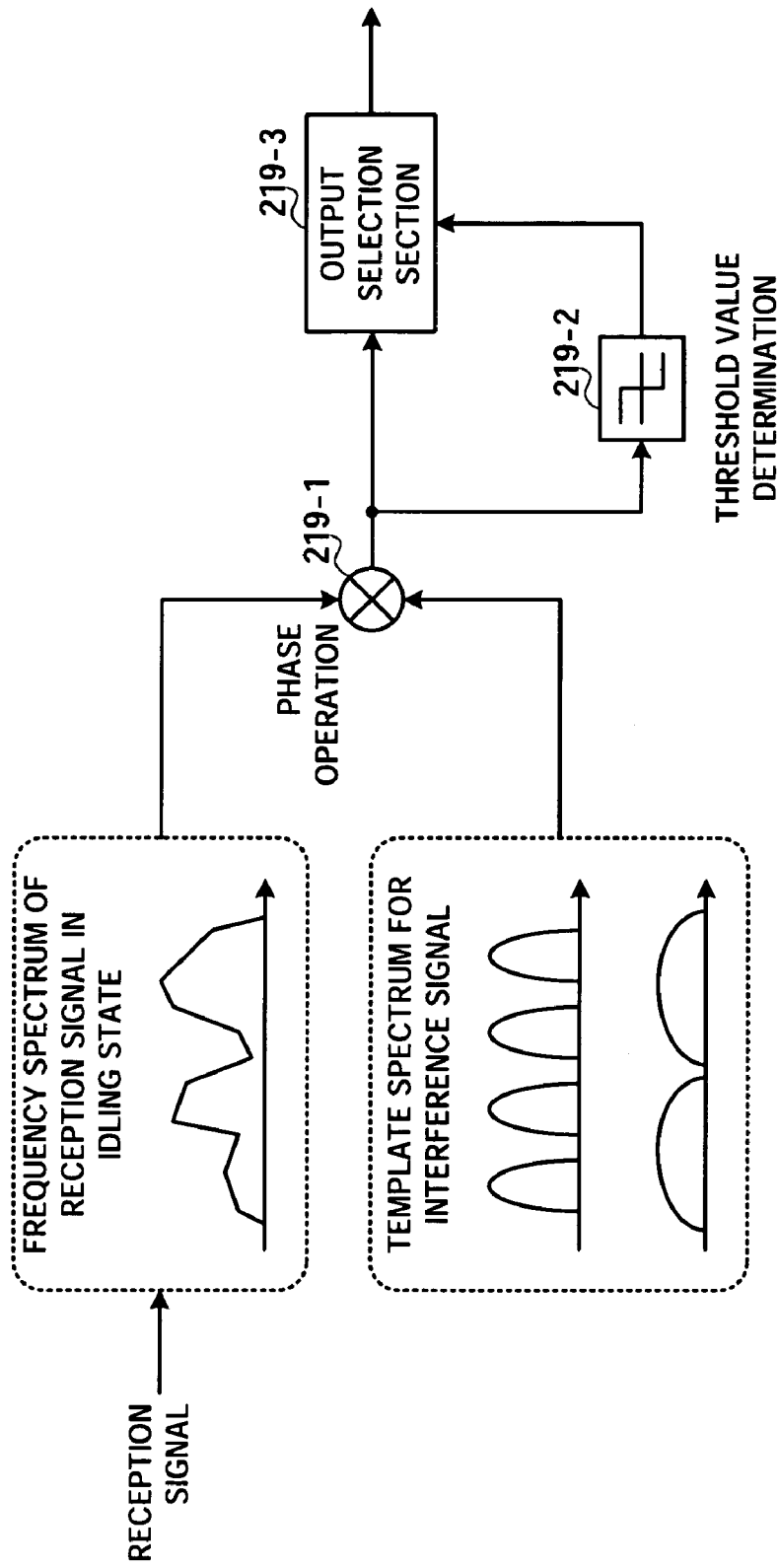
FIG. 23 is a view showing a configuration for detecting external interference.

A configuration for external interference detection section 219 is shown in FIG. 23. External interference detection section 219 carries out a correlation operation for a frequency spectrum of the reception signal received in a idling state where wireless station 201 does not carry out processing of transmission and reception for application data at phase operation section 219-1 and a template spectrum for an interference signal. This correlation operation results are then inputted to threshold determination section 219-2 and output selection section 219-3. External interference detection section 219 then recognizes that an external interference signal is detected when the correlation operation results are equal to or greater than the threshold value, assumes that a communication scheme for a template spectrum at this time is a communication scheme used in an external interference wave, and outputs correlation operation results for this template spectrum and the frequency spectrum for the reception signal in an idling state from output selection section 219-3. This correlation operation results are then sent to interference power estimation section 220. Here, the template spectrum is a frequency spectrum prepared in advance by assuming a communication scheme that can be interference to the subject apparatus, because, apart from the internal interference source, the external interference source does not have communication profile information as advance information. In this embodiment, wireless station 201 carries out communication using the 2.4 GHz band, so that, as a template spectrum, a frequency spectrum of a wireless communication scheme using the same 2.4 GHz band including the IEEE802.11b standard, the IEEE802.11g standard, and the Bluetooth (registered trademark) specification are used.

As shown above, interference detection section 209 determines that an internal interference signal is detected when the output from matched filter 218-1 is equal to or greater than a predetermined threshold value, and determines that an external interference signal is detected when the output from correlation operation section 219-1 is equal to or greater than a predetermined threshold value. Further, the output of matched filter 218-1 and the output of correlation operation section 219-1 are sent to interference power estimation section 220, and respective interference powers are estimated by interference power estimation section 220.

In this way, interference detection section 209 detects internal interference and external interference, estimates powers of these interference signals, and outputs these to storage section 210 as communication link information.

Here, the detailed configuration of the communication link information will be shown. As shown, for example, in FIG. 24, communication link information is comprised of information such as an ID of apparatus subjected to interference, a communication quality estimation value (in this embodiment, SNR estimation value) at a communication link with a wireless station the apparatus is currently carrying out communication with, an attribute indicating whether detected interference wave is internal interference or external interference, an ID of a wireless station thought to be the source emitting the interference wave, the communication scheme used by the interference wave, and the power of the interference signal, etc.

Storage section 210 stores the communication profile information and the communication link information.

Communication control section 211 controls the operations of wireless station 201. Specifically, in the calibration state, the timing of the transmission and reception of signals and the selection of the communication scheme used etc. is controlled based on a control signal sent from multimode control station 205. On the other hand, in the communication state, the communication schemes used in communication with other wireless terminal stations 202 to 204 or multimode control station 205, frequency channel selection, and timing of starting of an interference detection operation etc. are controlled. In reality, control section 211 carries out this control by controlling multimode communication section 207 and interference detection section 209.

(3) Configuration of Multimode Control Station

A configuration for multimode control station 205 of this embodiment is shown in FIG. 25. In FIG. 25, multimode control station 5 has: multimode communication section 212 that can communicate with wireless stations 201 to 204 using one or a plurality of types of wireless communication schemes; resource allocation deciding section 213 that generates a control signal for controlling the operations of wireless stations 201 to 204 in the calibration state; communication link information collection section 214 that stores interference states wireless stations 201 to 204 positioned within management area 206 are subjected to, and communication control section 215 that controls the operations of multimode control station 205.

An output terminal of multimode communication section 212 is connected to an input terminal of resource allocation deciding section 213. An output terminal of resource allocation deciding section 213 is connected to an input terminal of communication link information collection section 214. An output terminal of communication link information collection section 214 is connected to input terminals of multimode communication section 212, resource allocation deciding section 213, and communication control section 215. An output terminal of communication control section 215 is connected to an input terminal of multimode communication section 212.

Multimode communication section 212 transmits and receives signals by radio with wireless stations 201 to 204 based on a communication specification and procedure conforming to the IEEE802.11b standard and the Bluetooth (registered trademark) standard.

Specifically, in the communication state, multimode communication section 212 periodically monitors the presence or absence of a connection request for communication link information report from wireless station 201 to 204 while switching over the communication scheme between a communication scheme conforming to the IEEE802.11b standard and a communication scheme conforming to the Bluetooth (registered trademark) standard according to a control signal inputted from communication control section 215. When there is a connection request from wireless station 201 to 204, multimode communication section 212 receives a signal containing interference information sent from wireless stations 201 to 204 in accordance with specifications and procedures conforming to the respective communication schemes, performs processing such as amplification and frequency conversion on the received signal, further carries out de-interleave processing, error correction decoding and error detection processing etc., extracts the interference information from the received signal, and outputs this interference information to communication link information collection section 214.

As a method of switching the communication scheme, for example, multimode communication section 212 may be configured with a programmable device in which the configuration can be rewritten by software such as a DSP (Digital Signal Processor) or an FPGA (Field Programmable Gate Array) or a filter, amplifier or oscillator etc. that can change characteristics in a parametric manner. Configuration information required for rewriting these to a configuration compatible with the communication schemes may be acquired from predetermined memory within wireless station 201.

Further, in the calibration state, multimode communication section 212 inserts a control signal instructing timing of transmission and reception, and communication scheme and frequency channel for use, etc. into the transmission signal for the wireless stations 201 to 204, performs, for example, amplification, frequency conversion, error correction encoding, error detection encoding, and interleave processing etc., and transmits the result.

In the calibration state, as shown in FIG. 18, resource allocation deciding section 213 generates a control signal for controlling the communication scheme, frequency channel, and signal transmission and receiving timing etc. for the wireless stations 201 to 204 based on communication profile information (refer to FIG. 26) stored in communication link information collection section 214, and outputs this to multimode communication section 212.

The communication profile information is stored in communication link information collection section 214 together with communication link information extracted at multimode communication section 212.

Communication control section 215 controls the operations of multimode control station 205. Specifically, a control signal instructing, for example, switching of the wireless communication scheme used at multimode communication section 212 is generated and outputted to multimode communication section 212.

(4) Operation of the Embodiment

Next, the operations of this embodiment will be described. In particular, in this embodiment, as there are a calibration state and a communication state, a detailed description will be given by dividing into the operations in these states.

(4-1) During Calibration State

As described above, during the calibration state, wireless stations 201 to 204 detect interference for themselves, and report the detection results as communication link information to multimode control station 205.

Figure 27:
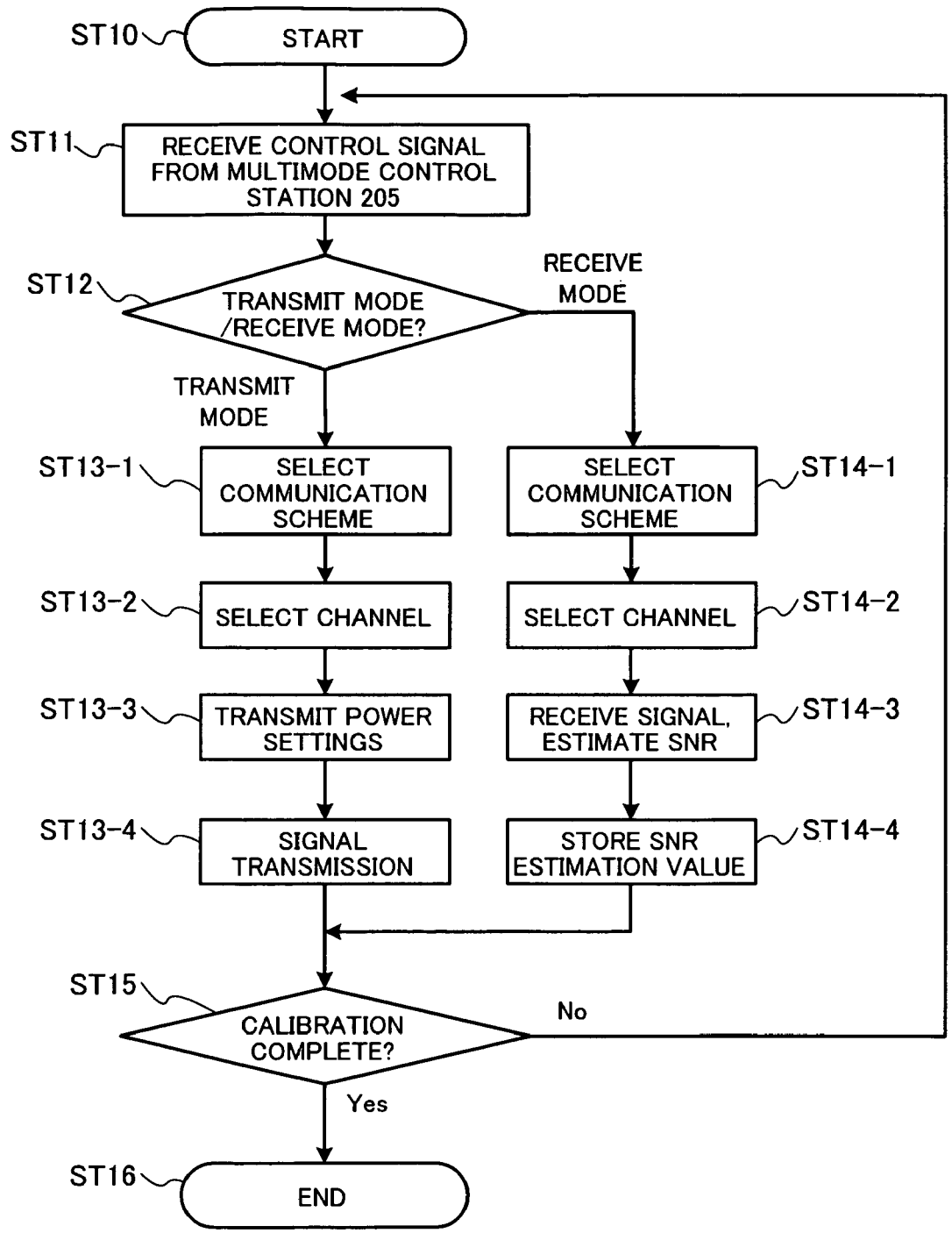
FIG. 27 is a flowchart showing the operations of a wireless station in a calibration state.

FIG. 27 is a flowchart showing the flow for the operations of wireless stations 201 to 204 in the calibration state. The operations of wireless stations 201 to 204 in the calibration state is basically the same, and, with the operations of wireless station 201 will be described here as being typical.

In FIG. 27, wireless station 201 receives a control signal sent from multimode control station 205 (ST11), and then selects transmission mode or reception mode based on the received control signal (ST12). When transmission mode is selected, the communication scheme, used frequency channel, and transmission power are selected in accordance with the received control signal (ST13-1 to ST13-3), and a signal is transmitted to other wireless stations 202 to 204 (ST13-4).

In this respect, when selecting reception mode, the communication scheme and channel for use is selected in accordance with the received control signal (ST14-1, ST14-2), a signal sent from one of the wireless stations 202 to 204 is received, communication schemes and SNR's of frequency channels are estimated at communication quality estimating section 208 (ST14-3), and SNR estimation values are stored in storage section 210 (ST14-4).

By then repeating the above operation for the transmitting and receiving of signals between wireless stations 202 to 204, it is possible to estimate the reception quality of the desired signal in a state where internal interference does not exist.

When the reception quality estimation for the desired signal is complete, wireless station 201 switches over to reception mode in accordance with the received control signal, and carries out measurement of external interference. SNR is estimated at communication quality estimation section 208 at this time, and an SNR estimation value is stored in storage section 210. When measurement of external interference is complete, wireless station 201 obtains affirmative results in step ST15, and the calibration operation is complete.

The calibration operation described above is executed while adjusting timing mutually for wireless stations 201 to 204 as shown in FIG. 18 in accordance with a control signal transmitted from multimode control station 205. Namely, at the time of reception quality estimation for the desired signal, only one wireless station is sending a signal at the same time. Further, measurement of external interference is always carried out while wireless stations 201 to 204 have all stopped transmitting signals.

Figure 28:
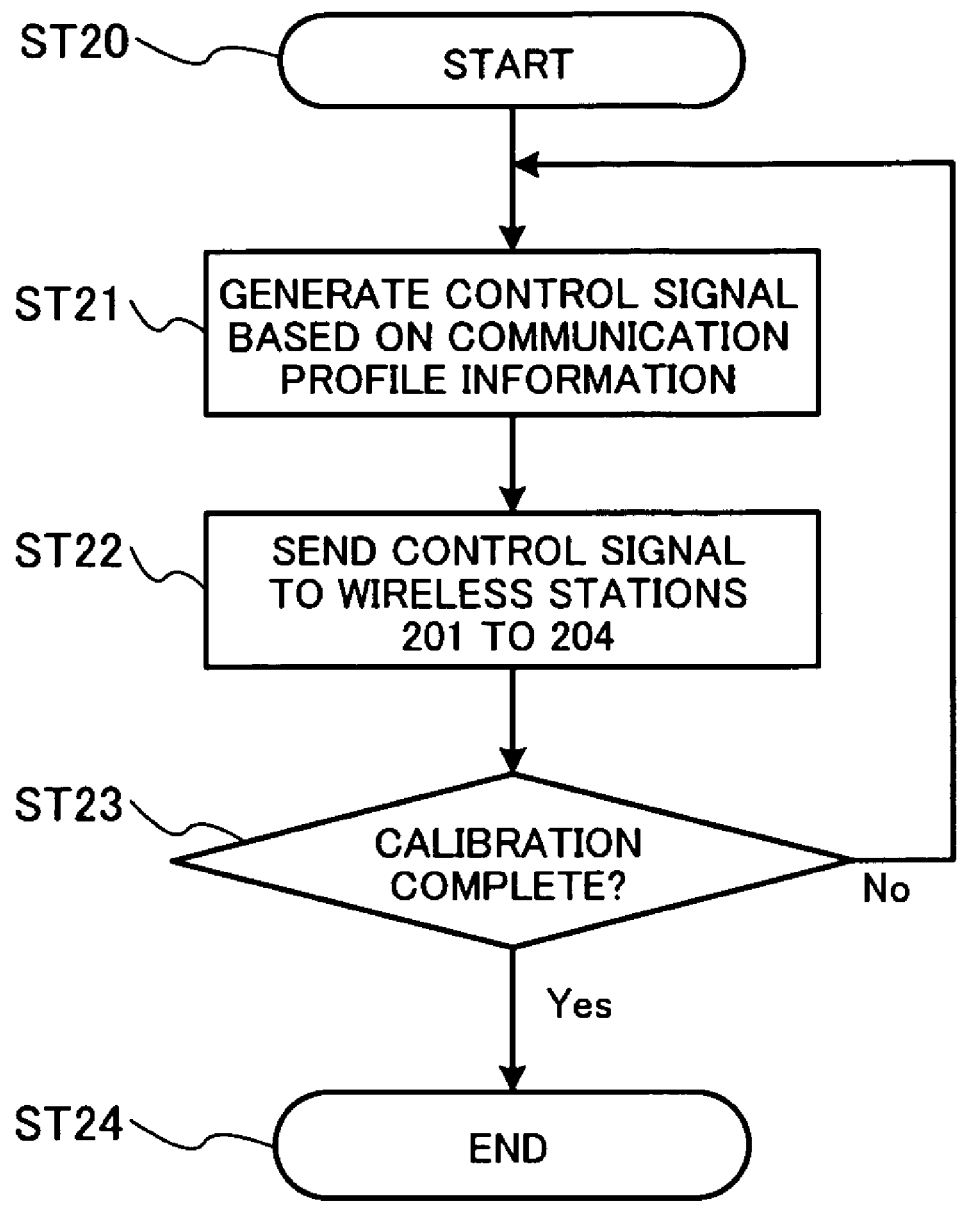
FIG. 28 is a flowchart showing the operations of a multimode control station in a calibration state.

FIG. 28 is a flowchart showing the flow of the operations of multimode control station 205 in the calibration state. In FIG. 28, multimode control station 205 acquires information relating to compatible wireless control schemes, usable frequency channels, and transmission power etc. for wireless stations 201 to 204 from communication profile information that is stored in communication link information collection section 214 at resource allocation deciding section 213, generates a control signal instructing the transmitting and receiving order, the communication schemes, and the order of switching frequency channels etc. for wireless station 201 to 204 based on this information (ST21), and sends this control signal to wireless stations 201 to 204 (ST22) Multimode control station 205 then repeats the above operations until reception quality estimation and external interference detection for the desired signal is complete and an affirmative result is obtained in step ST23.

(4-2) During the Communication State

Figure 29:
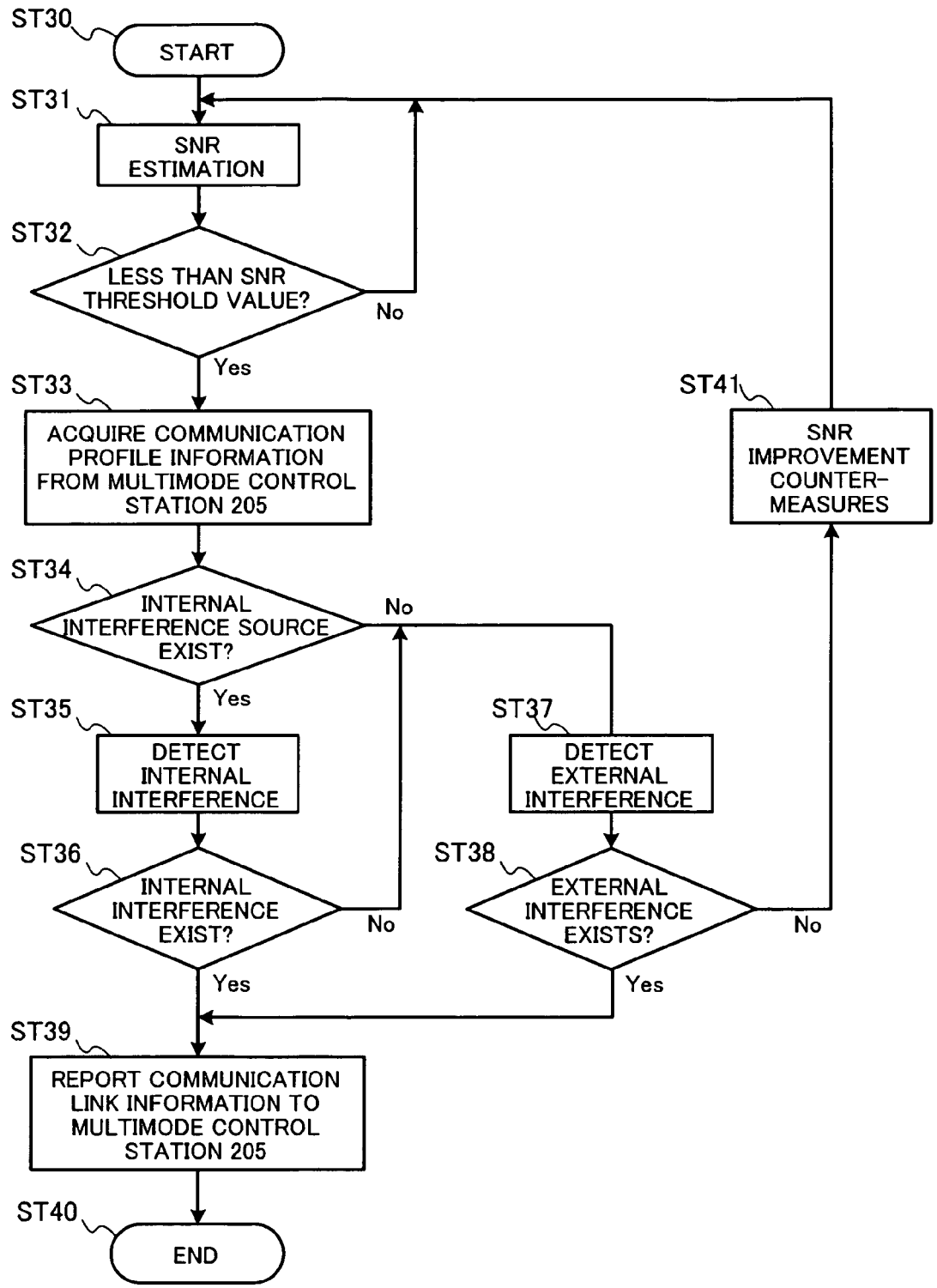
FIG. 29 is a flowchart showing the operations of a wireless station in a communication state.

Next, the operations of wireless stations 201 to 204 and multi mode control station 205 in the communication state will be described. FIG. 29 is a flowchart showing the flow for the operations of wireless stations 201 to 204 in the communication state. The operations of wireless stations 201 to 204 in the communication state is basically the same, and the operations of wireless station 201 will be described here as being typical.

Figure 30:
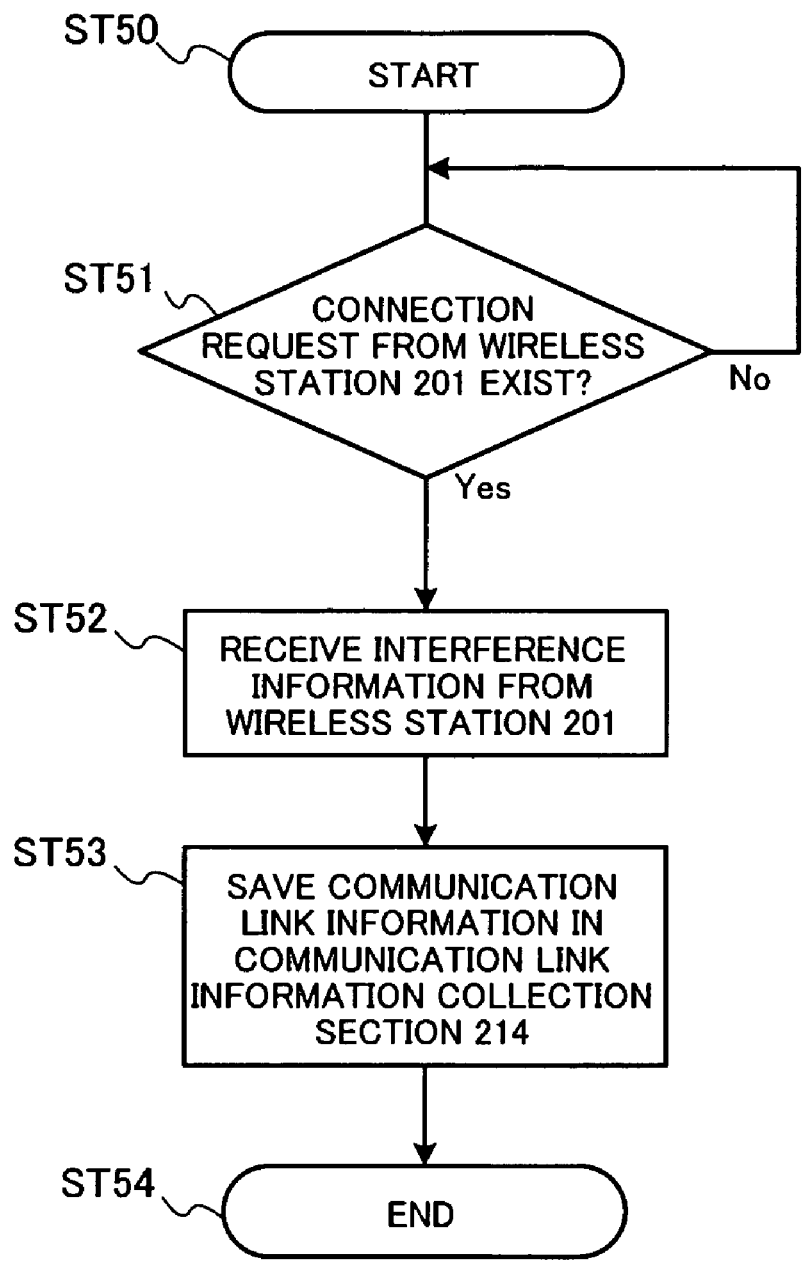
FIG. 30 is a flowchart showing the operations of a multimode control station in a communication state.

As shown in FIG. 17, the wireless station 201 it taken to communicate with the wireless station 202 using a communication scheme conforming to the IEEE802.11b standard. FIG. 30 is a flowchart showing the flow of the operations of the multimode control station 205 in the communication state.

In FIG. 29, wireless station 201 estimates communication quality (SNR) of communication with wireless station 202 at communication quality estimation section 208 (ST31). Next, wireless station 201 determines whether the communication state is good or poor based on the SNR estimation value at communication quality estimation section 208 (ST32). Specifically, the SNR estimation value and the SNR average value measured in the calibration state are compared. When the SNR estimated value is greater than the threshold value set in advance, communication with wireless station 202 is continued. Conversely, when the SNR estimation value is less than the threshold value, being subjected to some kind of interference is determined, and communication profile information is acquired from multimode control station 205 (ST33).

Next, wireless station 201 determines whether or not a wireless station that can be an internal interference source exists within the range of the management area 206 based on the acquired communication profile information (ST34). Specifically, wireless station 201 searches for the existence of a wireless station using a frequency band that is the same as or overlaps with the frequency band used by itself in communication with wireless station 202 from the communication profile information. When a corresponding wireless station exists, it is assumed that this wireless station is the internal interference source, and internal interference is detected (ST35). Detection of internal interference can be implemented by the configuration shown in FIG. 22. When the results of internal interference detection are that a wireless station as an internal interference source is detected (namely, when an affirmative result is obtained in step ST36), the communication link information is reported to multimode control station 205. Conversely, when the result of step ST36 is negative, external interference detection is carried out (ST37).

On the other hand, when a wireless station obtained as an internal interference source within the communication profile information does not exist, external interference is detected (ST37). When external interference is detected in the external interference detection results (namely, an affirmative result is obtained in step ST38), communication link information is reported to multimode control station 205. Conversely, when external interference is not detected (namely, a negative result is obtained in step ST38), wireless station 201 determines that SNR deterioration is not due to interference, takes some kind of countermeasure to improve SNR (ST41), and continues communication with wireless station 202 by returning to step ST31.

In this way, wireless station 201 detects internal interference or external interference, and reports the detection results as communication link information to multimode control station 205 during communication with wireless station 202.

In this embodiment, countermeasures for improving SNR are not particularly limited, and the description is therefore will be omitted.

In FIG. 30, multimode control station 205 monitors for the presence or absence of a connection request for communication link information report from wireless stations 201 to 204 while switching over the communication scheme of multimode communication section 212 between a communication schemes conforming to the IEEE802.11b standard and a communication scheme conforming to the Bluetooth (registered trademark) standard (ST51). Here, when there is a connection request from wireless station 201 (ST52), multimode control station 205 acquires communication link information from wireless station 201 and saves this in communication link information collection section 214 (ST53). In this way, multimode control station 205 can collectively manage what kind of interference wireless stations 201 to 204 are subjected to by referring to the interference information saved in communication link information collection section 2144.

(5) Effects of the Embodiment

According to this embodiment, under an environment where a plurality of types of wireless communication schemes using the same frequency band within an area in close proximity are mixed and used, wireless stations 201 to 204 detect efficiently interference wireless stations 201 to 204 are subjected to and report communication link information to multimode control station 205. As a result, multimode control station 205 is able to collectively manage interference states wireless stations 201 to 204 are subjected to. As a result, it is possible to understand how to receive and cause between wireless equipments within the management area and therefore control communication resources of wireless terminal stations so that overall communication of the management area is optimized.

(6) Modified Examples

In this embodiment, although the case has been described where multimode control station 205 is connected in a wireless manner to wireless stations 201 to 204, this is by no means limiting, and multimode control station 205 may also be connected to wireless stations 201 to 204 in a wired manner. In doing so, it is possible to reduce the possibility of errors occurring in communication link information compared to the wireless case when wireless stations 201 to 204 report communication link information to multimode control station 205, so that more reliable management of interference states at multimode control station 205 is possible.

Further, in this embodiment, although the case has been described where multimode communication sections 207 and 212 are configured with a programmable device in which the configuration can be rewritten by software or a filter, amplifier or oscillator etc. that can change characteristics in a parametric manner, this is by no means limiting. For example, communication sections dedicated to respective wireless communication schemes may be provided and used by appropriately switching over between the dedicated communication sections according to the communication scheme used.

Further, in this embodiment, although the case has been described SNR estimated as the parameter denoting communication quality at communication quality estimating section 208, this is by no means limiting. For example, it is also possible to estimate CNR (Carrier to Noise Ratio), BER (Bit Error Rate), or FER (Frame Error Rate), etc. In this case, it may be determined that the communication state is poor when a communication quality estimation value has more deteriorated quality than a predetermined threshold value.

Further, in this embodiment, although the configuration elements of the communication profile information are taken to be apparatus ID, compatible communication schemes, used communication scheme, frequency channel, occupied bandwidth, transmission rate, and transmission power, this is by no means limiting. For example, information for primary modulation, secondary modulation, or encoding rate etc. used in communication may also be taken as configuration elements, or information relating to time the wireless stations continue communication for may also be taken as a configuration element.

Further, in this embodiment, although the case has been described where apparatus ID, interference signal attributes, interference source apparatus ID, interference signal communication scheme, and interference signal power are taken as interference information configuration elements, this is by no means limiting. For example, information for primary modulation, secondary modulation, and encoding rate etc. of the interference signal may be taken as configuration elements, or frequency channel, and occupied bandwidth etc. of the interference signal may be taken as configuration elements.

Further, in this embodiment, although the case has been described where determination of internal interference and external interference is carried out at wireless stations 201 to 204, this is by no means limiting. It is also possible for multimode control station 205 to carry out these determinations. At this time, wireless station 201 to 204 may report an ID of the subject apparatus multimode control station 205, and multimode control station 205 is able to determine internal interference or external interference by investigating the presence or absence of a wireless station using the same frequency band as the wireless station being subjected to interference based on the communication profile information.

Figure 31:
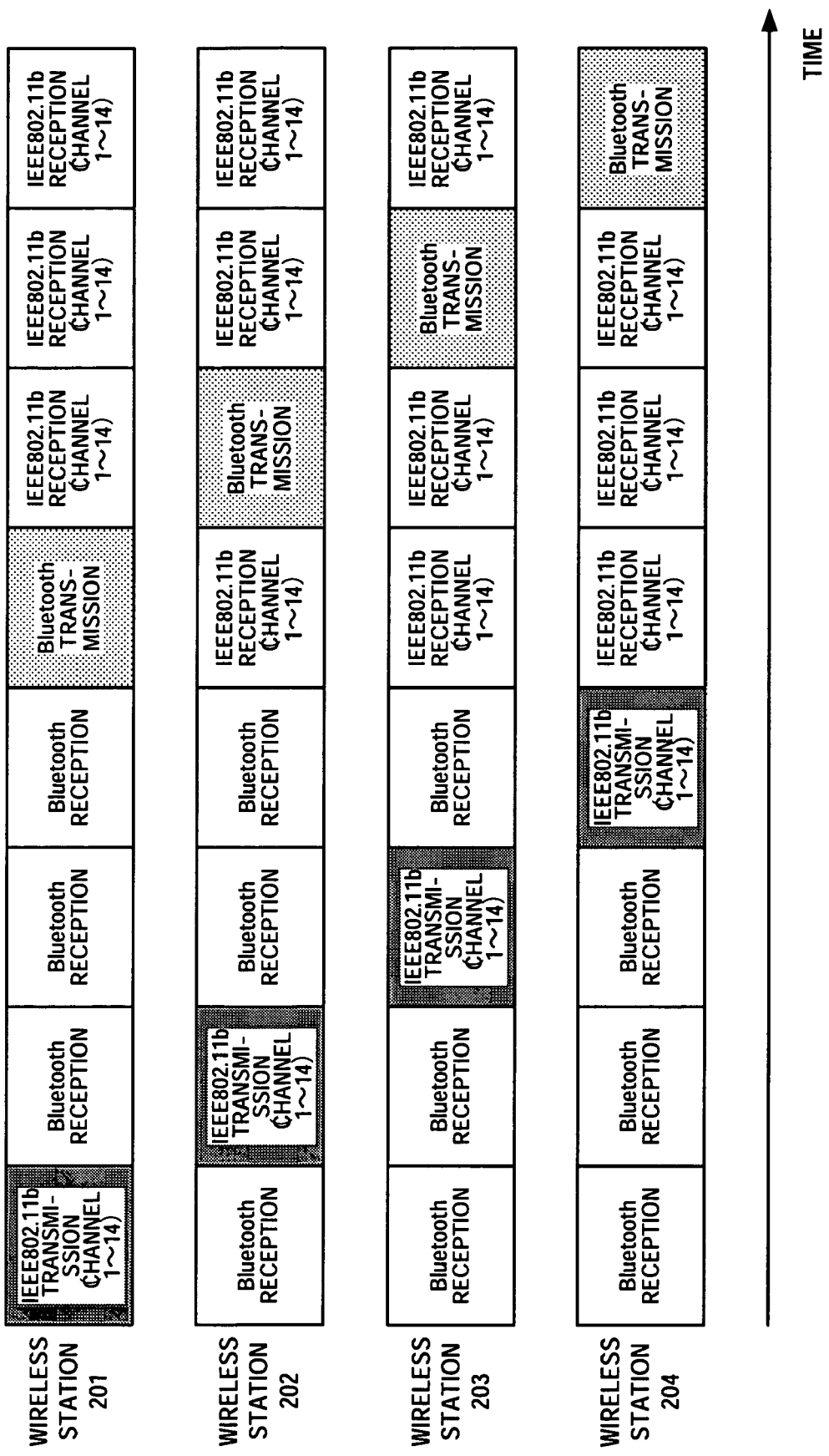
FIG. 31 is a view showing the flow of a transmitting and receiving operation for wireless stations when carrying out internal interference measurements in a calibration state.

Further, in this embodiment, although the case has been described where wireless stations 201 to 204 estimate reception quality of a desired signal by carrying out transmission and reception of signals in the order shown in FIG. 18 in the calibration state, this is by no means limited to transmission and reception of signals at the time of calibration. For example, a configuration may also be adopted where wireless stations 201 to 204 carry out transmitting and receiving operations in the order shown in FIG. 31, measure internal interference, and report internal interference measurement results to multimode control station 205 after the end of calibration. In doing so, multimode control station 205 is able to allocate optimum communication schemes to wireless stations 201 to 204 in advance based on an amount of internal interference in the reported calibration state.

Further, in this embodiment, a calibration state is provided as a state for the wireless communication system but when advance information is not necessary, the calibration operation is not always required.

Embodiment 4

In this embodiment, wireless stations 201 to 204 and multimode control station 205 are proposed in order that multimode control station 205 may decide optimum communication resource allocation for wireless stations 201 to 204 based on communication link information reported from wireless stations 201 to 204 so that interference the wireless station are subjected to from wireless stations other than the subject station and interference the subject station gave to wireless stations other than the subject station can be reduced.

(1) Configuration and Operation of Management Apparatus

Figures 32, 33:
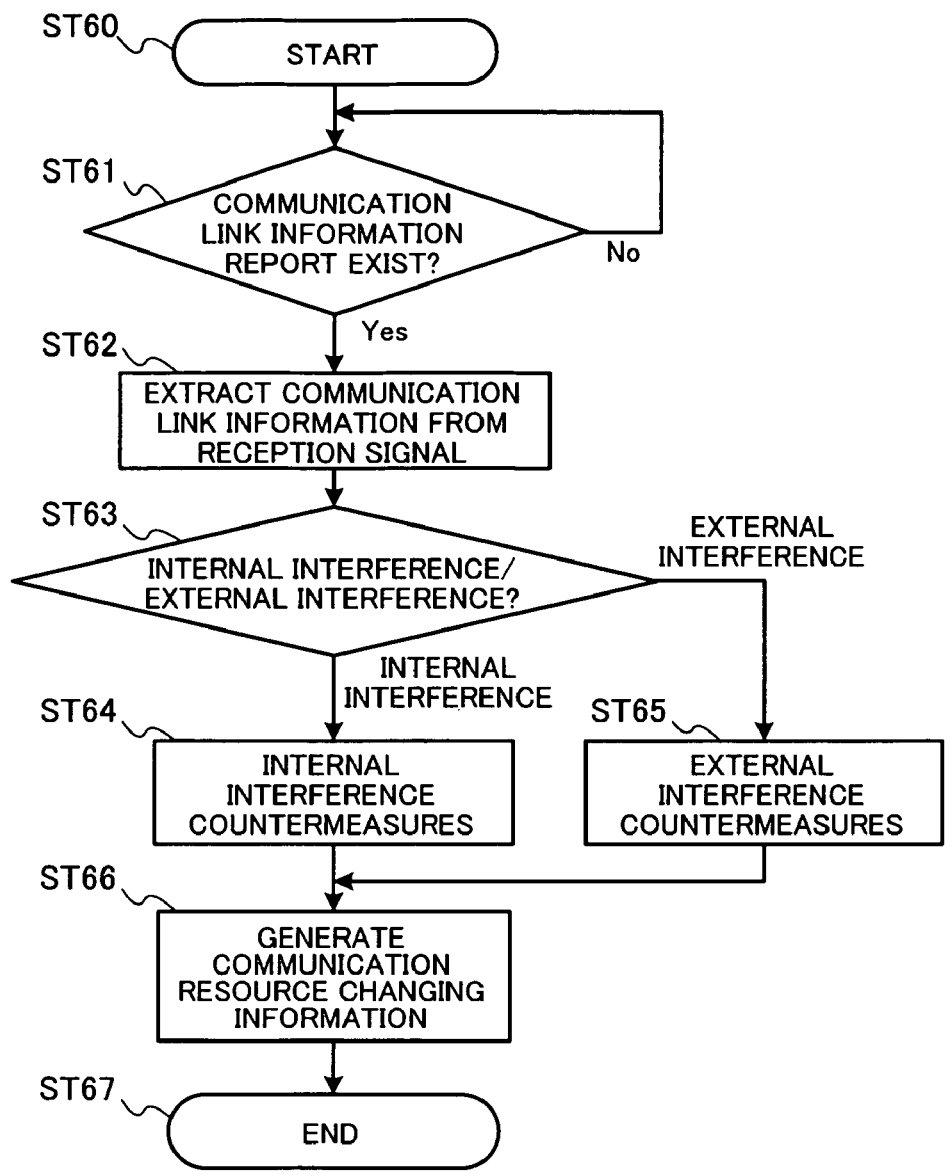
FIG. 32 is a flowchart showing the operations of a multimode control station when generating communication resource changing information.
FIG. 33 is a view showing an example of communication resource changing information of a embodiment 4.

First, the configuration and operations of multimode control station 205 will be described. The configuration of multimode control station 205 will be described using the flow of FIG. 25. FIG. 32 is a flowchart showing the flow of operations until multimode control station 205 generates communication resource changing information based on communication link information. In FIG. 32, multimode control station 205 monitors whether or not there is report of communication link information from wireless station 201 (ST61).

When there is report of communication link information (ST61: Yes), multimode control station 205 extracts communication link information from a reception signal at multimode communication section 212 (ST62), and outputs this to resource allocation deciding section 213. Resource allocation deciding section 213 then determines whether the interference wireless station 201 is subjected to is internal interference or external interference by referring to attribute parameters for the communication link information (ST63). Internal interference countermeasures (ST64) for reducing interference wireless station 201 is subjected to or external interference countermeasures (ST65) are then carried out according to the results of the determination.

The internal interference countermeasures and the external interference counter measures have basically the same processing content, with the exception that the wireless stations as the targets of changing of allocated communication resources are different. Namely, in the case of internal interference, because the wireless station as the interference source is within the range of the management area 206, multimode control station 205 is able co change communication resources of both the wireless station being subjected to interference and the wireless station causing the interference.

On the other hand, in the case of external interference, the wireless station that is the interference source is positioned outside the range of the management area 206. There is therefore the point of difference that the multimode control station 205 cannot change communication resources of the wireless station causing the interference.

In step ST66, multimode control station 205 generates communication resource changing information. In the case as shown, for example, in FIG. 33, where the communication scheme used by wireless station 203 as resource allocation content to change is a scheme conforming to the Bluetooth (registered trademark) standard, the probability of the frequency spectrum overlapping with wireless station 203 can be reduced by also changing the communication scheme used by wireless station 201 to a scheme conforming to the Bluetooth (registered trademark) standard, and, therefore, interference can be avoided. Further, change is also possible to lower the transmission rate of wireless station 201 and improve the resistance to errors. Further, resistance to errors can also be increased by raising the transmission power.

Further, if wireless station 203 uses the same communication scheme as wireless station 201 and the same frequency channel, control may be carried out so as to change the frequency channel used by wireless station 201 and not to overlap the frequency spectra.

Further, in the case of internal interference, it is possible to change the communication resource in the same way as described above for wireless station 203 that is an interference source. The communication resources are changed by combining one or a plurality of the contents to be changed.

Figure 34:
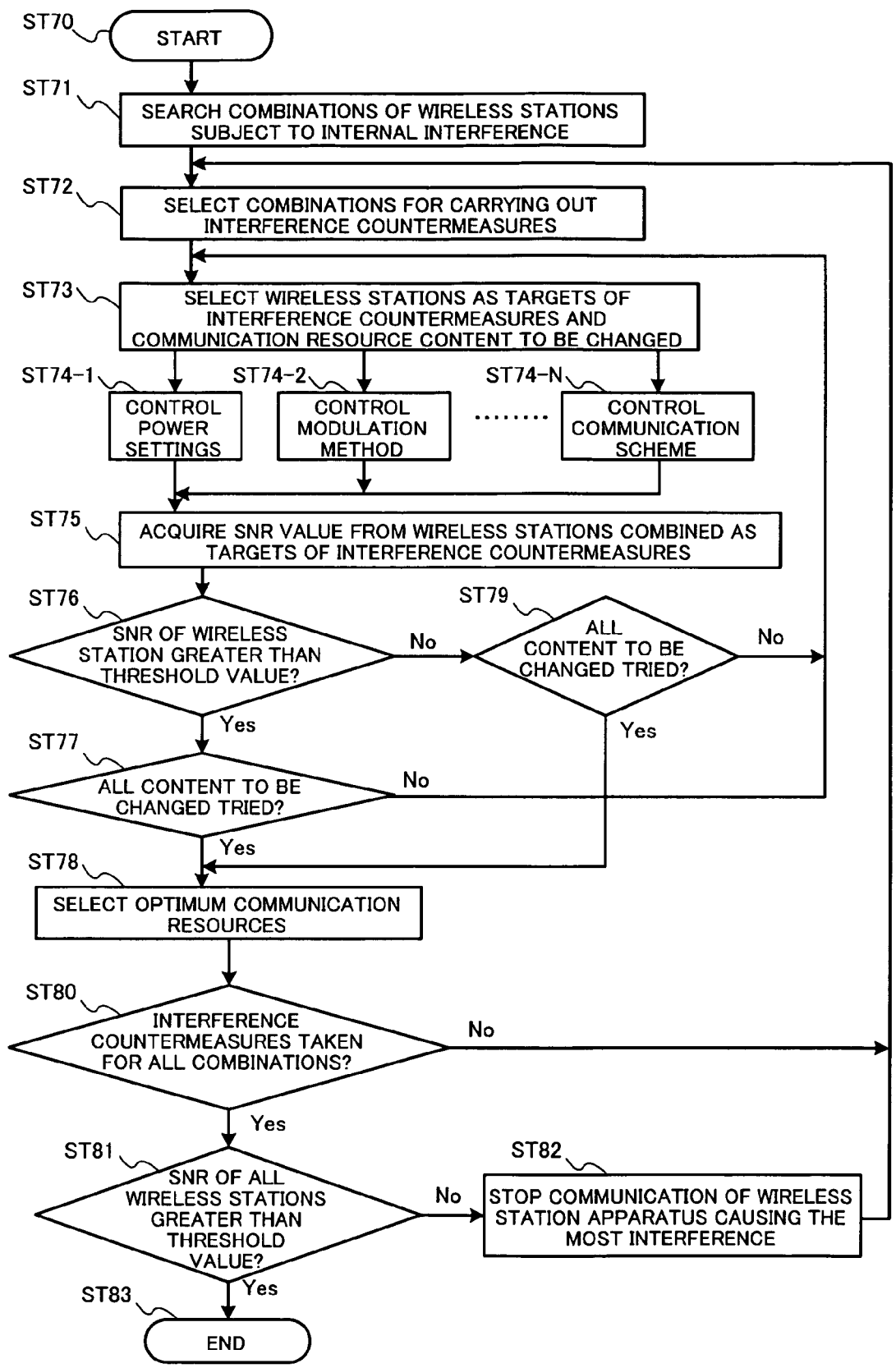
FIG. 34 is a flowchart showing the operations of internal interference countermeasures of the embodiment 4.

The resource allocation deciding section 213 in FIG. 34 indicates the processing procedure until optimum communication resource allocation is decided so as to reduce the influence of interference on wireless stations causing interference and wireless stations subjected to interference based on the interference information and communication profile information.

Resource allocation deciding section takes advantage of characteristics where multimode control station 205 is capable of understanding interference information of wireless station 201 to 204, an first searches for combinations of wireless stations that may possibly be causing internal interference based on interference information reported by wireless stations 201 to 204.

For example, in the case of interference information such as that shown in FIG. 24, the interference source ID is 0003, so that it is determined that the possibility that the source generating interference received by wireless station 201 is wireless station 203 is high, and detection is performed with the combination of wireless station 201 and wireless station 203. In step ST71, all combinations of wireless stations that are causing interference or are subjected to interference are detected in this way. In step ST72, a combination for carrying out interference countermeasures is selected from the combinations searched in step ST71.

Next, in step ST73, communication profile information for the wireless stations is acquired from communication link information collection section 214 for the combination of wireless stations selected for interference countermeasures in step ST72, and wireless stations taken as targets for changing of communication resources and content of communication resources to be changed are selected. Here, wireless stations taken as targets for changing of communication resources may be one or a plurality of wireless communication apparatus contained in combinations of wireless stations selected in step ST72.

Control of the changing of content for communication resources selected for the selected wireless stations is then carried out (ST74-1 to ST74-N) Here, first, control so as to change communication resources of wireless station 201 is taken as an example. Further, a case will be described where the communication resource to be changed is transmission power.

In order to determine whether or not interference countermeasures using transmission power control were appropriate, multimode control station 205 acquires SNR indicating the communication quality of communications originally carried from wireless station 201 and wireless station 203 contained in the combination selected in step ST72 and determines whether the SNR of the respective wireless stations quality is better or worse than the threshold value shown in FIG. 20.

The above operations are then carried out for all of the communication resources that can be changed (ST79), and the communication resource for the case where the SNR of wireless station 201 and wireless station 203 is maximum is selected (ST78). The same processing is then carried out for combinations of all the wireless stations (ST80), and finally, a determination is made as to whether or not the desired SNR is obtained for wireless stations 201 to 204 within management area 206 (ST81).

Here, if at least one wireless station for which the desired SNR is not obtained exists, communication of a wireless station having the largest number of the wireless stations to which this wireless station may cause interference, among the wireless stations that are interference sources, is stopped (ST82).

Basically the same operation is also carried out when external interference countermeasures but the targets of changing of allocated communication resources are only wireless stations subjected to interference, and changing of communication resources for wireless stations that are interference sources is difficult. By carrying out the processing described above, multimode control station 205 generates communication resource changing information at resource allocation deciding section 213 and stores this in communication resource information collection section 214.

Upon report of completion of changing of communication resources from a wireless station (described later), communication link information collection section 214 updates communication profile information relating to wireless stations 201 to 204 stored up to this time and outputs communication resource changing information to multimode communication section 212. After this, multimode control station 205 sends communication resource changing information to wireless station 201.

(2) Configuration and Operation of Wireless Station

Figure 35:
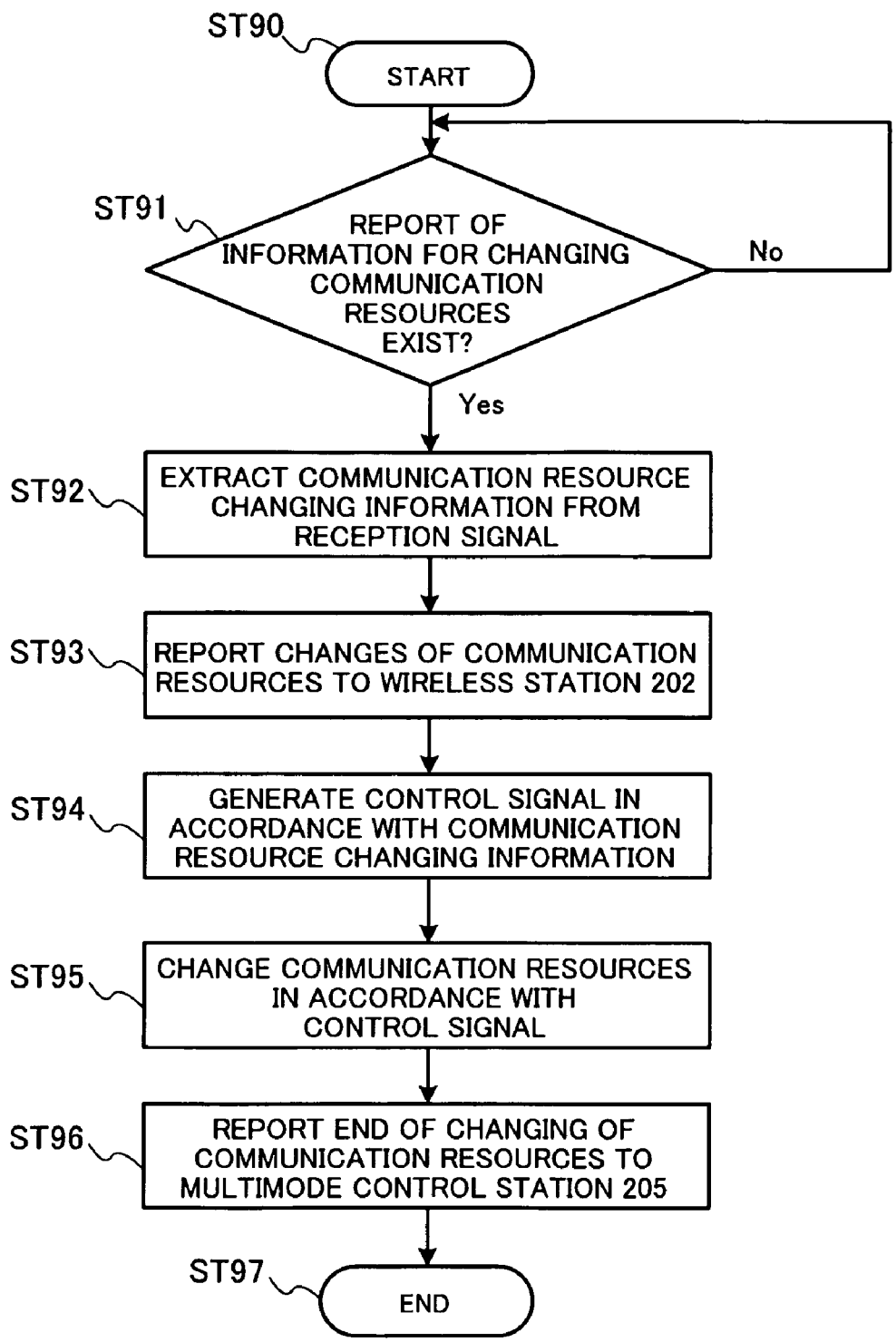
FIG. 35 is a flowchart showing the operations of a wireless station when changing a communication resource.

Next, the configuration and operations of wireless stations 201 to 204 will be described. The configuration of wireless stations 201 to 204 will be described using the flow of FIG. 19. The operations of wireless stations 201 to 204 occurring in the changing of the communication resources is basically the same, and the operations of wireless station 201 will be described here as being typical. FIG. 35 is a flowchart showing the flow of an operation until wireless station 201 change communication resources used in communication with wireless terminal station 202 based on communication resource changing information reported from multimode control station 205. In FIG. 35, at multimode communication section 207, during communication with wireless station 202, wireless station 201 monitors whether or not there is report of communication resource changing information from multimode control station 205 (ST91).

When there is report of communication resource update information (ST91: Yes), communication resource changing information is extracted from a reception signal at multimode communication section 207 (ST92), the extracted communication resource changing information is outputted to communication control section 211, and communication resource changing information is transferred to wireless station 202 (ST93).

Next, at communication control section 211, wireless communication apparatus 1 generates a control signal in accordance with communication resource changing information (ST94), and outputs a control signal to multimode communication section 207. Next, multimode communication section 207 changes resources for communication with wireless station 202 in accordance with the control signal (ST95).

Here, as an example, of the content to be changed of the communication resources shown in FIG. 33, it is taken that changing the used communication scheme from a communication scheme conforming to the IEEE802.11b standard to a communication scheme conforming to the Bluetooth (registered trademark) standard is instructed. At this time, multimode communication section 207 switches over the communication scheme to a Bluetooth (registered trademark) standard by acquiring configuration information necessary in order to have a communication function conforming to the Bluetooth (registered trademark) standard from predetermined memory. When switching over of the communication scheme is complete, wireless station 201 sends a signal indicating that changing of the communication resources is complete to multimode control station 205 (ST96).

Wireless station 201 is therefore able to reduce the interference from wireless station 203 by changing communication resources using the procedure described above.

(3) Effects of the Embodiment

According to this embodiment, under an environment where a plurality of types of wireless communication schemes using the same frequency band within an area in close proximity are mixed and used, it is possible to increase throughput of the wireless communication system as a whole as a result of multimode control station 205 deciding communication resources allocated to wireless stations 201 to 204 so that interference wireless stations 201 to 204 are subjected to from other than themselves and interference the subject apparatus gives to wireless stations 201 to 204 other than the subject station can be reduced based on communication link information reported from wireless stations 201 to 204.

(4) Modified Examples

In this embodiment, although multimode control station 205 carries out control so as to change communication resources for wireless station 201 subjected to interference when the interference wireless station 201 is subject to is internal interference, this is by no means limiting. Multimode control station 205 may also carry out control so as to change communication resources for wireless station 203 that is causing interference.

Further, in this embodiment, although multimode control station 205 changes, for example, the communication scheme, frequency channel, transmission rate, and transmission power etc. of wireless stations 201 to 204, this is by no means limiting. For example, multimode control station 205 may carry out control so as to stop the transmission of signals to a wireless station causing interference for a predetermined time, or, conversely, may carry out control to stop communication of a wireless station subjected to interference for a predetermined time.

Further, in this embodiment, although multimode control station 205 extracts changes of communication resources with the communication scheme contained in the communication profile information for wireless stations 201 to 204, this is by no means limiting. For example, by utilizing a configuration where multimode communication sections 207 and 212 are configured using programmable devices etc., the communication scheme may be changed to IEEE802.11g using the same 2.4 GHz band, or, the communication scheme may be changed to IEEE802.11a using a 5 GHz band different from the 2.4 GHz band. In this case, configuration information necessary in re-writing functions of multimode communication sections 207 and 212 may be downloaded using the Internet, etc.

Similarly, in this embodiment, although multimode control station 205 extracts changes of communication conditions within the communication scheme contained in the communication profile information for the wireless stations, this is by no means limiting. For example, as defined in the IEEE802.11h standard, it is also possible to carry out control to dynamically change the used frequency and dynamically select a frequency channel where there is little interference, or carry out control so that there is no influence on other communication by keeping transmission power to the minimum level required based on conditions such as distance between wireless stations etc. This control leads to energy saving.

Further, when it is not possible to reduce interference occurring at a wireless station even after carrying out interference countermeasures, multimode control station 205 may also take interference countermeasures so that the influence of interference is as small as possible at wireless stations 201 to 204.

Further, in this embodiment, although the case has been described where a changes in communication resources are derived in accordance with the procedure of FIG. 34, this is by no means limiting, and SNR for wireless station 201 to 204 may be extracted so as to be maximum by using linear programming. If linear programming is used, it is no longer necessary to try all of the content to be changed, and extraction of communication resources can be carried out more efficiently.

Figure 36:
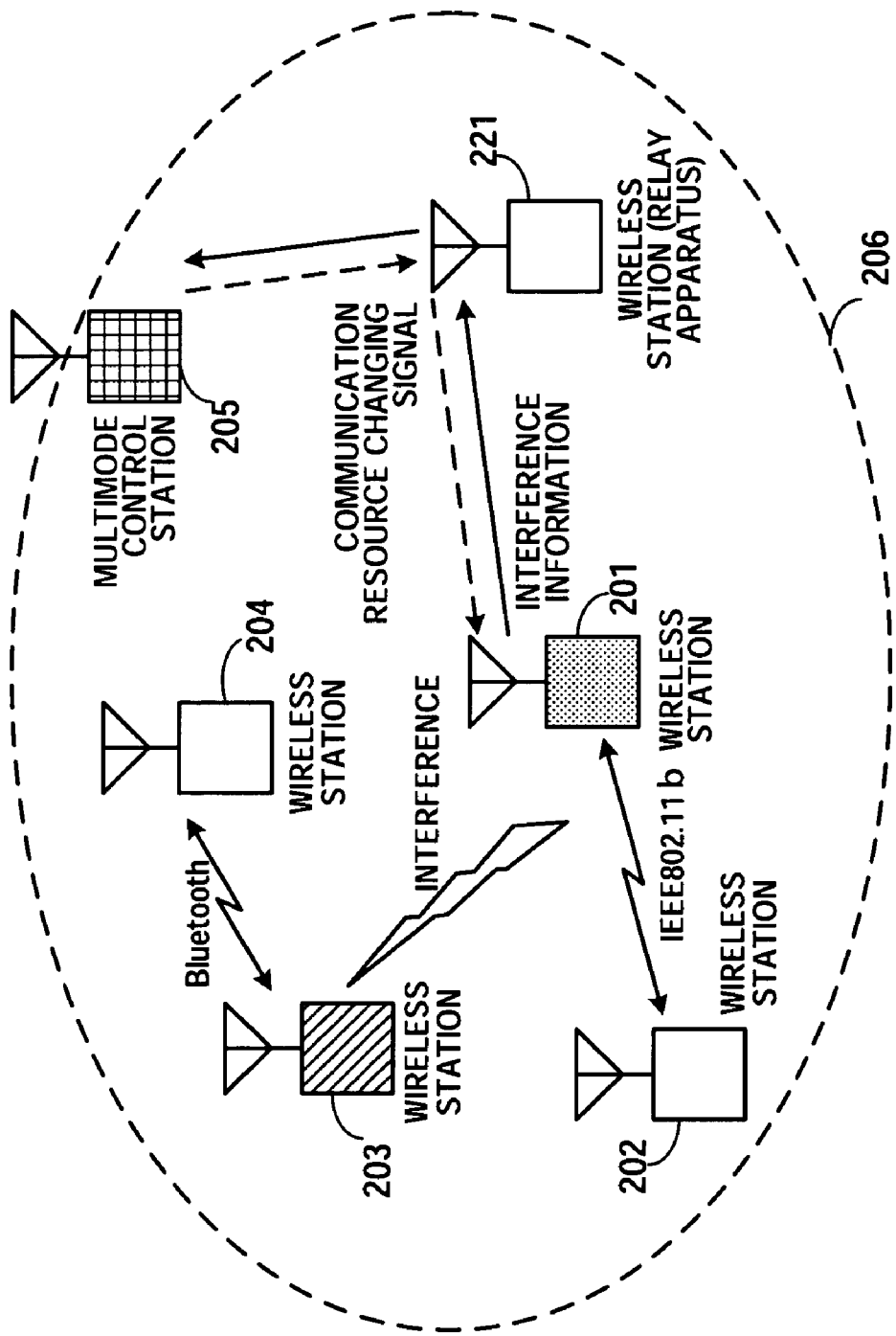
FIG. 36 is a view showing a configuration for a wireless communication system when a relay station exists.

Further, in this embodiment, although multimode control station 205 is connected to all of wireless stations 201 to 204 forming the wireless communication system in a wireless or wired manner, this is by no means limiting. For example, when a wireless station which cannot be directly connected with multimode control station 205 exists, as shown in FIG. 36, connection with multimode control station 205 via a wireless station (relay station) playing the role of relaying as shown in FIG. 36 may also be possible. At this time, wireless station 201 to 204 report interference information to multimode control station 205 via relay 221, and multimode control station 205 reports communication condition changing information to wireless stations 201 to 204 via relay station 221.

This specification is based on Japanese patent Application No. 2004-160329 filed on May 28, 2004, Japanese patent Application No. 2004-160334 filed on May 28, 2004, and Japanese patent Application No. 2004-324231 filed on Nov. 8, 2004, the entire content of which is expressly incorporated by reference herein.

INDUSTRIAL APPLICABILITY

The multimode control station, wireless communication system, wireless station and wireless communication control method according to the present invention has the effect of improving total throughput of traffic in a whole system under an environment where a plurality of types of wireless communication schemes are mixed and used within an area in close proximity, and are, for example, favorable for use in a system forming a wireless communication network within a room.

The invention claimed is:
1. A multimode control station included in a different schemes mixing type wireless communication system, the multimode control station compatible with a plurality of types of wireless communication standards by changing functions under a wireless communication environment where communication links using wireless communication schemes conforming to a plurality of types of the wireless communication standards are mixed and used, the different schemes mixing type wireless communication system further including a plurality of wireless stations that carry out communication using a wireless communication scheme conforming to at least one wireless communication standard of the plurality of types of wireless communication standards, wherein:
   information relating to the communication links used by the plurality of wireless stations is collected; and
   communication resource allocation used in the communication links is decided based on the collected information so that total throughput of wireless communication traffic under the wireless communication environment is improved,
   wherein:
   one of the communication links used by one of the wireless stations is a wireless communication link between the wireless station and the multimode control station; and
   the multimode control station decides an allocation of the communication resources used in the wireless communication link so that throughput of wireless communication traffic in a wireless communication network including the multimode control station is maximized, wherein the multimode control station comprises:
a communication link parameter collecting section that collects information relating to the communication links with the plurality of wireless stations;
a resource allocation deciding section that decides the communication resource allocation used at the wireless communication links with the wireless stations based on the collected information so that throughput of data transmission traffic within the wireless communication network is maximized; and
a multimode communication section that controls communication conditions for the wireless communication links based on the decided communication resource allocation to the wireless stations, and carries out communication,
wherein the resource allocation deciding section decides communication resource allocation used at the wireless communication links with the wireless station by setting an objective function relating to throughput and restriction conditions based on information collected at the communication link parameter collection section and obtaining an optimum combination of control parameters that maximizes an objective function value under the restriction conditions,
wherein the resource allocation deciding section uses, as the objective function:
a function that obtains a total amount of data that can be transmitted per resource allocation period at the communication links with the wireless stations within the wireless communication network; and
a product of transmission speed used at the communication links with the wireless stations and time for carrying out communication by using the communication links when calculating the total amount of data, the time for carrying out communication using time where time required for switching communication functions by the multimode control station or the multimode wireless station and time required for link connection along with change of the communication scheme are reduced from communication time allocated to the communication link.

2. The multimode control station according to claim 1, wherein, when calculating the total amount of data, the multimode control station uses a product of transmission speed used at the communication links with the wireless station, time for carrying out communication by using the communication links, and a received bit non-error rate by using the communication links.

3. A multimode control station included in a different schemes mixing type wireless communication system, the multimode control station compatible with a plurality of types of wireless communication standards by changing functions under a wireless communication environment where communication links using wireless communication schemes conforming to a plurality of types of the wireless communication standards are mixed and used, the different schemes mixing type wireless communication system further including a plurality of wireless stations that carry out communication using a wireless communication scheme conforming to at least one wireless communication standard of the plurality of types of wireless communication standards, wherein:
information relating to the communication links used by the plurality of wireless stations is collected; and
communication resource allocation used in the communication links is decided based on the collected information so that total throughput of wireless communication traffic under the wireless communication environment is improved,
wherein:
one of the communication links used by one of the wireless stations is a wireless communication link between the wireless station and the multimode control station; and
the multimode control station decides an allocation of the communication resources used in the wireless communication link so that throughput of wireless communication traffic in a wireless communication network including the multimode control station is maximized,
wherein the multimode control station comprises:
a communication link parameter collecting section that collects information relating to the communication links with the plurality of wireless stations;
a resource allocation deciding section that decides the communication resource allocation used at the wireless communication links with the wireless stations based on the collected information so that throughput of data transmission traffic within the wireless communication network is maximized; and
a multimode communication section that controls communication conditions for the wireless communication links based on the decided communication resource allocation to the wireless stations, and carries out communication,
wherein the resource allocation deciding section decides communication resource allocation used at the wireless communication links with the wireless station by setting an objective function relating to throughput and restriction conditions based on information collected at the communication link parameter collection section and obtaining an optimum combination of control parameters that maximizes an objective function value under the restriction conditions,
wherein the resource allocation deciding section uses the following equation as the objective function:

$$Z_{mi} = \frac{\left\{\sum_{n=1}^{N} B_{n,mi} \times (Tf_{n,mi} - (Tr_{n,mi} + Ts_{n,mi})) \times (1 - Pe_{n,mi})\right\}}{Ta} \quad (1)$$

where $Z_{mi}$ denotes throughput per resource allocation period within the network, n denotes wireless station number of a communication target, mi denotes a combination of communication schemes used by the communication links, B denotes transmission speed, Tf denotes time allocation, Tr denotes time required for switching communication schemes, Ts denotes time required for link connection, and Ta denotes time until communication carried out one at a time for all N stations is complete.

4. The multimode control station according to claim 3, wherein the resource allocation deciding section uses a set of one of (i) equations 2 to 4 and (ii) equations 2 to 5 as the restriction conditions:

[Equation 2]

$$mi \in S \quad (2)$$

[Equation 3]

$$(I_{n,mi}-1) \times Ta + Tf_{n,mi} \leq Tt_{max_n} \quad (3)$$

[Equation 4]

$$I_{n,mi} = \left\lfloor \frac{D_n}{B_{n,mi}\{Tf_{n,mi} - (Tr_{n,mi} + Ts_{n,mi})\}} \right\rfloor \quad (4)$$

[Equation 5]

$$Pe_{n,mi} \leq Pe_{max_n} \quad (5)$$

where S denotes a set of communication schemes used within the network, D denotes a not-yet transmitted data amount, and Pe denotes a bit error rate.

5. A multimode control station included in a different schemes mixing type wireless communication system, the multimode control station compatible with a plurality of types of wireless communication standards by changing functions under a wireless communication environment where communication links using wireless communication schemes conforming to a plurality of types of the wireless communication standards are mixed and used, the different schemes mixing type wireless communication system further including a plurality of wireless stations that carry out communication using a wireless communication scheme conforming to at least one wireless communication standard of the plurality of types of wireless communication standards, wherein:

information relating to the communication links used by the plurality of wireless stations is collected; and communication resource allocation used in the communication links is decided based on the collected information so that total throughput of wireless communication traffic under the wireless communication environment is improved, wherein:

one of the communication links used by one of the wireless stations is a wireless communication link between the wireless station and the multimode control station; and the multimode control station decides an allocation of the communication resources used in the wireless communication link so that throughput of wireless communication traffic in a wireless communication network including the multimode control station is maximized, wherein the multimode control station comprises:

a communication link parameter collecting section that collects information relating to the communication links with the plurality of wireless stations;

a resource allocation deciding section that decides the communication resource allocation used at the wireless communication links with the wireless stations based on the collected information so that throughput of data transmission traffic within the wireless communication network is maximized; and a multimode communication section that controls communication conditions for the wireless communication links based on the decided communication resource allocation to the wireless stations, and carries out communication, wherein the resource allocation deciding section decides communication resource allocation used at the wireless communication links with the wireless station by setting an objective function relating to throughput and restriction conditions based on information collected at the communication link parameter collection section and obtaining an optimum combination of control parameters that maximizes an objective function value under the restriction conditions, wherein the resource allocation deciding section obtains an optimum combination of the control parameters by extracting an optimal solution for the objective function using dynamic programming under the restriction conditions, wherein the resource allocation deciding section uses as the objective function:

a function that obtains a total amount of data that can be transmitted per resource allocation period at the communication links with the wireless stations within the wireless communication network; and a product of transmission speed used at the communication links with the wireless stations and time for carrying out communication by using the communication links when calculating the total amount of data, the time for carrying out communication using time where time required for switching communication functions by the multimode control station or the multimode wireless station and time required for link connection along with change of the communication scheme are reduced from communication time allocated to the communication link.

6. The multimode control station according to claim 5, wherein, when calculating the total amount of data, the multimode control station uses a product of transmission speed used at the communication links with the wireless station, time for carrying out communication by using the communication links, and a received bit non-error rate by using the communication links.

7. A multimode control station included in a different schemes mixing type wireless communication system, the multimode control station compatible with a plurality of types of wireless communication standards by changing functions under a wireless communication environment where communication links using wireless communication schemes conforming to a plurality of types of the wireless communication standards are mixed and used, the different schemes mixing type wireless communication system further including a plurality of wireless stations that carry out communication using a wireless communication scheme conforming to at least one wireless communication standard of the plurality of types of wireless communication standards, wherein:

information relating to the communication links used by the plurality of wireless stations is collected; and communication resource allocation used in the communication links is decided based on the collected information so that total throughput of wireless communication traffic under the wireless communication environment is improved, wherein:

one of the communication links used by one of the wireless stations is a wireless communication link between the wireless station and the multimode control station; and the multimode control station decides an allocation of the communication resources used in the wireless communication link so that throughput of wireless communication traffic in a wireless communication network including the multimode control station is maximized, wherein the multimode control station comprises:

a communication link parameter collecting section that collects information relating to the communication links with the plurality of wireless stations;

a resource allocation deciding section that decides the communication resource allocation used at the wireless communication links with the wireless stations based on the collected information so that throughput of data transmission traffic within the wireless communication network is maximized; and a multimode communication section that controls communication conditions for the wireless communication links based on the decided communication resource allocation to the wireless stations, and carries out communication, wherein the resource allocation deciding section decides communication resource allocation used at the wireless communication links with the wireless station by setting an objective function relating to throughput and restriction conditions based on information collected at the communication link parameter collection section and obtaining an optimum combination of control parameters that maximizes an objective function value under the restriction conditions, wherein the resource allocation deciding section obtains an optimum combination of the control parameters by extracting an optimal solution for the objective function using dynamic programming under the restriction conditions, wherein the resource allocation deciding section uses a combination of the following equations as the objective function:

[Equation 7]

$$f_N(k_N) = \max[TH_N], k_N = \sum_{n=1}^{N} a_n = 1 \qquad (7)$$

[Equation 8]

$$TH_N = \frac{\left\{\sum_{n=1}^{N} th_n(a_n)\right\}}{T_a} \qquad (8)$$

[Equation 9]

$$th_n(a_n) = B_n \times (1-Pe_n) \times \{T_a \times a_n - (Tr_n + Ts_n)\} \qquad (9).$$

8. A multimode control station included in a different schemes mixing type wireless communication system, the multimode control station compatible with a plurality of types of wireless communication standards by changing functions under a wireless communication environment where communication links using wireless communication schemes conforming to a plurality of types of the wireless communication standards are mixed and used, the different schemes mixing type wireless communication system further including a plurality of wireless stations that carry out communication using a wireless communication scheme conforming to at least one wireless communication standard of the plurality of types of wireless communication standards, wherein:

information relating to the communication links used by the plurality of wireless stations is collected; and communication resource allocation used in the communication links is decided based on the collected information so that total throughput of wireless communication traffic under the wireless communication environment is improved, wherein:

one of the communication links used by one of the wireless stations is a wireless communication link between the wireless station and the multimode control station; and the multimode control station decides an allocation of the communication resources used in the wireless communication link so that throughput of wireless communication traffic in a wireless communication network including the multimode control station is maximized, wherein the multimode control station comprises:

a communication link parameter collecting section that collects information relating to the communication links with the plurality of wireless stations;

a resource allocation deciding section that decides the communication resource allocation used at the wireless communication links with the wireless stations based on the collected information so that throughput of data transmission traffic within the wireless communication network is maximized; and a multimode communication section that controls communication conditions for the wireless communication links based on the decided communication resource allocation to the wireless stations, and carries out communication, wherein the resource allocation deciding section decides communication resource allocation used at the wireless communication links with the wireless station by setting an objective function relating to throughput and restriction conditions based on information collected at the communication link parameter collection section and obtaining an optimum combination of control parameters that maximizes an objective function value under the restriction conditions, wherein the resource allocation deciding section obtains an optimum combination of the control parameters by extracting an optimal solution for the objective function using dynamic programming under the restriction conditions, wherein the resource allocation deciding section uses one of or both of the following equations as the restriction conditions:

[Equation 10]

$$\sum_{n=1}^{N} a_n = 1 \ (a_n > (Tr_n + Ts_n)/T) \qquad (10)$$

[Equation 14]

$$a_n \geq a_{min\_n} = \frac{D_n}{B_n \times T_a}. \qquad (14)$$

9. A wireless communication control method carried out at a multimode control station in a wireless communication network including the multimode control station that is able to communicate in a manner compatible with a plurality of communication schemes and a multimode wireless station that is able to communicate in a manner compatible with the plurality of communication schemes, the wireless communication control method comprising:

a collection step of collecting information relating to communication links with a plurality of wireless stations wherein the information includes a required mode switching time that is necessary when switching from a first communication scheme to a second communication scheme;
a resource allocation step of deciding communication resource allocation used at the communication links with the wireless stations based on collected information relating to the communication links to determine throughput of data transmission traffic within the wireless communication network; and
a communication control step of controlling communication conditions for the communication links based on communication resource allocation to the wireless stations, and carrying out communication,
wherein the resource allocation step comprises:
a step of setting an objective function denoting total throughput for the wireless communication network based on collected information for the communication links;
a step of setting combination of communication schemes used by the communication links with the wireless stations, maximum communication time permitted for data transmission carried out with the wireless stations, and restriction conditions based on communication quality permitted during data transmission, based on collected setting information for the communication links; and
a step of detecting combinations of resources that maximize the objective function based on the set restriction conditions,
wherein the wireless communication control method uses, as the objective function:
a function that obtains a total amount of data that can be transmitted per resource allocation period at the communication links with the wireless stations within the wireless communication network;
a product of transmission speed used at the communication links with the wireless stations and time for carrying out communication by using the communication links when calculating the total amount of data, the time for carrying out communication using time where time required for switching communication functions by the multimode control station or the multimode wireless station and time required for link connection along with change of the communication scheme are reduced from communication time allocated to the communication link.

10. The wireless communication control method according to claim 9, wherein, when calculating the total amount of data, the wireless communication control method uses the product of transmission speed used at the communication links with the wireless station, time for carrying out communication at the communication links, and a received bit non-error rate by using the communication links.

11. A wireless communication control method carried out at a multimode control station in a wireless communication network including the multimode control station that is able to communicate in a manner compatible with a plurality of communication schemes and a multimode wireless station that is able to communicate in a manner compatible with the plurality of communication schemes, the wireless communication control method comprising:
a collection step of collecting information relating to communication links with a plurality of wireless stations wherein the information includes a required mode switching time that is necessary when switching from a first communication scheme to a second communication scheme;
a resource allocation step of deciding communication resource allocation used at the communication links with the wireless stations based on collected information relating to the communication links to determine throughput of data transmission traffic within the wireless communication network; and
a communication control step of controlling communication conditions for the communication links based on communication resource allocation to the wireless stations, and carrying out communication,
wherein the resource allocation step comprises:
a step of setting an objective function denoting total throughput for the wireless communication network based on collected information for the communication links;
a step of setting combination of communication schemes used by the communication links with the wireless stations, maximum communication time permitted for data transmission carried out with the wireless stations, and restriction conditions based on communication quality permitted during data transmission, based on collected setting information for the communication links; and
a step of detecting combinations of resources that maximize the objective function based on the set restriction conditions,
wherein the maximum communication time permitted in data transmission with the wireless stations is calculated based on time required for switching communication functions by the multimode control station or the multimode wireless station and time required for link connection along with change of the communication scheme.

* * * * *